United States Patent

Sugiura et al.

[19]

[11] Patent Number: 5,966,170
[45] Date of Patent: Oct. 12, 1999

[54] COLOR VIDEO CAMERA FOR GENERATING A LUMINANCE SIGNAL WITH UNATTENUATED HARMONICS

[75] Inventors: Hiroaki Sugiura; Katsumi Asakawa, both of Nagaokakyo, Japan

[73] Assignee: Mitsubishi Denki Kabushiki, Tokyo, Japan

[21] Appl. No.: 08/831,488

[22] Filed: Mar. 31, 1997

Related U.S. Application Data

[62] Division of application No. 08/485,908, Jun. 7, 1995, Pat. No. 5,652,620, which is a division of application No. 08/010,069, Jan. 27, 1993, Pat. No. 5,450,124.

[30] Foreign Application Priority Data

| Jan. 27, 1992 | [JP] | Japan | 4-12002 |
| Mar. 27, 1992 | [JP] | Japan | 4-71179 |
| Mar. 27, 1992 | [JP] | Japan | 4-71180 |
| Mar. 27, 1992 | [JP] | Japan | 4-71181 |
| Apr. 7, 1992 | [JP] | Japan | 4-85287 |
| Jun. 11, 1992 | [JP] | Japan | 4-152140 |
| Jun. 19, 1992 | [JP] | Japan | 4-161056 |
| Jun. 26, 1992 | [JP] | Japan | 4-169367 |
| Jun. 26, 1992 | [JP] | Japan | 4-169368 |
| Jul. 10, 1992 | [JP] | Japan | 4-183744 |
| Jul. 10, 1992 | [JP] | Japan | 4-183745 |
| Jul. 14, 1992 | [JP] | Japan | 4-186841 |
| Jul. 14, 1992 | [JP] | Japan | 4-186842 |

[51] Int. Cl.$^6$ ..................................... H04N 9/09
[52] U.S. Cl. ........................ 348/234; 348/265; 348/275
[58] Field of Search .................. 348/262, 265, 348/275, 234, 235; H04N 9/09

[56] References Cited

U.S. PATENT DOCUMENTS

| 4,591,900 | 5/1986 | Heeb et al. | 348/277 |
| 4,876,591 | 10/1989 | Muramatsu | 348/236 |
| 5,184,212 | 2/1993 | Yamamoto | 348/265 |

(List continued on next page.)

FOREIGN PATENT DOCUMENTS

| 0364230 | 4/1990 | European Pat. Off. | H04N 9/73 |
| 0469836 | 2/1992 | European Pat. Off. | H04N 9/04 |
| 62-641788 | 8/1987 | Japan | H04N 9/04 |
| 2118725 | 5/1990 | Japan | G06F 7/556 |
| 43594 | of 1991 | Japan | H04N 7/13 |
| 4304089 | of 1992 | Japan | H04N 9/07 |
| 2138239 | 10/1984 | United Kingdom | H04N 9/07 |
| 8501631 | 3/1986 | WIPO | H04N 9/04 |

OTHER PUBLICATIONS

Ishikawa et al., National Technical Report, vol. 31, No. 1, pp. 76–82, Feb. 1985.
Tamura et al., National Technical Report, vol. 37, No. 3, pp. 55–61, Jun. 1991.
IEEE International Solid State Circuits Conference, vol. 34, Feb. 1991, New York US, pp. 250–251, H. Matsumoto et al., "A Single–chip Digital Signal Processor for CCD Cameras".
"A Correlative Coefficient Multiplying (CCM) Meethod for Chrominance Morie Reduction in Singlr–chip Color Video CAmeras" N. Ozawa, et al., IEEE Transactions on Electronic Devices, vol. 38, No. 5, May 1991.
"A Study on a Method of Flesh–Tone Color Correction for Digital Color Video Cameras" by Tetsuya Hisano, et al. 1992.
"Chrominance Moire Reduction for Single–Chip TV Cameras Using Signal–Processing by Correlative Coefficient Multiplying Method" Naoki Ozawa, Central Research Laboratory, Hitachi Ltd.
"Journal of Television Engineering Association", Nov. 1986.

*Primary Examiner*—Sherrie Hsia

[57] ABSTRACT

The outputs of N kinds of spectral response characteristics from an image sensor are passed through low-pass filters to obtain N kinds of outputs from the 1st through Nth, and the output signal of a pixel of interest having the Kth ($1 \leq K \leq N$) spectral response characteristic is multiplied by the ratio of the low-pass filter output of the image sensor output at the coordinates of the pixel of interest to the Kth low-pass filter output at the coordinates of the pixel of interest, thereby the luminance signal with alleviated attenuation of the harmonics components is obtained.

22 Claims, 77 Drawing Sheets

U.S. PATENT DOCUMENTS

| | | | |
|---|---|---|---|
| 5,257,326 | 10/1993 | Ozawa et al. | 382/54 |
| 5,262,849 | 11/1993 | Mimura et al. | 348/224 |
| 5,283,634 | 2/1994 | Yamazaki et al. | 348/234 |
| 5,319,451 | 6/1994 | Sasaki et al. | 348/282 |
| 5,337,152 | 8/1994 | Kotaki | 348/234 |
| 5,450,124 | 9/1995 | Sugiura et al. | 348/237 |

Fig. 1
Prior Art

| Mg | G  | Mg | G  | Mg | G  |
|----|----|----|----|----|----|
| Cy | Ye | Cy | Ye | Cy | Ye |
| Mg | G  | Mg | G  | Mg | G  |
| Ye | Cy | Ye | Cy | Ye | Cy |
| Mg | G  | Mg | G  | Mg | G  |
| Cy | Ye | Cy | Ye | Cy | Ye |
| Mg | G  | Mg | G  | Mg | G  |
| Ye | Cy | Ye | Cy | Ye | Cy |
| Mg | G  | Mg | G  | Mg | G  |
| Cy | Ye | Cy | Ye | Cy | Ye |
| Mg | G  | Mg | G  | Mg | G  |
| Ye | Cy | Ye | Cy | Ye | Cy | n LINE (rows 5-6)
n+1 LINE (rows 7-8)

Fig. 6

|    | MC | GY | MC | GY | MC | GY |
|----|----|----|----|----|----|----|
|    | MY | GC | MY | GC | MY | GC |
|    | MC | GY | MC | GY | MC | GY |
| s→ | MY | GC | MY | GC | MY | GC |
|    | MC | GY | MC | GY | MC | GY |
|    | MY | GC | MY | GC | MY | GC | t ↓

|    | GY |    | GY |    | GY |
|----|----|----|----|----|----|
|    |    |    |    |    |    |
|    | GY |    | GY |    | GY |
|    |    |    |    |    |    |
|    | GY |    | GY |    | GY |
|    |    |    |    |    |    |

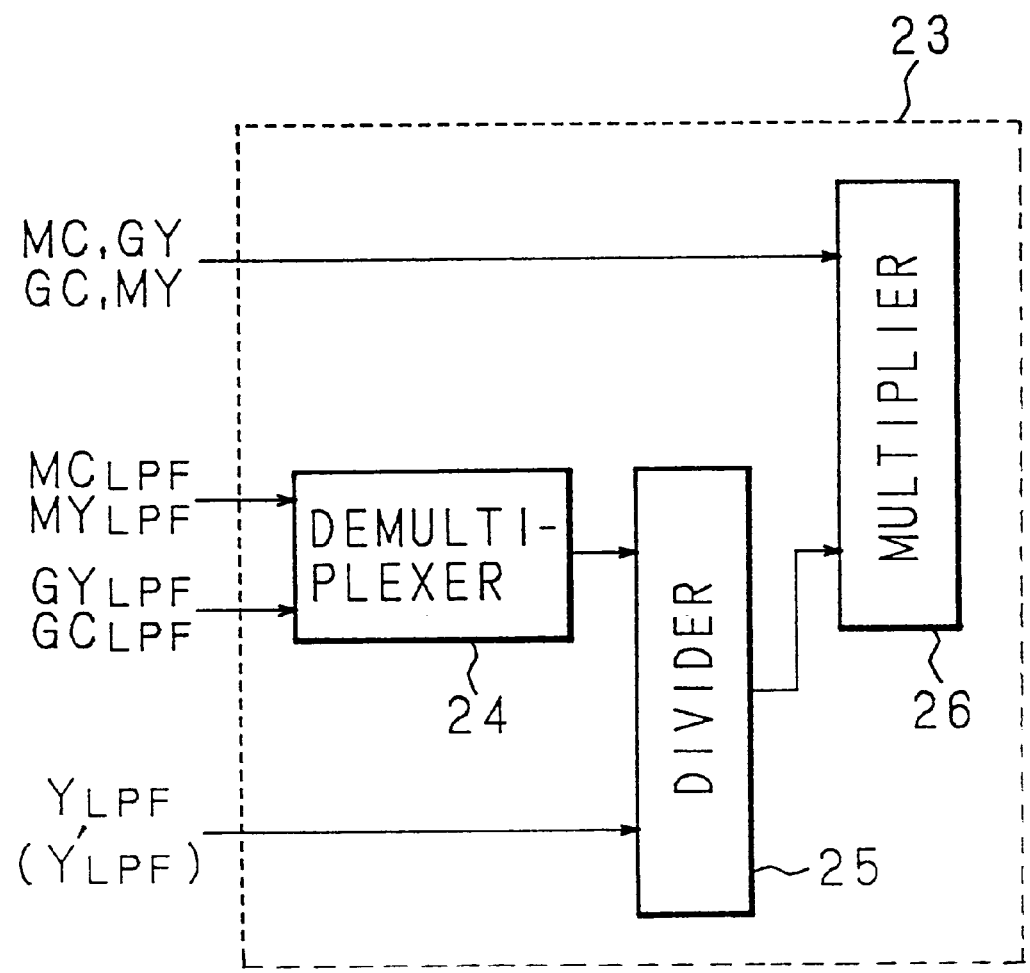

Fig. 18
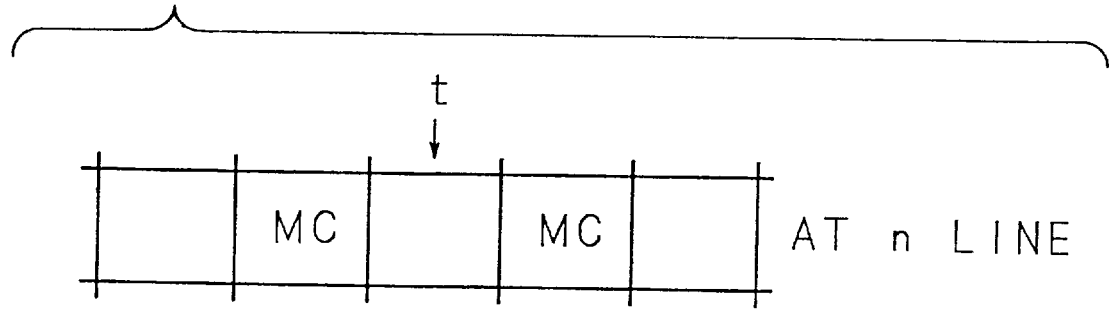 AT n LINE
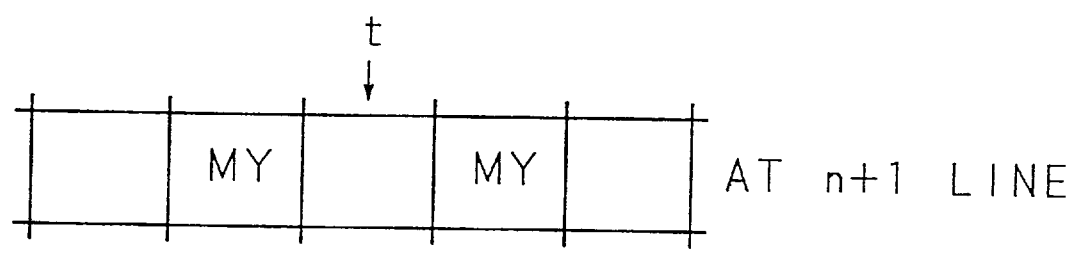 AT n+1 LINE

Fig. 19
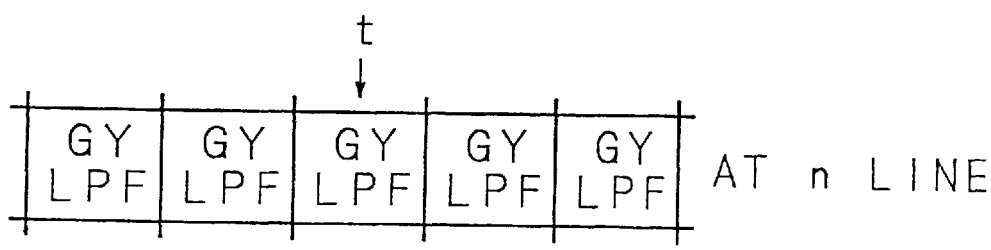
AT n LINE
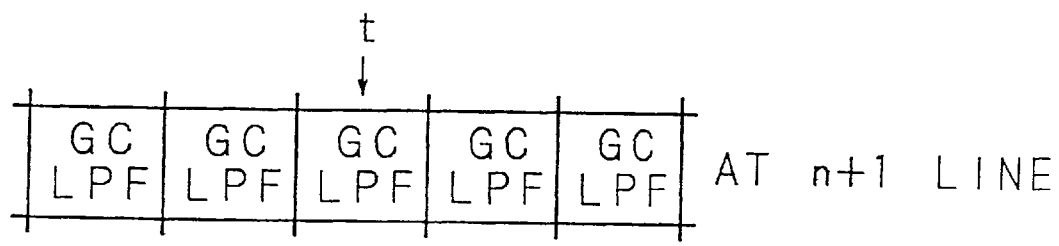
AT n+1 LINE $x' = x \rangle (6-5) = 55 \rangle 1 \rightarrow 27$
$y' = y \rangle (5-5) = 13 \rangle 0 \rightarrow 13$
$z' = x'/y' = 27/13 \rightarrow 2$
$z = z' \rangle (5-6) = 2 \langle 1 \rightarrow 4$
$\langle$ : 2 IS SHIFTED BY 1 BIT TO INCREASE THE NUMBER OF BITS

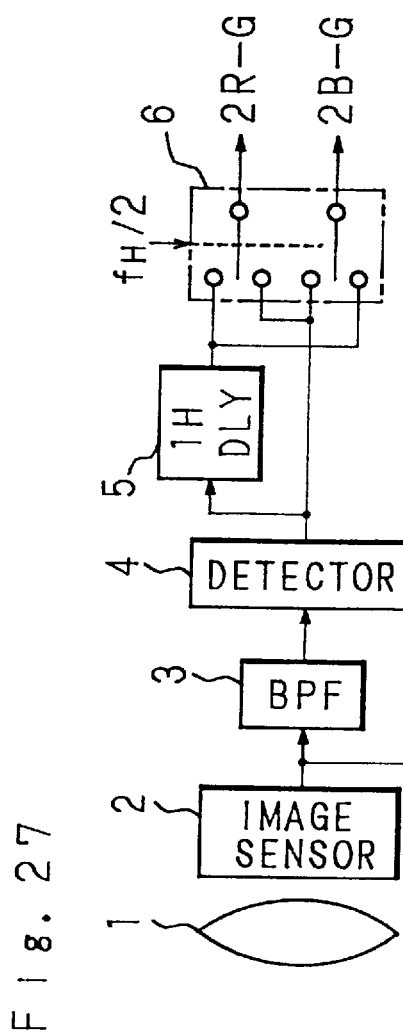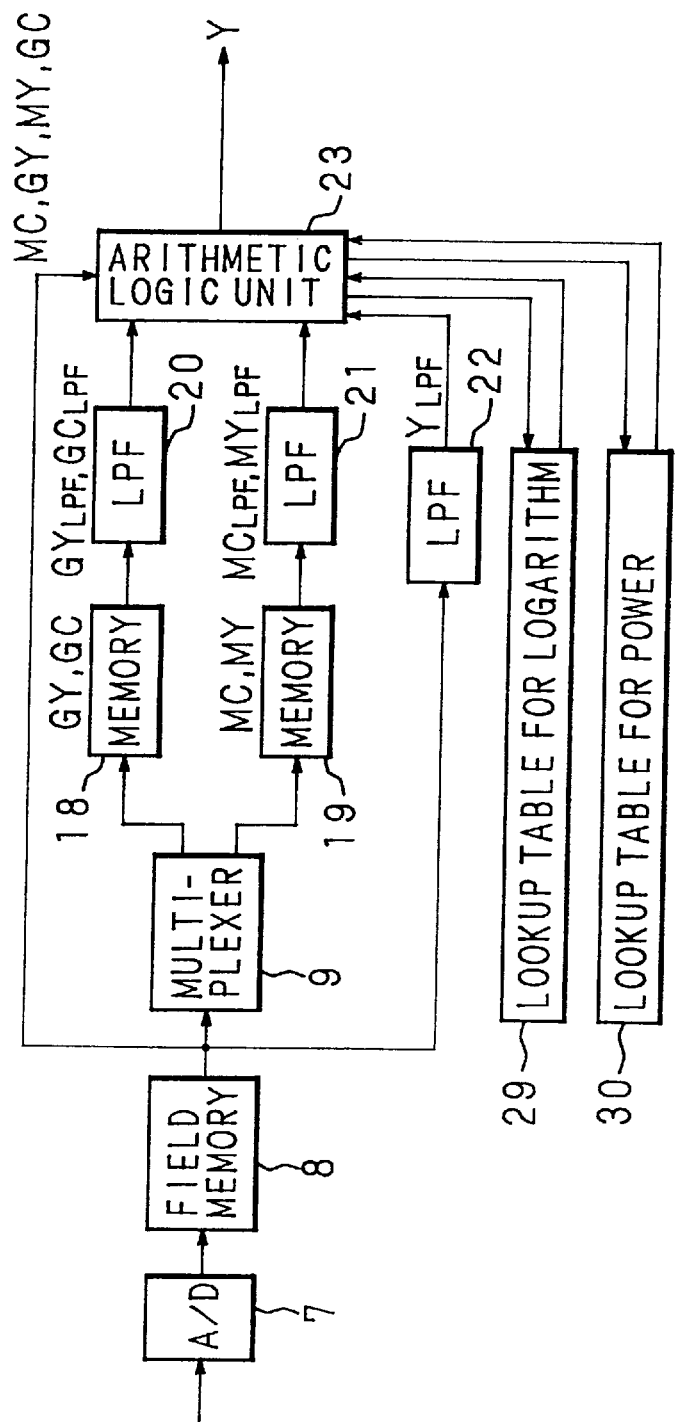
Fig. 27

COLOR VIDEO CAMERA FOR GENERATING A LUMINANCE SIGNAL WITH UNATTENUATED HARMONICS

This application is a divisional of allowed prior application Ser. No. 08/485,908 filed on Jun. 7, 1995 and allowed Dec. 24, 1996 with U.S. Pat. No. 5,652,620, which is a divisional application of Ser. No. 08/010,069 filed on Jan. 27, 1993 and issued on Sep. 12, 1995 with U.S. Pat. No. 5,450,124 the entire contents of which are hereby incorporated by reference.

BACKGROUND OF THE INVENTION

1. Field of the invention

The present invention relates to a color video camera, particularly to the method of generating luminance signals thereof.

2. Description of Related Art

FIG. 1 shows an arrangement of color filters of an image sensor described, for example, on pages 76 through 82 of "National Technical Report", Vol. 31, No.1, February 1985, composed by Matsushita Techno Research Co., Ltd. and published by Ohmsha Publishing Co., Ltd. In FIG. 1, Mg represents a pixel having a magenta color filter, G represents a pixel having a green color filter, Cy represents a pixel having a cyan color filter and Ye represents a pixel having a yellow color filter. FIG. 2 shows a part of a signal processing circuit of a color video camera which employs an image sensor consisting of these color filters arranged thereon. In FIG. 2, numeral 1 indicates a lens, numeral 2 indicates an image sensor, numeral 3 indicates a band-pass filter (BPF), numeral 4 indicates a detector, numeral 5 indicates a one horizontal period delay circuit (1HDLY), numeral 6 indicates a switching circuit and numeral 45 indicates a low-pass filter (LPF).

The operation will now be described below. In FIG. 2, incident ray on the lens 1 forms an image on the image sensor 2. In FIG. 1, an output signal from line n of the image sensor 2, consisting of a sequence of (Mg+Cy) and (G+Ye) being repeated, is denoted as Sn, and an output signal from line n+1 of the image sensor 2, consisting of a sequence of (Mg+Ye) and (G+Cy) being repeated, is denoted as S(n+1). Then Sn and S(n+1) are represented by the following equations.

$$Sn = Yn + Cn \cdot \sin(\omega t) + \ldots \quad (1)$$

$$S(n+1) = Y(n+1) + C(n+1) \cdot \sin(\omega t) + \ldots \quad (2)$$

Where $\omega$ is the carrier frequency of the color signal which corresponds to double the horizontal pixel width. Yn and Y(n+1) in equations (1) and (2) represent the luminance signal components of line n and line n+1, Cn and C(n+1) represent the color difference signal components of line n and line n+1, respectively, and are given by the following equations.

$$Yn = (Ye+G) + (Cy+Mg) = 2R + 3G + 2B \quad (3)$$

$$Y(n+1) = (Ye+Mg) + (Cy+G) = 2R + 3G + 2B \quad (4)$$

$$Cn = (Cy+Mg) - (Ye+G) = 2B - G \quad (5)$$

$$C(n+1) = (Ye+Mg) - (Cy+G) = 2R - G \quad (6)$$

The luminance signal components Yn, Yn+1 are obtained by passing the output of the image sensor 2 through the low-pass filter 45. The color difference signal components Cn, C(n+1) are obtained by passing the output of the image sensor 2 through the band-pass filter 3 having a center frequency $\omega$ and a detector 4. The output of the detector 4 gives 2R−G and 2B−G appearing every two lines. These signals 2R−G, 2B−G which appear on every other line are synchronized by the one horizontal period delay circuit 5 and the switching circuit 6.

In the conventional color video camera as described above, an output signal of the image sensor is passed through a low-pass filter to remove the modulated components of the color signal and obtain a luminance signal, resulting in a problem of the harmonics of the luminance signals being attenuated. Although aperture correction has been made by enhancing the rising edge and falling edge of the signal to improve the resolution, it causes an impression of unnatural enhancement.

FIG. 3 shows a block circuit diagram illustrating the circuit of a color video camera employing a spatial offset of 3-chip CCD color camera which is described, for example, on pages 1079 through 1085 of the "Journal of Television Engineering Association", November 1986. In FIG. 3, numeral 51 indicates a lens, numeral 52 indicates a refracting prism which decomposes incident ray into three colors of red, green and blue, numeral 53, 54, 55 indicate image sensors, numeral 56 indicates a red signal amplifier, numeral 57 indicates a green signal amplifier, numeral 58 indicates a blue signal amplifier, numeral 68 indicates a low-pass filter, numeral 71 indicates an adder and numeral 73 indicates a demultiplexer. FIG. 4 shows the constitution of output signals with the conventional method of spatial offset of 3-chip CCD color camera. In FIG. 4, G represents the signal of a green pixel, and RB represents the composite signal of red and blue pixels. Letter p indicates the horizontal pixel width of the image sensor. Green image sensors and red, blue image sensors are arranged in the horizontal direction at intervals of a half pixel width.

The operation will now be described below. In FIG. 3, incident ray on the lens 51 is decomposed into red, green and blue by the refracting prism 52, with the light rays of respective colors forming images on image sensors 53, 54, 55. Each of the image sensors 53, 54, 55 mixes signals of the upper and lower adjacent pixels to give one signal output. The output signals R, G, B of the image sensors 53, 54, 55 are amplified by the red signal amplifier 56, the green signal amplifier 57 and the blue signal amplifier 58, respectively, so that the ratio of the output signals thereof becomes, in the case of NTSC system, R:G:B=0.30:0.59:0.11, to obtain R', G', B' signals. R' and B' are mixed in the adder 71 to obtain a signal RB which combines R' and B'. The demultiplexer 73 switches alternately between G' and RB to produce an output of luminance signal, which is passed through the low-pass filter 68 to obtain a luminance signal Y. Consequently, the luminance signal Y is given by equation (7).

$$Y = 0.30R + 0.59G + 0.11B \quad (7)$$
$$= R' + G' + B'$$
$$= G' + RB$$

In the conventional method of spatial offset of 3-chip CCD color camera, the purpose is set at improving the resolution. Although there arises no problem in the case of such objects that have green signal and red-blue combined signal in similar proportions, but vertical lines appear in the case of objects which have significantly different proportions. Vertical lines have been reduced by passing the green signal and red-blue combined signal through a low-pass filter in the prior art, though it has a problem of causing attenuation of harmonics in the luminance signal. Thus resolution has been improved by enhancing the rising edge and falling edge of a signal for aperture correction, resulting in a problem of unnatural enhancement.

SUMMARY OF THE INVENTION

One object of the invention is to provide a color video camera which is capable of alleviating the attenuation of the harmonics of luminance signal.

Another object of the invention is to provide a color video camera made of low cost circuits which is capable of producing high quality image with less attenuation of the harmonics of luminance signal.

Further another object of the invention is to provide a color video camera which is capable of performing aperture correction without unnatural enhancement by means of simple circuits at a low cost.

In the color video camera of the invention, outputs from N kinds of spectral-response characteristics from one image sensor are passed through a low-pass filter to obtain outputs of N kinds from 1st through Nth, and the output signal of a pixel of the Kth spectral-response characteristic ($1 \leq K \leq N$) is multiplied by the ratio of the low-pass filter output, produced from the output of the image sensor at the coordinate of the pixel, to the Kth low-pass filter output at the coordinate of the pixel, thereby to obtain the luminance signal with lessened attenuation of the harmonics.

In another color video camera of the invention, N kinds signals obtained by adjusting the gain of the outputs from N kinds of image sensors are passed through a low-pass filter to obtain outputs of N kinds from 1st through Nth, and the output signal of the Kth pixel ($1 \leq K \leq N$) is multiplied by the ratio of the low-pass filter output, produced from the output of the image sensor at the coordinate of the pixel, to the Kth low-pass filter output at the coordinate of the pixel, thereby to obtain the luminance signal with lessened attenuation of the harmonics.

In further another color video camera of the invention, outputs from N kinds of spectral-response characteristics from one image sensor are passed through the first low-pass filter to obtain outputs of N kinds from 1st through Nth, and the output signal of a pixel of the Kth spectral-response characteristic ($1 \leq K \leq N$) is multiplied by the ratio of the first low-pass filter output, produced from the output of the image sensor at the coordinate of the pixel, to the Kth output of the first low-pass filter at the coordinate of the pixel, thereby to calculate the first signal, which is fed to the band-pass filter to obtain a second signal for aperture correction, the image sensor output is fed to the second low-pass filter to obtain a third signal and the second signal and the third signal are combined to obtain a luminance signal component, thereby performing aperture correction without unnatural enhancement.

In further another color video camera of the invention, N kinds signals obtained by adjusting the gain of the outputs from N kinds of image sensors are passed through the first low-pass filter to obtain outputs of N kinds from 1st through Nth, and the output signal of the Kth pixel ($1 \leq K \leq N$) is multiplied by the ratio of the first low-pass filter output, produced from the synthesized signals of the pixels of the respective kinds at the coordinate of the pixel, to the Kth output of the first low-pass filter at the coordinate of the pixel, to calculate the first signal which is fed to the band-pass filter to obtain the second signal for aperture correction, synthesized signal produced from N kinds of signals by adjusting the gain of the outputs of each image sensor is fed to the second low-pass filter to obtain the third signal, and the second signal and the third signal are synthesized to obtain the luminance signal, thereby performing aperture correction without unnatural enhancement.

The low-pass filter used in this invention may either be a one-dimensional low-pass filter consisting of a plurality of bit-shift circuits and an adder, or a two-dimensional low-pass filter consisting of a plurality of bit-shift circuits and a plurality of adders.

Use of a lookup table for division, a lookup table for logarithm, a lookup table for power or the like simplifies the constitution of the signal processing circuit.

The above and further objects and features of the invention will more fully be apparent from the following detailed description with accompanying drawings.

BRIEF DESCRIPTION OF THE DRAWINGS

FIG. 1 shows an example of the arrangement of color filters of an image sensor used in a color video camera.

FIG. 6 shows the signals written in the field memory.

Figure 7:
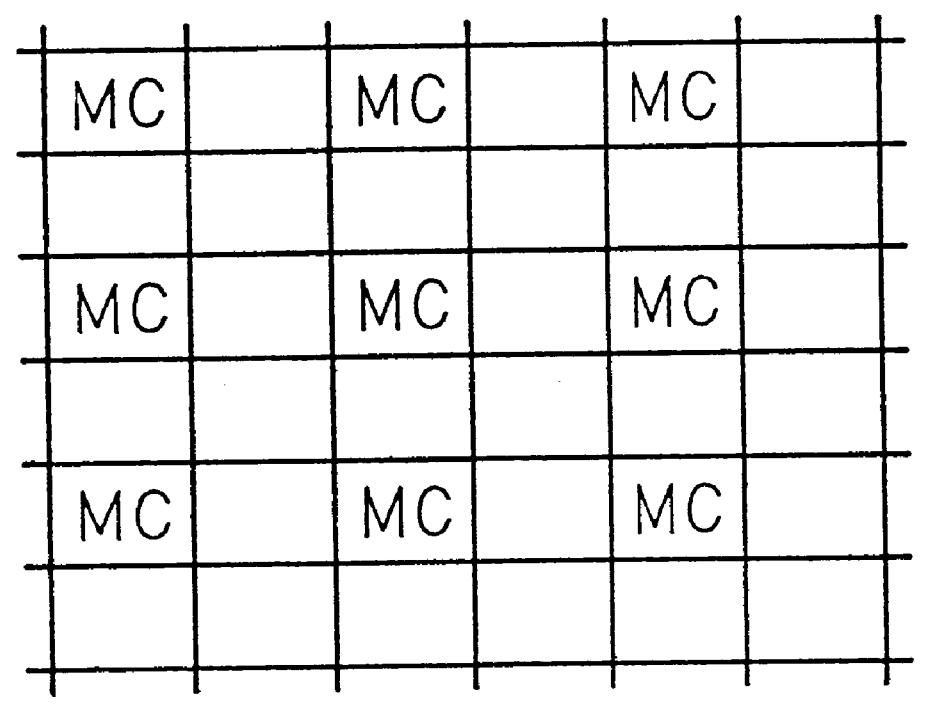

FIG. 7 shows the signals written in the two-dimensional memory.

Figure 8:
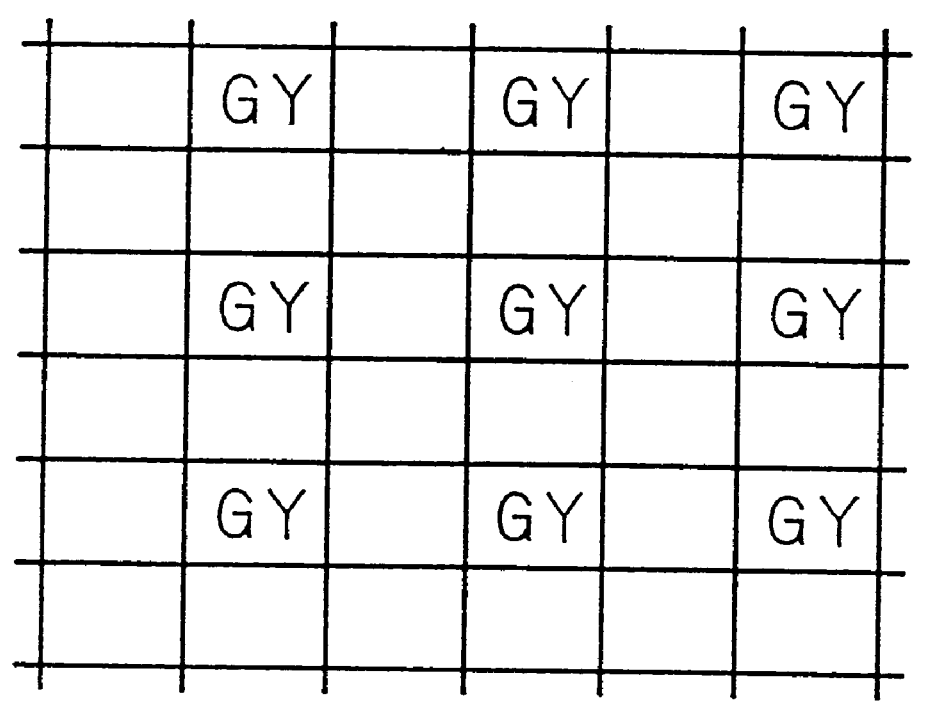

FIG. 8 shows the signals written in the two-dimensional memory.

Figure 9:
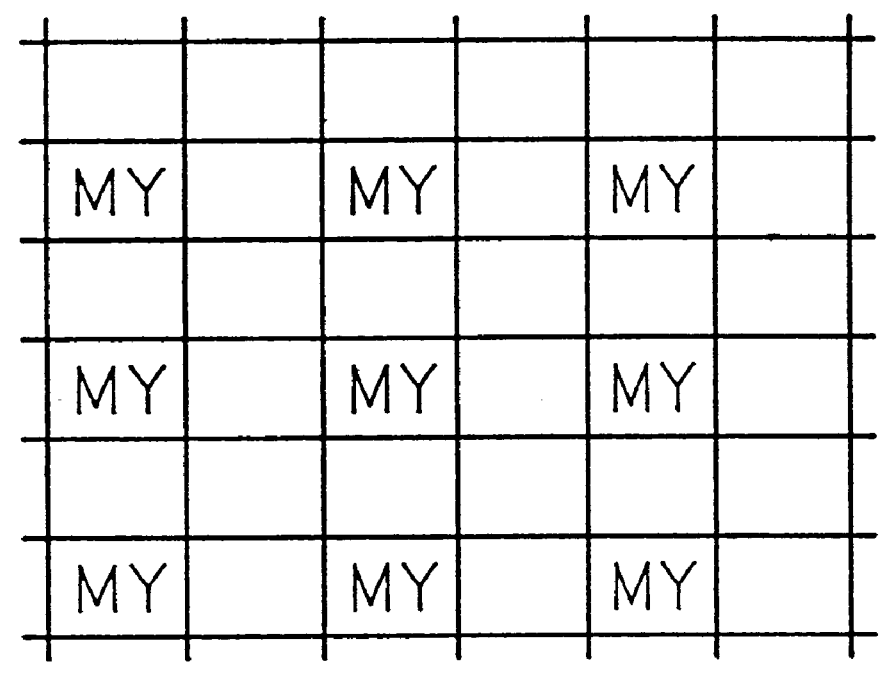

FIG. 9 shows the signals written in the two-dimensional memory.

Figure 10:
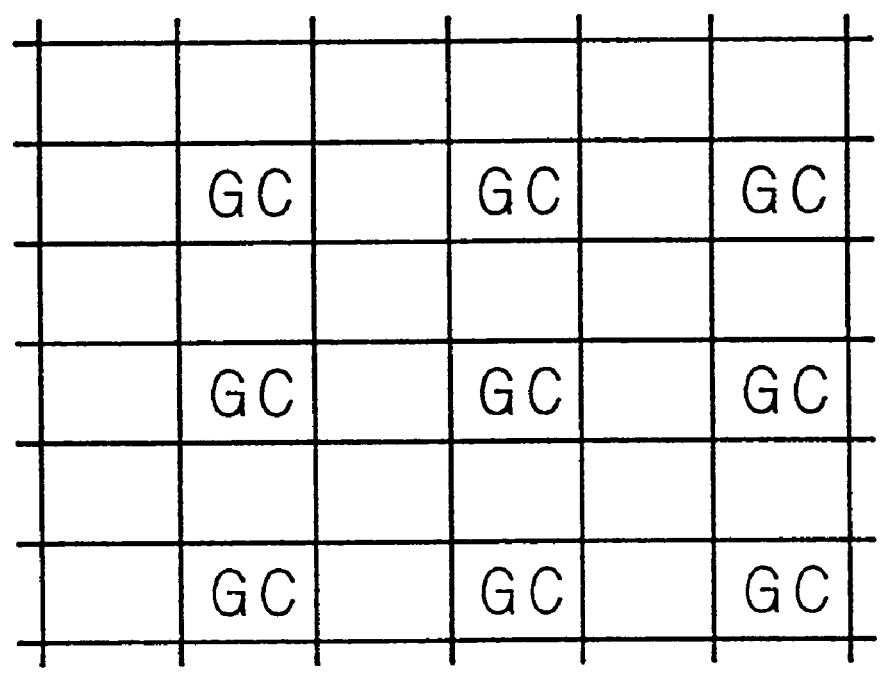

FIG. 10 shows the signals written in the two-dimensional memory.

FIG. 16 shows a block diagram illustrating the constitution of the arithmetic logic unit.

FIG. 18 shows the signals written in the one-dimensional memory.

FIG. 19 shows the output signals of the one-dimensional low-pass filter.

FIG. 27 shows a block circuit diagram illustrating further another color video camera of the present invention.

DESCRIPTION OF THE PREFERRED EMBODIMENTS

The invention will be described in detail below with reference to the drawings which illustrate the preferred embodiments.

Embodiment 1

Figure 5:
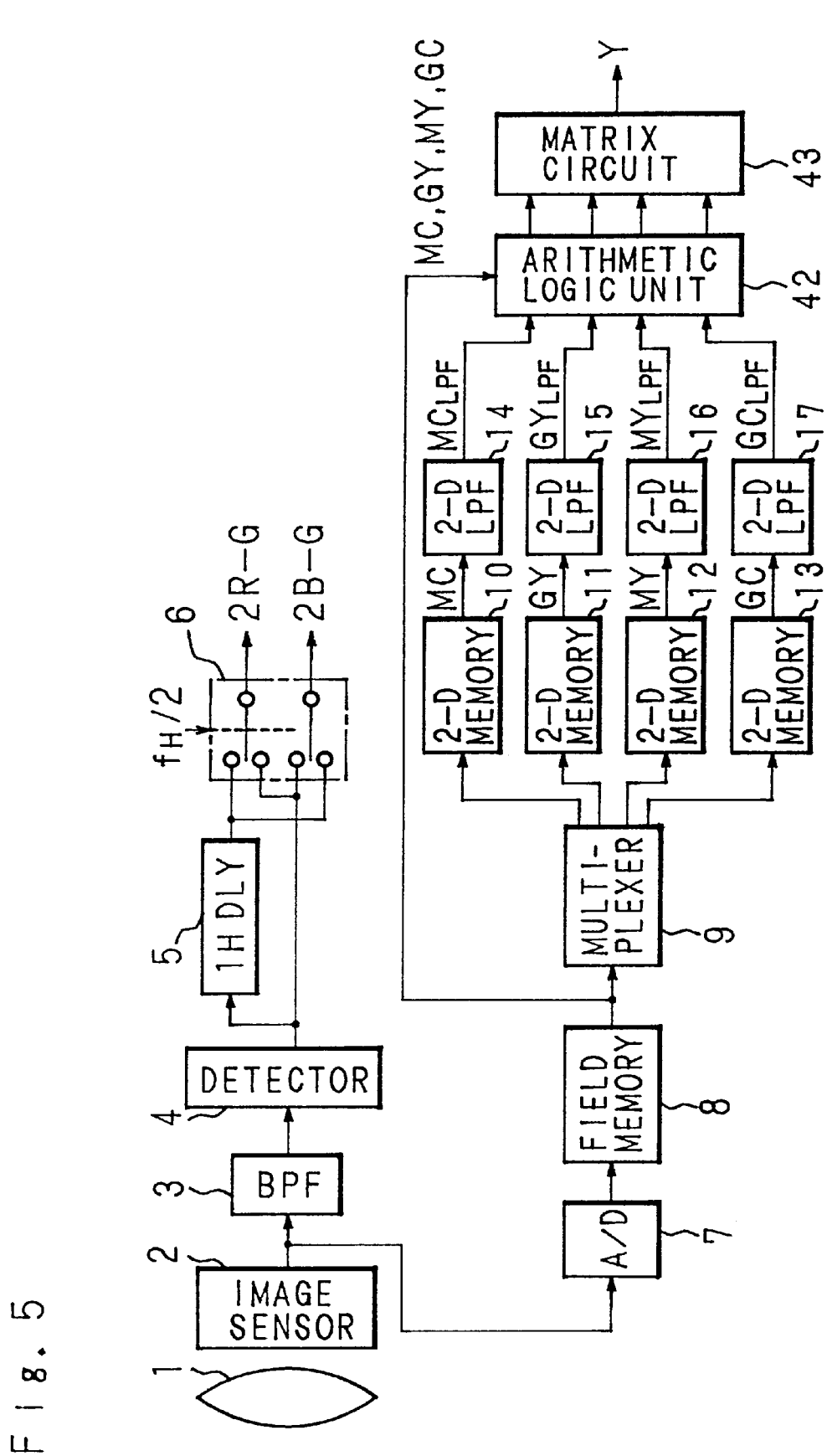
FIG. 5 shows a block circuit diagram illustrating the color video camera of the present invention.
Figure 11:
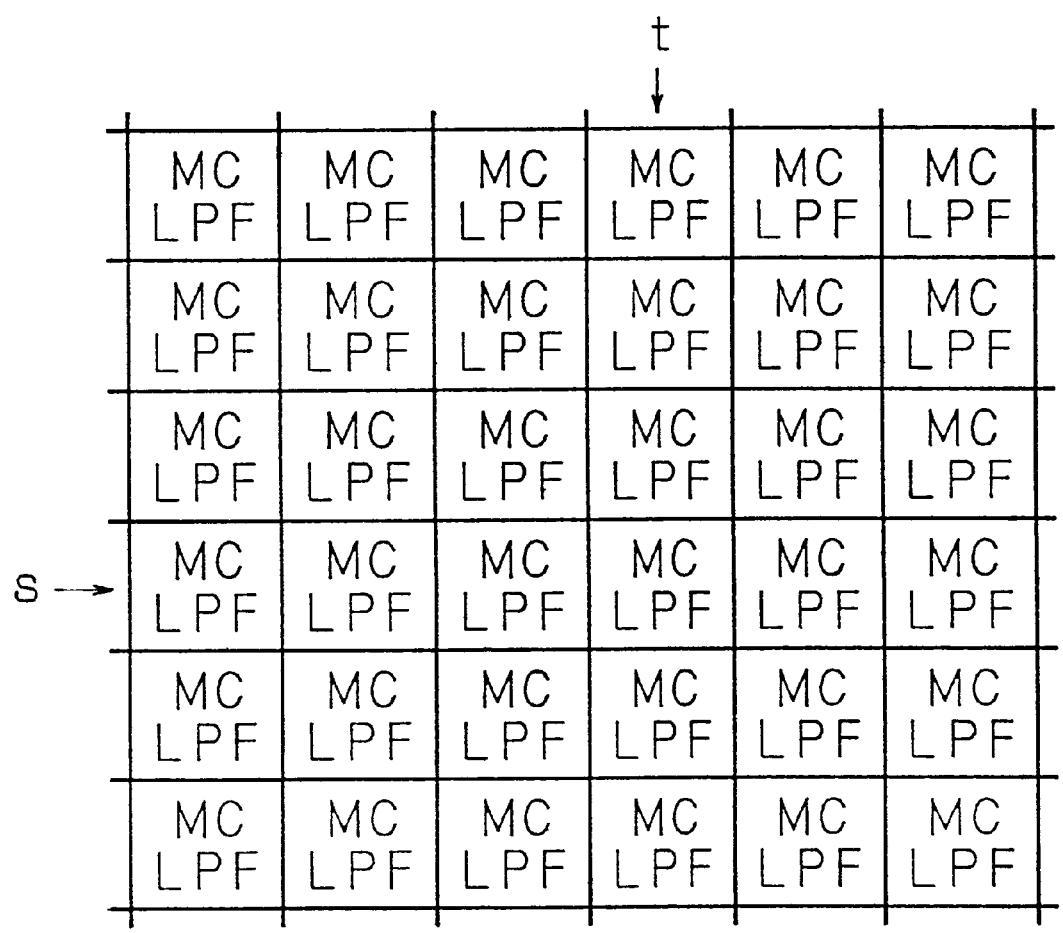
FIG. 11 shows the output signals of the two-dimensional low-pass filter.
Figure 12:
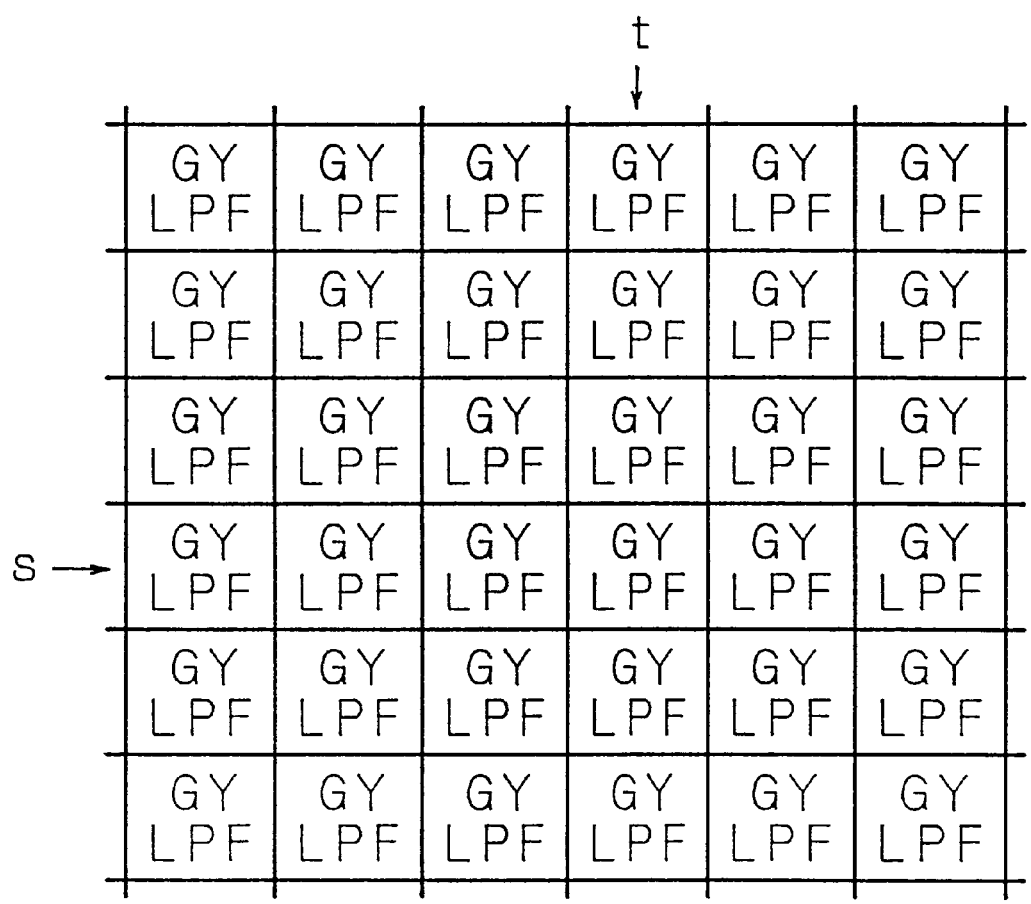
FIG. 12 shows the output signals of the two-dimensional low-pass filter.
Figure 13:
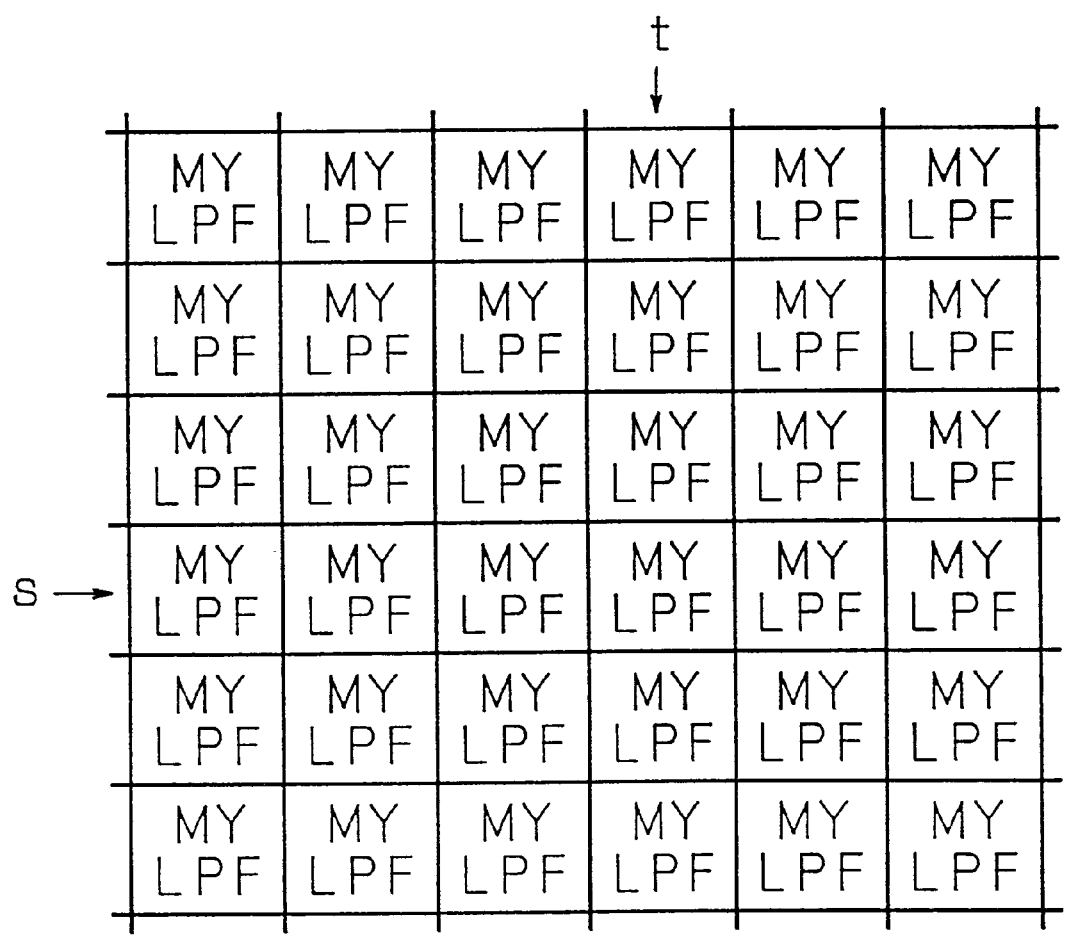
FIG. 13 shows the output signals of the two-dimensional low-pass filter.
Figure 14:
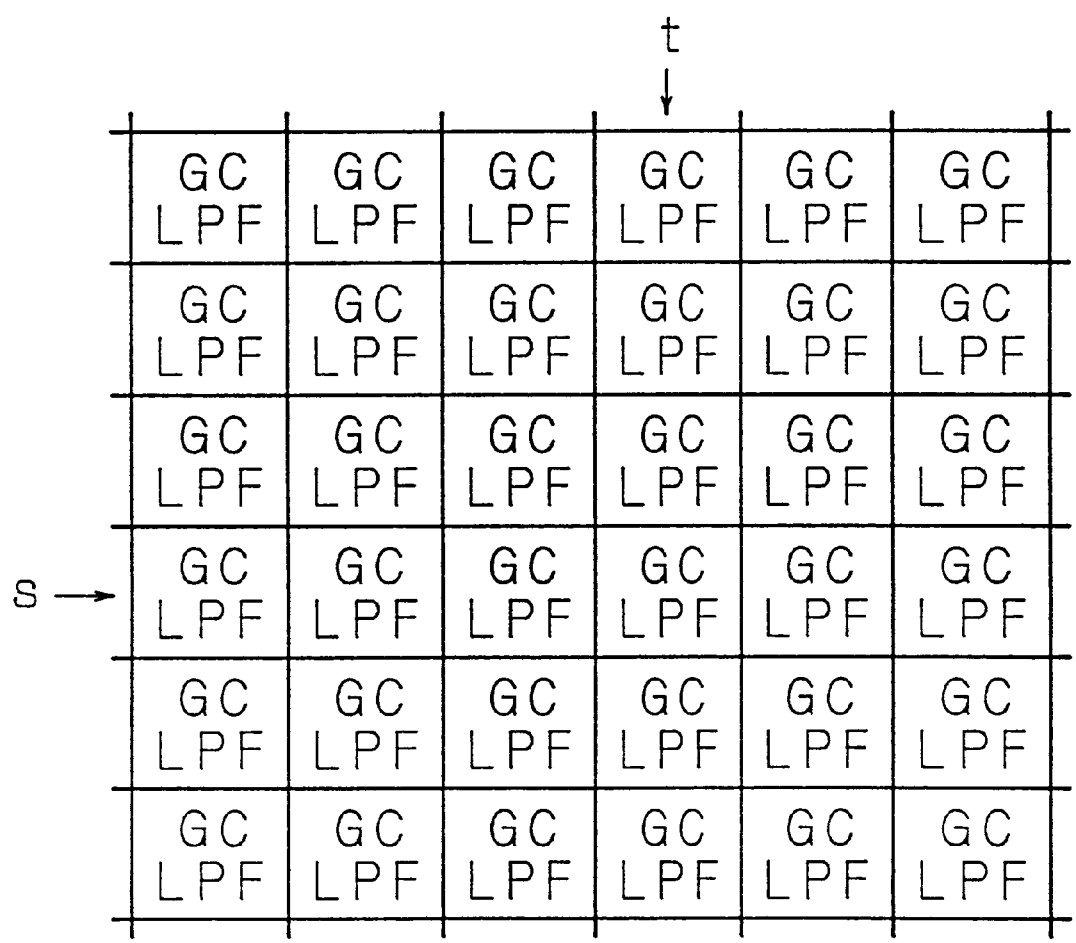
FIG. 14 shows the output signals of the two-dimensional low-pass filter.

FIG. 5 shows the block circuit diagram illustrating the color video camera in embodiment 1. In FIG. 5, numeral 1 indicates a lens, numeral 2 indicates an image sensor, numeral 3 indicates a band-pass filter (BPF), numeral 4 indicates a detector, numeral 5 indicates a one horizontal period delay circuit (1HDLY), numeral 6 indicates a switching circuit, numeral 7 indicates an A/D converter, numeral 8 indicates a field memory, numeral 9 indicates a multiplexer, numerals 10, 11, 12, 13 indicate two-dimensional memories, numerals 14, 15, 16, 17 indicate two-dimensional low-pass filters (two-dimensional LPF), numeral 42 indicates an arithmetic logic unit and numeral 43 indicates a matrix circuit.

The operation will now be described below. Incident ray on the lens 1 forms an image on the image sensor 2 having photoelectric transducers which have different spectral-response characteristics and are arranged on a two-dimensional plane. The output of the image sensor 2 is converted from analog to digital signal by the A/D converter 7 and is supplied to the field memory 8. The image sensor 2 shown in FIG. 5 mixes the signals of two upper and lower adjacent pixels to give an output. Mixed signals are written in the field memory 8 as one signal. FIG. 6 partially illustrates the configuration of writing the signals from the image sensor 2 in the field memory 8. In FIG. 6, MC represents a signal which combines the magenta pixel signal and cyan pixel signal, GY represents a signal which combines the green pixel signal and yellow pixel signal, MY represents a signal which combines the magenta pixel signal and yellow pixel signal and GC represents a signal which combines the green pixel signal and cyan pixel signal. The multiplexer 9 supplies the MC, GY, MY, GC signals separately to the two-dimensional memories 10, 11, 12, 13, respectively. FIG. 7, FIG. 8, FIG. 9, FIG. 10 show the configuration of signals written in the two-dimensional memories 10, 11, 12, 13. The signals shown in these drawings are smoothed by the two-dimensional low-pass filters 14, 15, 16, 17. FIG. 11, FIG. 12, FIG. 13, FIG. 14 show the outputs of the two-dimensional low-pass filters 14, 15, 16, 17. LPF in the drawing represents a low-pass filter output.

Arithmetic logical operation in the arithmetic logic unit 42 will be described below. In FIG. 6, the value of an output signal, when color filter of MC, GY, MY are assumed to be located at the position of GC of row s and column t for example, is calculated by equations (8) through (10).

$$MC(s,t)=GC(s,t)\times(MCLPF(s,t)/GCLPF(s,t)) \quad (8)$$

$$GY(s,t)=GC(s,t)\times(GYLPF(s,t)/GCLPF(s,t)) \quad (9)$$

$$MY(s,t)=GC(s,t)\times(MYLPF(s,t)/GCLPF(s,t)) \quad (10)$$

It is not necessary to calculate the value of GC(s,t) because equation (11) holds.

$$GC(s,t)=GC(s,t) \quad (11)$$

When it is assumed that a color filter of kind K (K is either MC, GY, MY or GC) is located at the position (s, t) of a color filter of kind J (J is either MC, GY, MY or GC), color signal K (s,t) is calculated by equation (12). (s,t) in the case of this embodiment indicates the coordinates of the field memory 8 shown in FIG. 6.

$$K(s,t)=J(s,t)\times(KLPF(s,t)/JLPF(s,t)) \quad (12)$$

Matrix computation in the matrix circuit 43 is described below. Luminance signal component Y at the position of GC at row s, column t in FIG. 6 is calculated by equation (13).

$$Y=(MC(s,t)+GY(s,t)+MY(s,t)+GC(s,t))/4 \quad (13)$$

The principle of calculating Y signal in this embodiment will be described below. If modulation component of a color signal is removed by passing the output signal of the image sensor through the low-pass filter as in the prior art, harmonics of the luminance signal will be attenuated. The method of this embodiment assumes that color change is not significant in a localized region. This implies that ratios between signals of different colors (MC, GY, MY, GC) are approximately equal to each other in the localized region. Ratios between signals of different colors MC, GY, MY and GC in a localized region are given by the ratios between two-dimensional low-pass filter outputs of MC, GY, MY and GC. When a color filter of MC is located at the position GC of row s, column t as shown by equation (8), for example, the ratio is obtained by multiplying GC(s,t) by the ratio of MC to GC at the localized region (ratio of two-dimensional low-pass filter output of MC signal to two-dimensional low-pass filter output of GC signal). Equations (9), (10), (11) are also obtained similarly. By calculating Y signal by equation (13) using MC, GY, MY, GC obtained from equations (8), (9), (10), (11), modulation component of the color signal can be removed without using the low-pass filters. Because modulation component of the color signal is removed without using the low-pass filters, it is made possible to alleviate the attenuation of the harmonics of the luminance signal.

Embodiment 2

Figure 15:
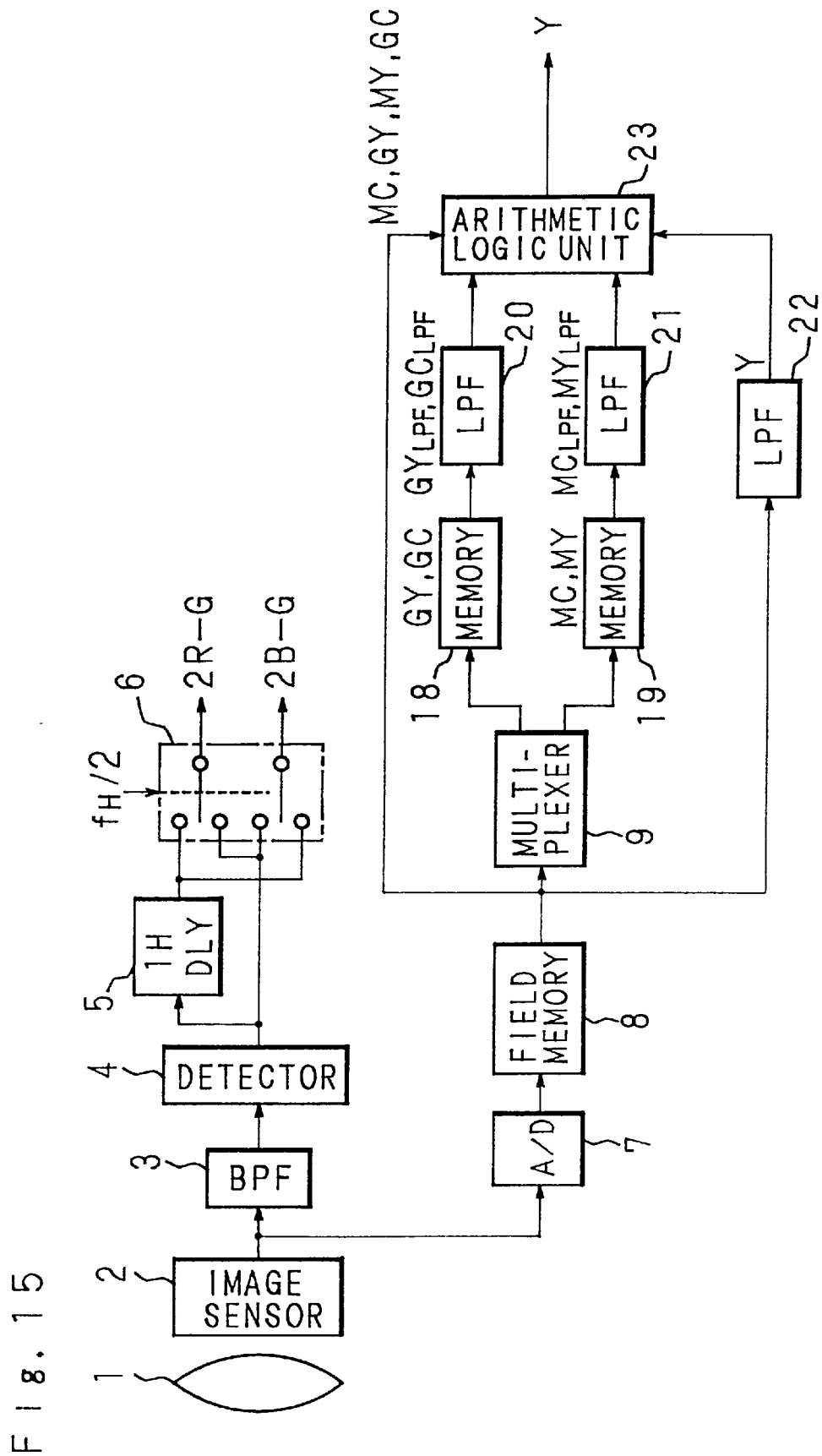
FIG. 15 shows a block circuit diagram illustrating another color video camera of the present invention.
Figure 16A:
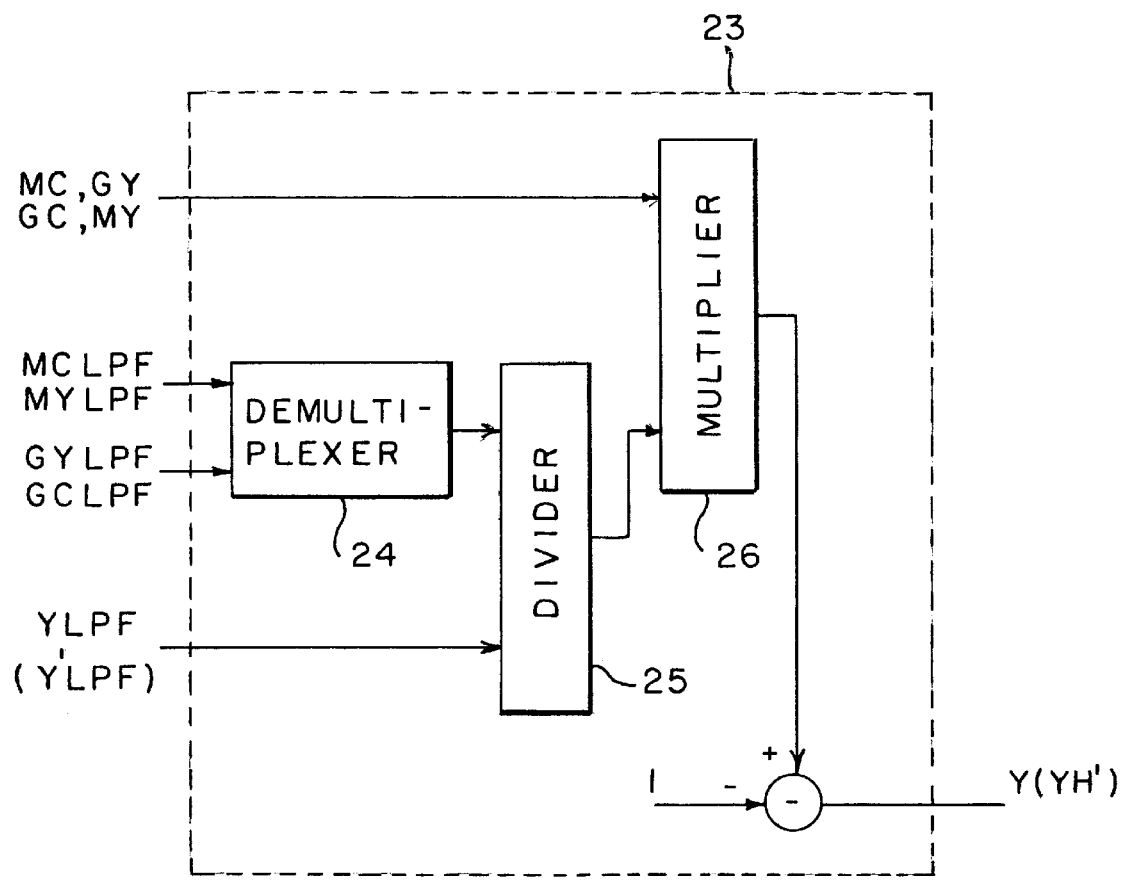
FIG. 16A shows a block diagram illustrating another constitution of the arithmetic logic unit.

FIG. 15 shows embodiment 2 of the invention where portions denoted with the same numerals as those in FIG. 5 represent the same or corresponding portions. In FIG. 15, numerals 18, 19 represent one-dimensional memories, numerals 20, 21, 22 represent one-dimensional low-pass filters (LPF) and numeral 23 represents an arithmetic logic unit. FIG. 16 shows the internal constitution of the arithmetic logic unit 23, which has a demultiplexer 24, a divider 25 and a multiplier 26.

Figure 17:
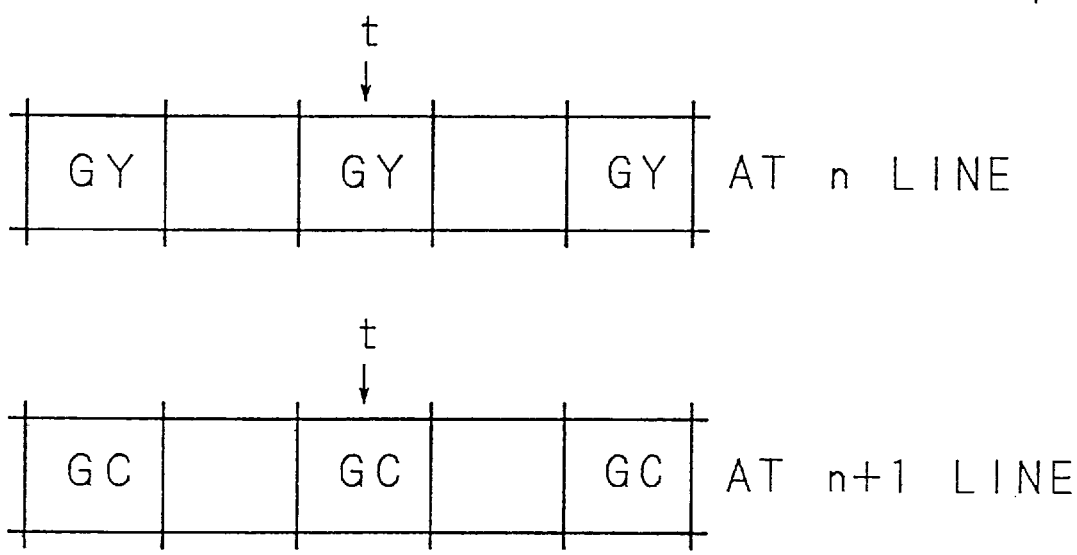
FIG. 17 shows the signals written in the one-dimensional memory.
Figure 20:
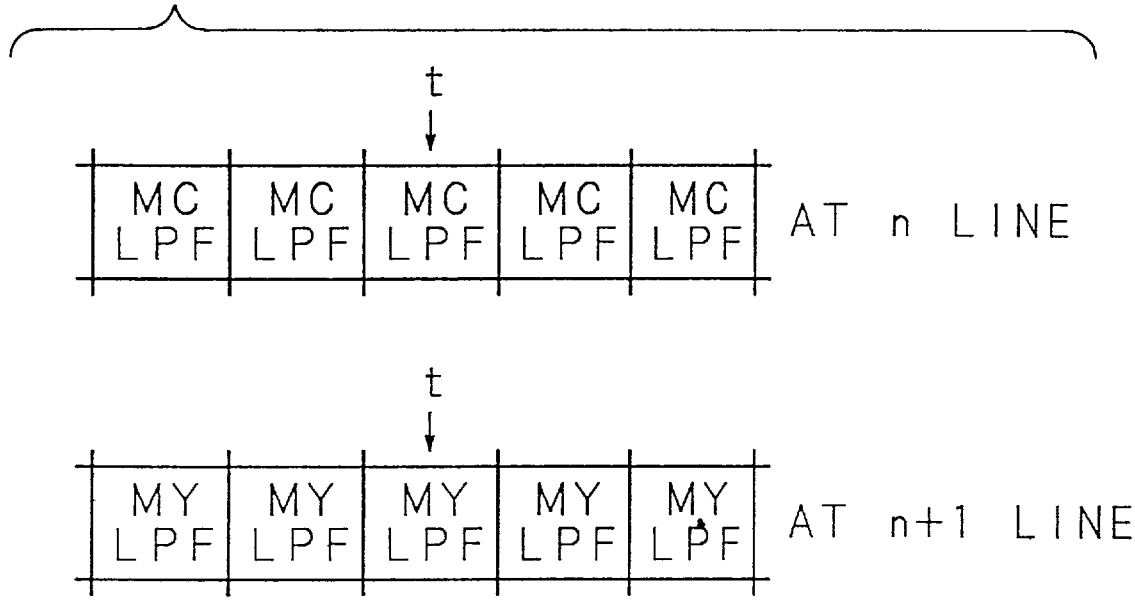
FIG. 20 shows the output signals of the one-dimensional low-pass filter.
Figure 21:
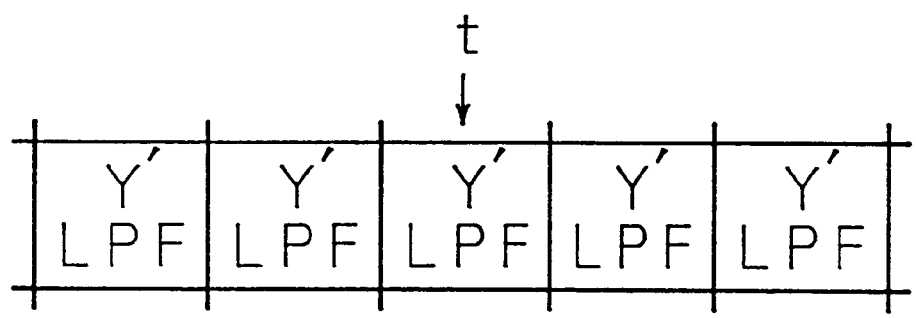
FIG. 21 shows the output signals of the one-dimensional low-pass filter.

The operation will now be described below. Similarly to the case of embodiment 1 as shown in FIG. 6, signal from the image sensor 2 is written in the field memory 8. The multiplexer 9 supplies MC, GY signals and MY, GC signals alternately to the memories 18, 19 via line n and line n+1. FIG. 17 and FIG. 18 show the configuration of signals written in the memories 18, 19. The signals shown in these drawings are smoothed by the low-pass filters 20, 21. FIG. 19, FIG. 20 show the outputs of the low-pass filters 20, 21. Output of the image sensor 2 is converted from analog to digital signal which is passed through the low-pass filter 22, to obtain low-pass filter output of Y signal. FIG. 21 shows the output of the low-pass filter 22, where LPF in the drawing is a symbol representing a low-pass filter output.

Arithmetic logical operation of the arithmetic logic unit 23 will be described below. The low-pass filter output of Y signal is fed to the divider 25 as the dividend. The demultiplexer 24 switches, in the case of line n, to the low-pass filter output of MC if the pixel is MC pixel or to the low-pass filter output of GY if the pixel is GY pixel and, in the case of line n+1, switches to the low-pass filter output of MY if the pixel is MY pixel or to the low-pass filter output of GC if the pixel is GC pixel, with the output thereof being fed to the divider 25 as the divisor. The output of the divider 25 is supplied to the multiplier 26 as the input. The output signal of the pixel is supplied to the multiplier 26. As a result, the output of the multiplier 26 is obtained as Y signal at the pixel of interest.

In FIG. 17, luminance signal component Y (t) at the position of color filter GC of column t, for example, is calculated by equation (14) below.

$$Y(t)=GC(t)\times(YLPF(t)/GCLPF(t)) \quad (14)$$

Luminance signal component Y (t) at the position t of color filter of kind K (K is either MC, GY, MY or GC) is calculated by equation (15) below. In this embodiment, letter t represents the coordinate of memory 18 shown in FIG. 17 in case the pixel is color filter of GC, GY, or represents the coordinate of memory 19 shown in FIG. 18 in case the pixel is MY, MC.

$$Y(t)=K(t)\times(YLPF(t)/KLPF(t)) \quad (15)$$

Principle of calculating Y signal in embodiment 2 will be described below. This method assumes that color change in the localized region is not significant. This implies that the ratios of signals of respective colors (MC, GY, MY, GC) to Y signal are approximately equal in a localized region. Ratios of signals of different colors MC, GY, MY and GC to Y signal in a localized region are given by the ratios of low-pass filter outputs of MC, GY, MY and GC to the low-pass filter output of Y signal.

For example, luminance signal component Y(t) at the position of GC of column t as shown by equation (14) is obtained by multiplying GC(t) by the ratio of Y to GC (ratio of the low-pass filter output of Y signal to the low-pass filter output of GC signal) in the localized region.

While harmonics of luminance signal is attenuated in the conventional method as described for embodiment 1, modulated components of color signal can be removed without attenuating the harmonics of the luminance signal in embodiment 2 as in embodiment 1.

Embodiment 3

Although constitution of the color video camera in embodiment 3 is the same as that of embodiment 2 (FIG. 15), method of calculating Y signal in the arithmetic logic unit 23 is different.

Arithmetic operation in the arithmetic logic unit 23 will be described below. In FIG. 17, if each signal is made up of eight bits to represent the hue in 256 steps, for example, and value 1 of LSB (Least Significant Bit) is employed as a constant, luminance signal component Y(t) at the position of color filter GC of column t is calculated by equation (16) as shown below.

$$Y(t)=(GC(t)+1)\times((YLPF(t)+1)/(GCLPF(t)+1))-1 \quad (16)$$

Luminance signal component Y (t) at the position t of color filter of kind K (K is either MC, GY, MY or GC) is given by equation (17) below.

$$Y(t)=(K(t)+1)\times((YLPF(t)+1)/(KLPF(t)+1))-1 \quad (17)$$

There may arise such a case as calculation of division becomes impossible due to the divisor being zero, or a great calculation error is caused by the divisor being not equal to but near zero if calculating with a small number of bits. In such a case, calculation error can be decreased by employing value 1 of LSB as in embodiment 3.

Embodiment 4

Figure 22:
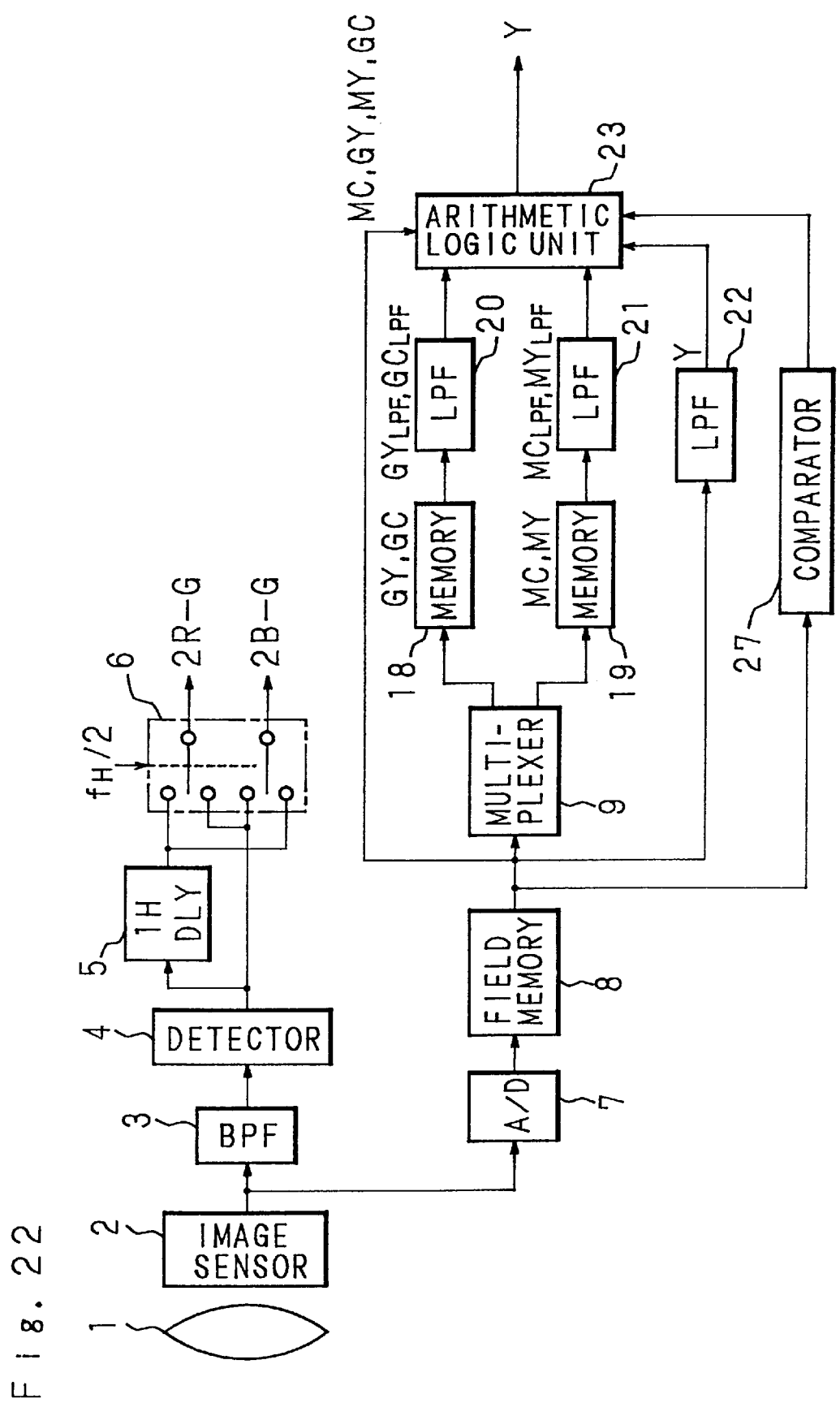
FIG. 22 shows a block circuit diagram illustrating further another color video camera of the present invention.

FIG. 22 shows a block circuit diagram illustrating a color video camera of embodiment 4. In FIG. 22, portions denoted with the same numerals as those in FIG. 15 represent the same portions. Numeral 27 represents a comparator.

The operation will now be described below. An output signal of an appropriate pixel in the vicinity of the pixel of interest is read from the field memory 8 and is fed to the comparator 27. If the difference between the output signals of pixels of the same kind is beyond a particular threshold, it is determined that the spatial frequency of the image is high and, if the difference is within the threshold, it is determined that the spatial frequency of the image is low. In a portion where the spatial frequency of the image is high, the luminance signal is calculated similarly to embodiment 2 and, in a portion where the spatial frequency of the image is low, the luminance signal is calculated from the weighted averaging value of the pixels of N kinds around the pixel of interest.

The arithmetic logic unit 23 operates as in embodiment 2 in the portion of high spatial frequency and, in the portion of low spatial frequency, luminance signal component Y(t) is calculated by equation (18) at the position of GC color filter in column t in FIG. 17 and at the position where there is no output signal of column t by equation (18).

$$Y(t)=MY(t-1)/4+GC(t)/2+MY(t+1)/4 \quad (18)$$

Assuming the position of the pixel being t, the kind of color filter of the pixel of interest being J (J is either MC, GY, MY or GC), and the kind of color filter of the right and left adjacent pixels of the pixel of interest being K (K is either MC, GY, MY or GC), the luminance signal component Y(t) is calculated by equation (19).

$$Y(t)=K(t-1)/4+J(t)/2+K(t+1)/4 \quad (19)$$

As described above, the edge-like effects due to the image contrast becoming exaggerated producing emphasized patches of light and dark, in the low frequency components arising when the number of bits of calculated data is reduced, can be suppressed by employing different methods in calculating the luminance signals between portions of high spatial frequency and low spatial frequency.

Embodiment 5

Although the constitution of the color video camera in embodiment 5 is the same as that of embodiment 4 (FIG. 22), signal processing procedures in the arithmetic logic unit 23 and in the comparator 27 are different.

In embodiment 5, difference in the output signals between right and left adjacent pixels of the pixel of interest and the particular threshold are compared. If the difference between the output signals is greater than the threshold, it is determined that the portion has a high spatial frequency and the operation of aforementioned embodiment 2 is carried out, and, if the difference between the output signals is less than the threshold, it is determined that the portion has a low spatial frequency, and the operation of aforementioned embodiment 4 is carried out.

Arithmetic operation of the comparator 27 will be described below. Assuming that, for example, the color filter located at row s, column t is GC and the color filters located at right and left adjacent pixels of the pixel of interest are MY, the result of the calculation by equation (20) below and the threshold are compared to select one of the two equations to generate the luminance signals.

$$|MY(t-1)-MY(t+1)| \quad (20)$$

Assuming that the position of the pixel of interest is t and the kind of color filters of the right and left adjacent pixels of the pixel of interest being K (K is either MC, GY, MY or GC), result of the calculation by equation (21) below and the threshold are compared to select one of two equations to generate the luminance signals.

$$|K(t-1)-K(t+1)| \qquad (21)$$

Embodiment 6

Figure 23:
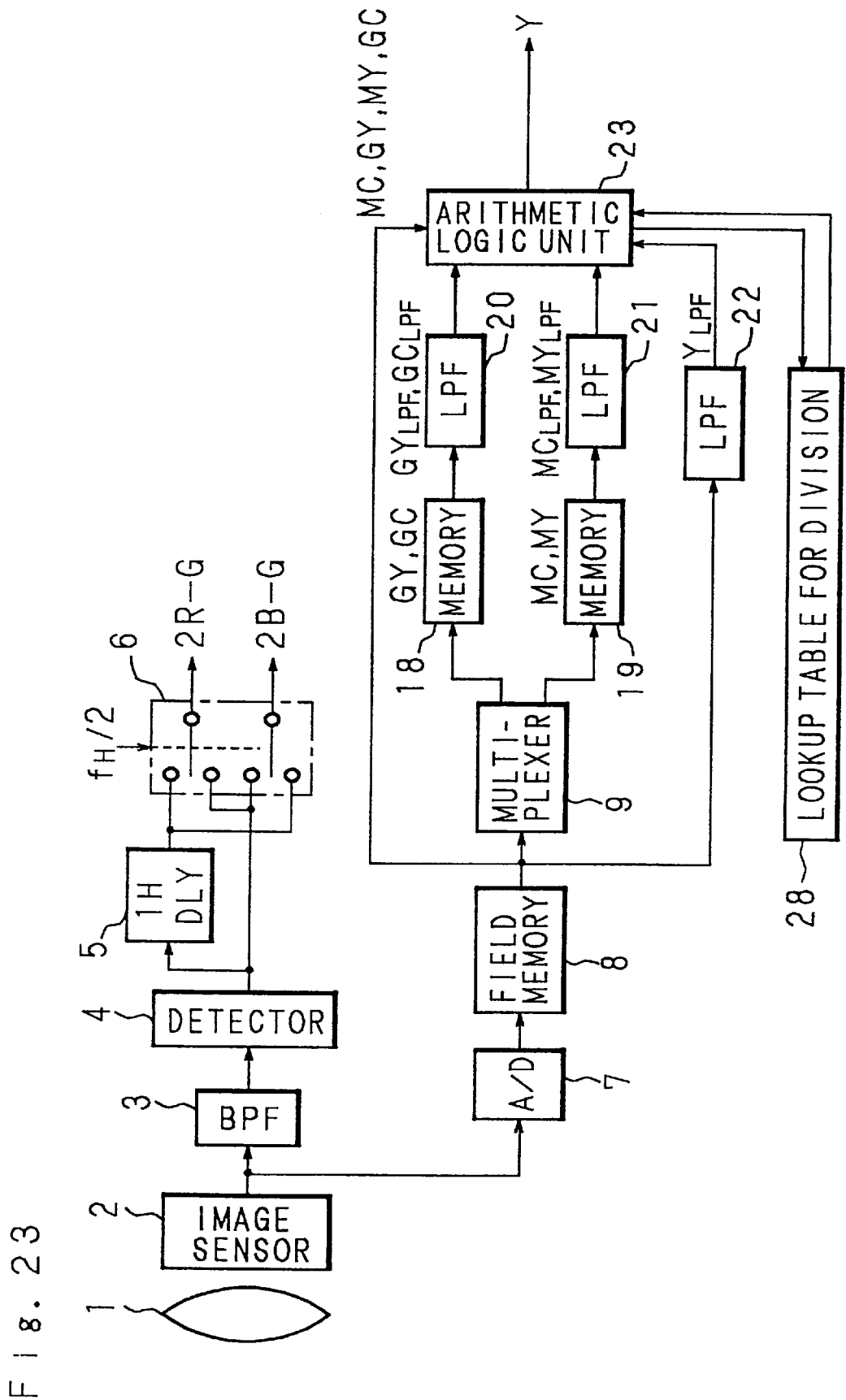
FIG. 23 shows a block circuit diagram illustrating further another color video camera of the present invention.

FIG. 23 shows a block circuit diagram of the color video camera in embodiment 6. In FIG. 23, numerals which are the same as those in FIG. 15 indicate the identical portions. Numeral 28 represents a lookup table for division.

Figure 24:
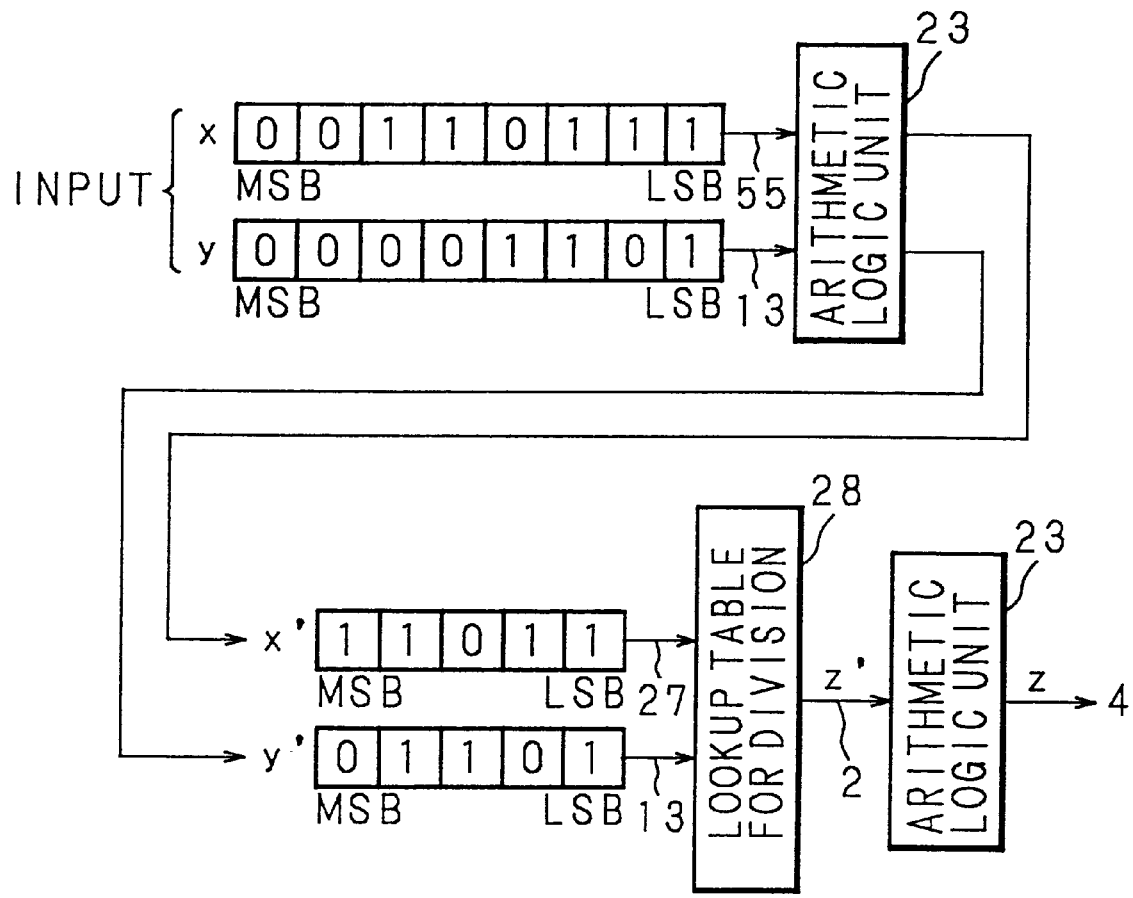
FIG. 24 shows the constitution of the lookup table for division.

Since the equation of calculation described in embodiment 2 includes a dividing operation, the lookup table for division 28 is used in embodiment 6. When 55/13 is to be calculated with 5-bit input to the lookup table for division 28 assuming that 8-bit inputs of 55 (00110111) and 13 (00001101) are given as shown in FIG. 24, for instance, upper five bits of each input are checked successively starting with the most significant bit to search for a bit of a value 1 and, if found, it is made the new most significant bit with the five bits including this and those that follow handled as the input. Namely, inputs are bit-shifted to obtain the most effective five bits such as 27 (11011) and 13 (01101). Then output 2 (00010) which corresponds to the result of division of the two inputs is obtained from the lookup table for division 28, and the number of digits thereof is raised by the number of digits which were cut off from the dividend, thereby to obtain 4 as the result of the arithmetic operation.

Assume m-bit inputs x and y and n-bit input to the lookup table for division 28 (m>n), and the most significant bit of the input is checked to see if it is 1. If it is 0, lower bits are checked successively stopping at the nth bit. If x has 1 in the ath bit (m≧a≧n) and y has 1 in the bth bit (m≧b≧n), these bits are regarded as the most significant bits thereby to obtain the upper n bits x' and y'. Namely, x' and y' are the most effective n bits with the less significant bits thereof being discarded as shown by equations (22) and (23).

$$x'=x>>(a-n) \qquad (22)$$

$$y'=y>>(b-n) \qquad (23)$$

$$z'=x'/y' \qquad (24)$$

Where >> represents a bit shift operation, with the digits of x being reduced by a−n bits and the digits of y being reduced by b−n bits. With the resultant x' and y' being fed as the inputs, an output z' is obtained from the lookup table for division 28, and bit shift operation corresponding to the number of bits which were cut off from the dividend and divisor is applied to z'. Namely, operation of equation (25) is carried out to obtain the result z.

$$z=z'>>(b-a) \qquad (25)$$

Let the output of the lookup table for division 28 be a number of eight bits, for instance, then dividing operation of the upper seven bits of the two inputs require the lookup table for division 28 to have a capacity of 131072 bits, while similar result can be obtained with the lookup table for division 28 having a capacity of 8192 bits when most effective five bits of inputs are used in the dividing operation. As a result, circuit composition of embodiment 6 is made simpler.

Embodiment 7

Although the composition of the color video camera in embodiment 7 is the same as that of embodiment 6 (FIG. 23), signal processing operations in the arithmetic logic unit 23 and the lookup table for division 28 are different.

Figure 25:
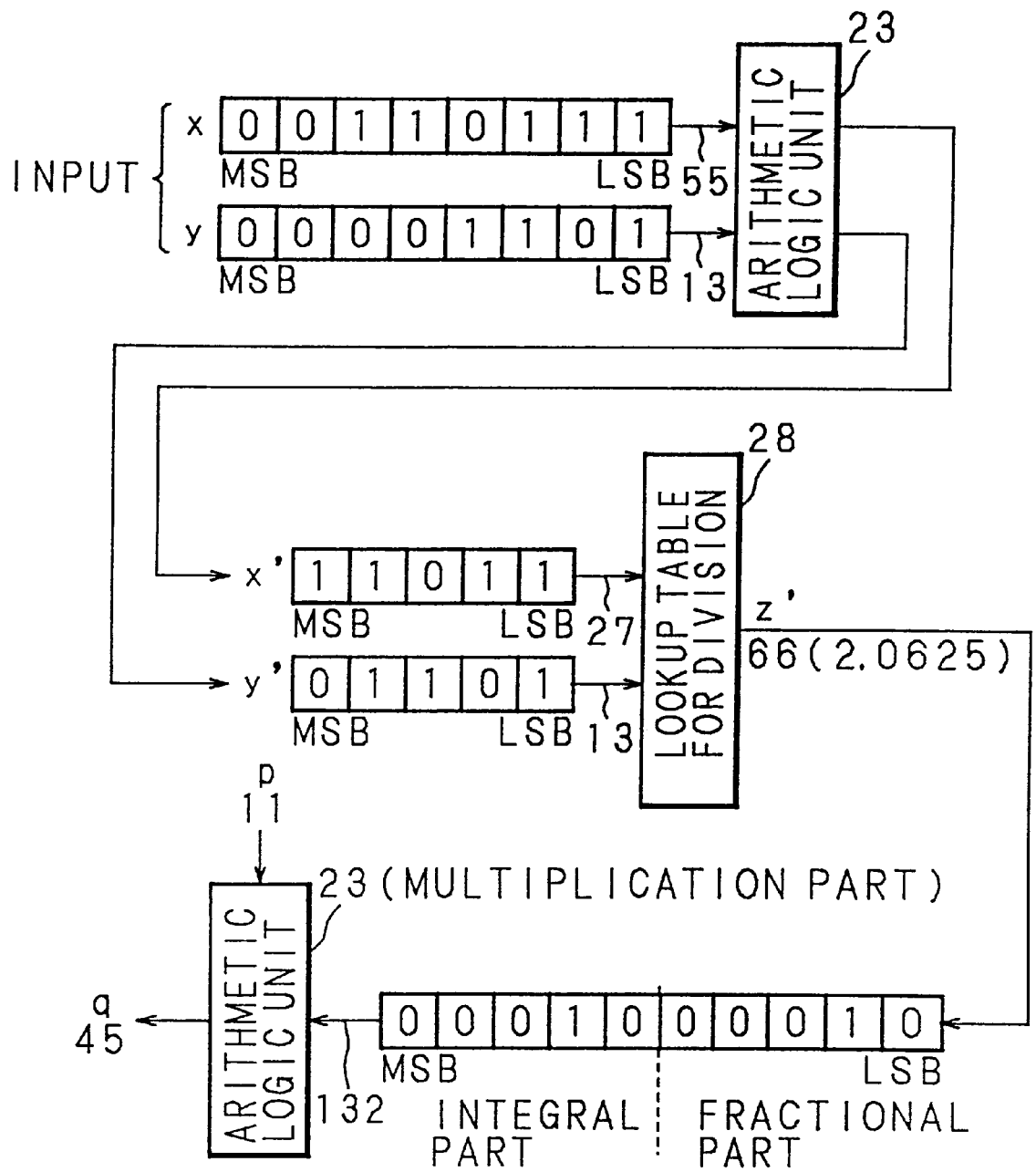
FIG. 25 shows the constitution of the lookup table for division.

The operation will now be described below. Lookup table for division 28 in embodiment 7 has five bits above decimal point and five bits below decimal point. In calculating the division of 55/13 with 5-bit inputs to the lookup table for division 28 when 8-bit inputs of 55 (00110111) and 13 (00001101) are given as shown in FIG. 25, for instance, inputs are bit-shifted to the most effective five bits such as 27 (11011) and 13 (01101). Then output 66 (0001000010) which corresponds to the result of the division of the two inputs is obtained from the lookup table for division 28, and its number of digits is raised by the number of digits which were cut off from the dividend. Thus 132 is obtained as the result of the arithmetic operation. Then this result of the division is used in the multiplication by the equation described in embodiment 2, with the lower five bits being cut off to discard the fractional part of the lookup table for division 28. Assuming the value of the multiplier to be 11, 45 is obtained from the above calculation.

Assume that m-bit inputs x and y are given, an n-bit input is fed to the lookup table for division 28 (m>n) to obtain a 2n-bit output comprising an integral part of n bits and a fractional part of n bits (m>n), x includes the first 1 in the ath bit from the MSB (m≧a≧n), y includes the first 1 in the bth bit from the MSB (m≧b≧n), most effective n-bit parts of x and y are x' and y', respectively, which are fed to the lookup table for division 28 as inputs to obtain an output z', and bit shift is applied corresponding to the number of bits which were cut off the dividend and divisor, to obtain z as the result of calculation. Then the value of z is used in the multiplication described in embodiment 2 with the result being shifted down by n bits to discard the fractional part of the lookup table for division 28. Assuming the value of multiplier being p, the result of calculation q is given by equation (26) as shown below.

$$q=(p \times z)>>n \qquad (26)$$

As described above, precision of calculation can be increased by obtaining an output with the number of bits twice that of the input from the lookup table for division 28 to obtain the fractional part as the output, then multiplying with this output.

Embodiment 8

Figure 26:
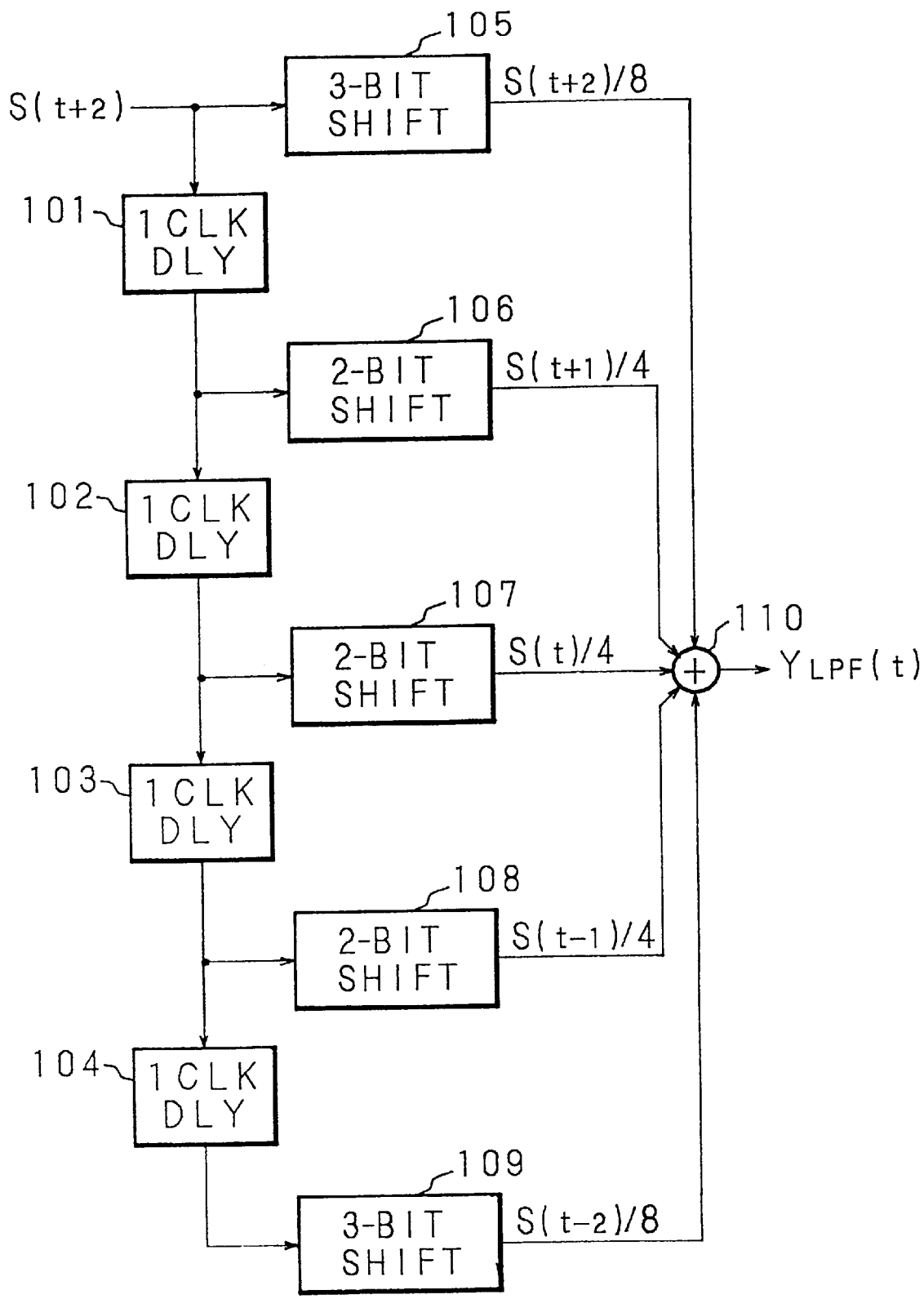
FIG. 26 shows the constitution of the one-dimensional low-pass filter.

The composition of the color video camera in embodiment 8 is the same as that of embodiment 2 (FIG. 15). In embodiment 8, low-pass filter is used as a digital filter. The low-pass filter is made up of only bit shift circuits such as, for example, the number of horizontal taps being set to 5 with weightings ⅛, ¼, ¼, ¼ and ⅛. FIG. 26 shows the composition of the one-dimensional low-pass filter. In FIG. 26, 101 through 104 are one clock delay circuits (1CLKDLY), 105 and 109 are 3-bit shift circuits, 106 through 108 are 2-bit shift circuits, and 110 is an adder.

Assume that an image sensor output S(t+2) is fed to the one-dimensional low-pass filter of such a composition. The 3-bit shift circuit 105 feeds S(t+2)/8 to the adder 110. Output S(t+1) of the image sensor delivered at the time one clock earlier is fed via the one clock delay circuit 101 to the 2-bit shift circuit 106 to obtain an output S(t+1)/4. Similarly, outputs S(t)/4, S(t−1)/4 and S(t−2)/8 are obtained from the 2-bit shift circuits 107, 108 and the 3-bit shift circuit 109. Accordingly, the output of the adder 110 becomes such an output as represented by equation (27), and low-pass filter output YLPF(t) for the image sensor output at position t of the pixel of interest can be obtained.

$$YLPF(t)=S(t+2)/8+S(t+1)/4+S(t)/4+S(t-1)/4+S(t-2)/8 \qquad (27)$$

While the process described above is applied to the low-pass filter output for the image sensor output, the low-pass filter output of the pixel of the Jth color filter at position t of the pixel of interest can be obtained by using a two clock delay circuit instead of one clock delay circuit, because the Jth color filters are arranged at every other pixel.

Embodiment 9

Although the composition of the color video camera in embodiment 9 is the same as that of embodiment 2 (FIG. 15), method of calculating the luminance signal in the arithmetic logic unit 23 is different.

In embodiment 3, luminance signal is obtained by adding 1 to each of the multiplier, divisor and dividend and subtracting 1 from the result of calculation to minimize the calculation error, as expressed by the equations (16) and (17). However, as the number 1 is LSB which has no significant effect on the result of calculation, subtraction of 1 at the end may be omitted for the simplification of the circuit. Embodiment 9 is an example of such simplification. Luminance signal component Y(t) at the position of GC color filter of column t is calculated by the equation (28) below.

$$Y(t)=(GC(t)+1)\times((YLPF(t)+1)/(GCLPF(t)+1)) \quad (28)$$

Luminance signal component Y(t) at position t of color filter of kind K (K is either MC, GY, MY or GC) is expressed by the equation (29) below.

$$Y(t)=(K(t)+1)\times((YLPF(t)+1)/(KLPF(t)+1)) \quad (29)$$

Embodiment 9 is also capable of reducing the calculation error similarly to embodiment 3.

Embodiment 10

FIG. 27 shows a block circuit diagram of the color video camera in embodiment 10. In FIG. 27, numerals which are the same as those in FIG. 15 indicate the identical portions. Numeral 29 represents a lookup table for logarithm and numeral 30 represents a lookup table for power.

The operation will now be described below. Luminance signal component Y(t) in case the kind of color filter of the pixel at position t is K (K is either MC, GY, MY or GC) is given by the equation (29) below as described in embodiment 9. Now apply logarithmic conversion with base x in equation (29) as shown in equation (30), where ^ represents power.

$$Y(t) = x^{\wedge}\log x\{(K(t)+1)\times((YLPF(t)+1)/(KLPF(t)+1))\} \quad (30)$$
$$= x^{\wedge}\{\log x(K(t)+1) + \log x(YLPF(t)+1) -$$
$$\log x(KPLF(t)+1)\}$$

If all coefficients used in equation (30) are given in 8-bit numbers and the output of the lookup table for logarithm 29 is given with 10 bits, the capacity requirement is 2560 bits. After calculating the logarithmic part by means of the lookup table for logarithm 29, addition and subtraction are carried out to calculate the power. Because the power can be represented sufficiently with 11 bits, 8-bit output from the lookup table for power 30 requires a capacity of 16384 bits. Consequently, calculation of the equation (29) can be done with a lookup table which has a capacity of 18944 bits in total, making it possible to further simplify the circuit composition.

Although embodiment 10 is described in a case where luminance signal is calculated from the equation of embodiment 9, it is a matter of course that the method of calculation which employs the lookup table for logarithm and the lookup table for power may be applied to embodiment 2.

Embodiment 11

Figure 28:
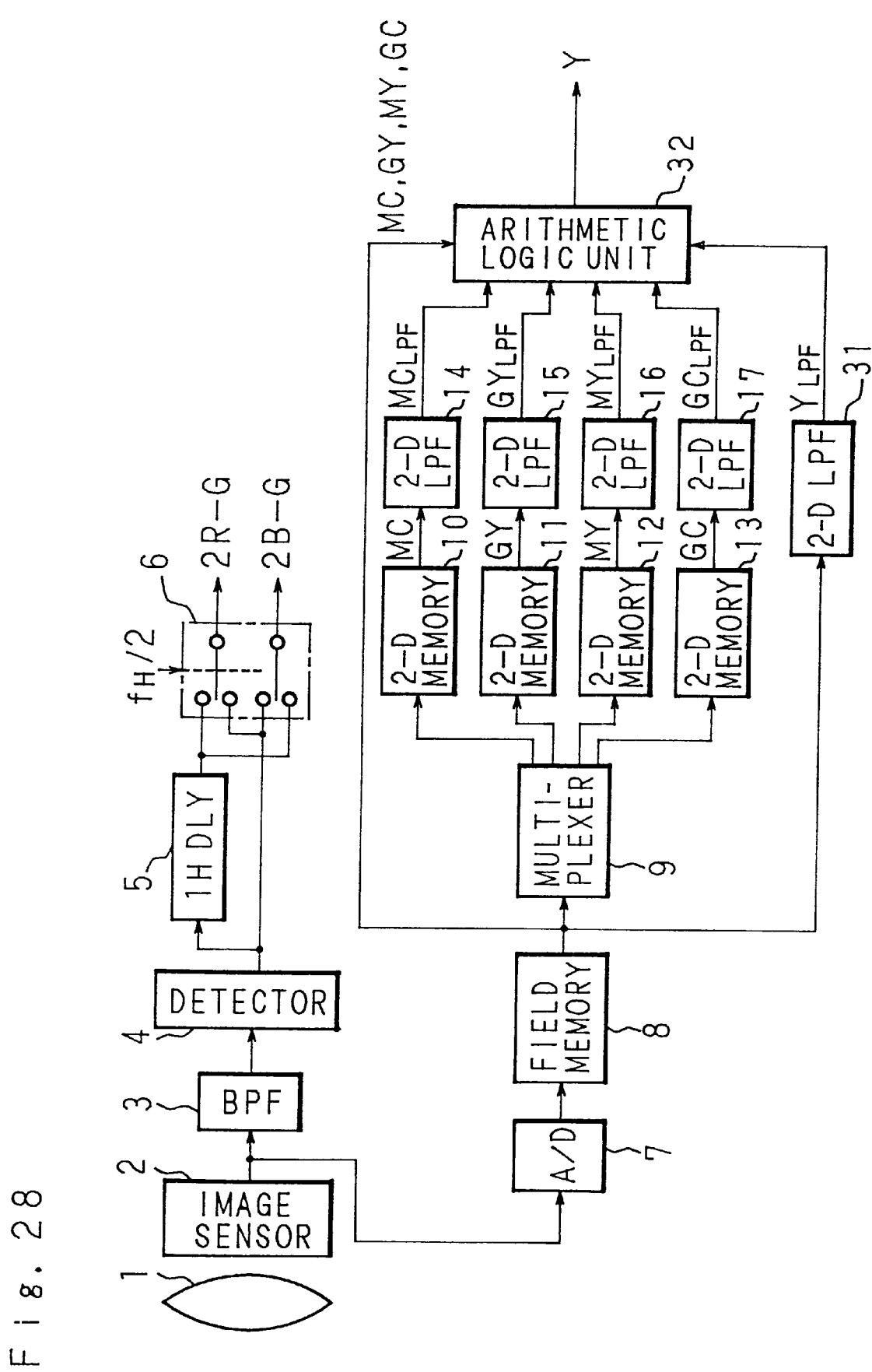
FIG. 28 shows a block circuit diagram illustrating further another color video camera of the present invention.
Figure 29:
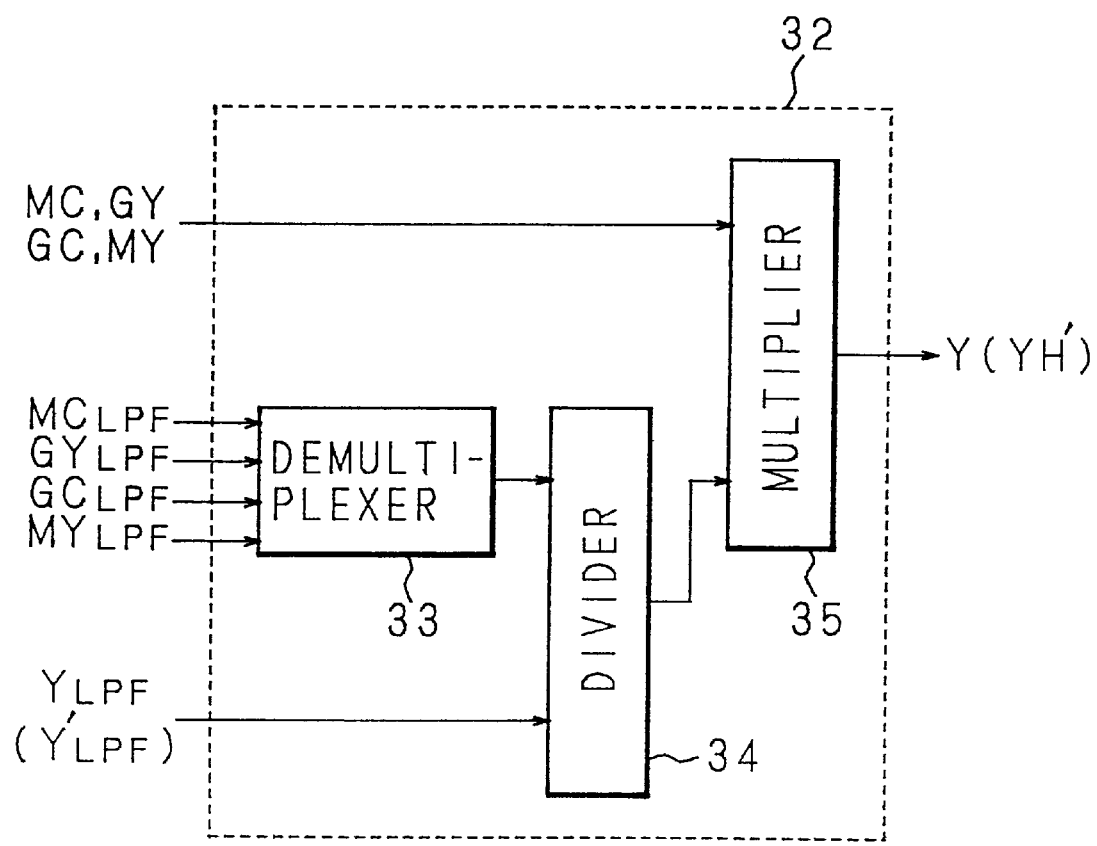
FIG. 29 shows a block circuit diagram illustrating the constitution of the arithmetic logic unit.

FIG. 28 shows a block circuit diagram of the color video camera in embodiment 11. In FIG. 28, numerals which are the same as those in FIG. 5 indicate the identical portions and will not be explained here. In FIG. 28, numeral 31 represents a two-dimensional low-pass filter (LPF) for luminance signal Y and numeral 32 represents an arithmetic logic unit. FIG. 29 shows the internal construction of the arithmetic logic unit 32 which has a demultiplexer 33, a divider 34 and a multiplier 35.

Figure 30:
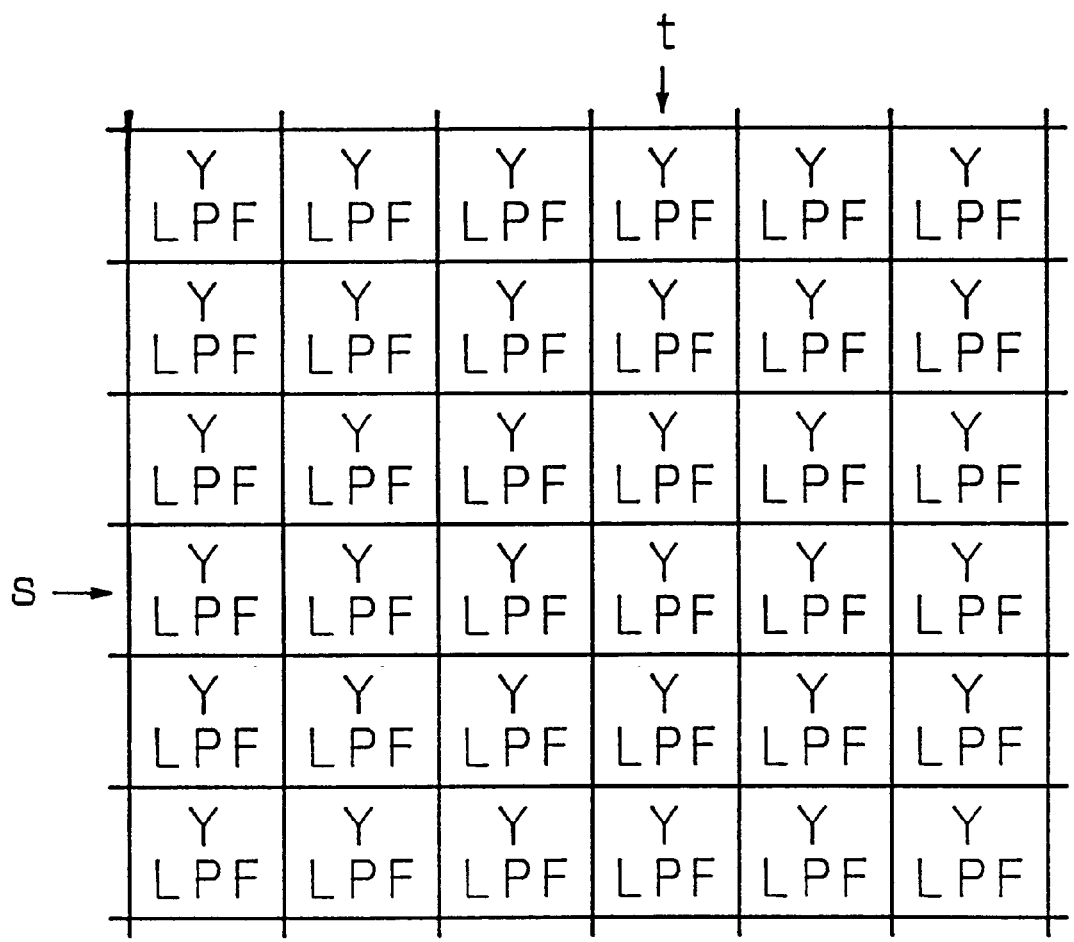
FIG. 30 shows the output signals of the two-dimensional low-pass filter.

The operation will now be described below. Basic operation is the same as that of embodiment 1. The output of the image sensor is fed from the field memory 8 to the two-dimensional low-pass filter 31, and output YLPF of the two-dimensional low-pass filter as shown in FIG. 30 is obtained.

The arithmetic operation in the arithmetic logic unit 32 will be described below. Two-dimensional low-pass filter output of Y signal is fed to the divider 34 as the dividend. The demultiplexer 33 switches to the two-dimensional low-pass filter output of MC if the pixel of interest is MC pixel, to the two-dimensional low-pass filter output of GY if the pixel of interest is GY pixel, to the two-dimensional low-pass filter output of MY if the pixel of interest is MY pixel, or to the two-dimensional low-pass filter output of GC if the pixel of interest is GC pixel, with the output being fed to the divider 34 as the divisor. The output of this divider 34 is fed to the multiplier 35 as the input. The output signal of the pixel of interest is also fed to the multiplier 35 as the input. Thus the output of the multiplier 35 is obtained as the luminance signal Y of the pixel of interest.

Embodiment 11 is an example of using two-dimensional low-pass filters instead of one-dimensional low-pass filters in embodiment 2. In FIG. 6, luminance signal component Y(s,t) at the position of color filter GC of row s, column t is calculated by equation (31).

$$Y(s,t)=GC(s,t)\times(YLPF(s,t)/GCLPF(s,t)) \quad (31)$$

Luminance signal component Y(s,t) at the position (s,t) of color filter of kind K (K is either MC, GY, MY or GC) is given by the equation (32) below, where (s,t) represents the coordinates of the field memory 8.

$$Y(s,t)=K(s,t)\times(YLPF(s,t)/KLPF(s,t)) \quad (32)$$

Calculation of Y signal in this embodiment is basically the same as that of embodiment 2, and is capable of eliminating the modulated component of the color signal without reducing the harmonics of the luminance signal.

Embodiment 12

Although the composition of the color video camera in embodiment 12 is the same as that of embodiment 11 (FIG. 28), method of calculating Y signal in the arithmetic logic unit 32 is different.

The arithmetic operation in the arithmetic logic unit 32 will be described below. In FIG. 6, if each signal is made up of eight bits to represent the hue in 256 steps, for example, and value 1 of LSB is employed as a constant, luminance signal component Y(s,t) at the position of color filter GC of row s, column t is calculated by equation (33) as shown below.

$$Y(s,t)=(GC(s,t)+1)\times((YLPF(s,t)+1)/GCLPF(s,t)+1))-1 \quad (33)$$

Luminance signal component Y(s,t) at position (s,t) of color filter of kind K (K is either MC, GY, MY or GC) is given by the equation (34) below.

$$Y(s,t)=(K(s,t)+1)\times((YLPF(s,t)+1)/(KLPF(s,t)+1))-1 \quad (34)$$

Embodiment 13

Figure 31:
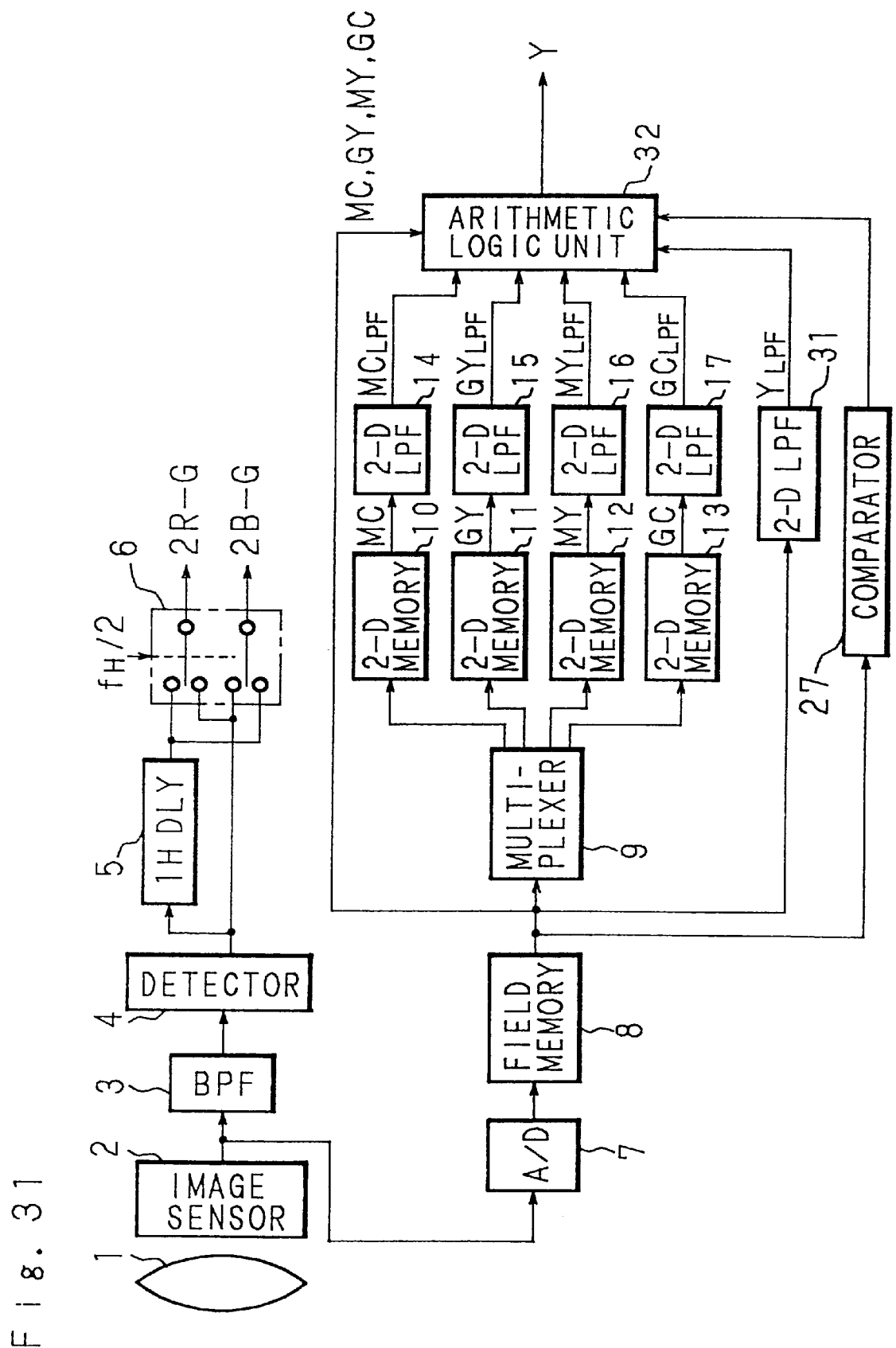
FIG. 31 shows a block circuit diagram illustrating further another color video camera of the invention.

FIG. 31 shows a block circuit diagram of the color video camera in embodiment 13. In FIG. 31, symbols which are the same as those in FIG. 28 indicate the identical portions and numeral 27 represents a comparator which resembles that of FIG. 22 (embodiment 4).

The operation will now be described below. As in the case of embodiment 4, the difference between output signals of pixels of the same kind which are fed to the comparator 27 from the field memory 8 is compared to a particular threshold to determine whether the spatial frequency of the image is high or low. In a portion of high spatial frequency, luminance signal is calculated similarly to embodiment 11 and, in a portion of low spatial frequency, luminance signal is calculated from the weighted averaging value of the outputs of the pixels of N kinds in the vicinity of the pixel of interest.

The arithmetic logic unit 32 operates similarly to that in embodiment 11 in the portion of high spatial frequency. In a portion of low spatial frequency, for example, luminance signal component Y(s,t) at the position of color filter GC of row s, column t in FIG. 6 is calculated by equation (35).

$$Y(s, t) = MC(s-1, t-1)/16 + GY(s-1, t)/8 + \quad (35)$$
$$MC(s-1, t+1)/16 + MY(s, t-1)/8 +$$
$$GC(s, t)/4 + MY(s, t+1)/8 +$$
$$MC(s+1, t-1)/16 + GY(s+1, t)/8 +$$
$$MC(s+1, t+1)/16$$

Assuming the position of the pixel of interest as (s,t), kind of color filter of the pixel of interest as J (J is either MC, GY, MY or GC), kind of the color filter of the right and left adjacent pixels of the pixel of interest as K (K is either MC, GY, MY or GC), kind of the color filter of the upper and lower adjacent pixels of the pixel of interest as L (L is either MC, GY, MY or GC), and the kind of the color filter of the diagonally adjacent pixels of the pixel of interest as M (M is either MC, GY, MY or GC), then luminance signal component Y(s,t) is calculated by the equation (36) below.

$$Y(s, t) = M(s-1, t-1)/16 + L(s-1, t)/8 + \quad (36)$$
$$M(s-1, t+1)/16 + K(s, t-1)/8 +$$
$$J(s, t)/4 + K(s, t+1)/8 +$$
$$M(s+1, t-1)/16 + L(s+1, t)/8 +$$
$$M(s+1, t+1)/16$$

Embodiment 14

Although the composition of the color video camera in embodiment 14 is the same as that of embodiment 13 (FIG. 31), signal processing operations in the arithmetic logic unit 32 and in the comparator 27 are different.

In embodiment 14, difference between the output signals of right and left pixels or between the output signals of the upper and lower pixels of the pixel of interest is compared to a particular threshold. And it is determined that the portion has high spatial frequency if the difference between the output signals is greater than the threshold, and accordingly the operation in embodiment 11 is carried out, and, it is determined that the portion has low spatial frequency if the difference between the output signals is less than the threshold, and accordingly the operation in embodiment 13 is carried out.

For example, the results of the calculations described below are compared to the threshold at the position of the color filter of GC at row s, column t in FIG. 6, to select one of the methods of generating luminance signal.

$$|MY(s,t-1)-MY(s,t+1)| \quad (37)$$

$$|GY(s-1,t)-GY(s+1,t)| \quad (38)$$

Assuming the position of the pixel of interest as (s,t), the kind of the color filter of right and left adjacent pixels of the pixel of interest as J (J is either MC, GY, MY or GC), and the kind of the upper and lower adjacent pixels of the color pixel of interest as K (K is either MC, GY, MY or GC), the results of the calculations below are compared to the threshold to select one of the methods of generating luminance signal.

$$|J(s,t-1)-J(s,t+1)| \quad (39)$$

$$|K(s-1,t)-K(s+1,t)| \quad (40)$$

Embodiment 15

Although the composition of the color video camera in embodiment 15 is the same as that of embodiment 13 (FIG. 31), signal processing operations in the arithmetic logic unit 32 and in the comparator 27 are different.

In embodiment 15, difference between the output signals of the pixels of the same kind of spectral response characteristic in the vicinity of the pixel of interest is compared to a particular threshold. And it is determined that the portion has high spatial frequency if the difference between the output signals is greater than the threshold, and the operation of embodiment 11 is carried out, and, it is determined that the portion has low spatial frequency if the difference between the output signals is less than the threshold, and the operation of embodiment 13 is carried out.

For example, assuming that the color filter at the position of coordinate (s,t) of the pixel of interest is GC, the color filter at the positions of the right and left adjacent pixels of the pixel of interest is MY, the color filter at the positions of the upper and lower adjacent pixels of the pixel of interest is GY, and the color filter at the positions of the diagonally adjacent pixels of the pixel of interest is MC as shown in FIG. 6, then the results of the calculations below are compared to the threshold to select one of the methods of generating luminance signal.

$$|MY(s,t-1)-MY(s,t+1)| \quad (41)$$

$$|GY(s-1,t)-GY(s+1,t)| \quad (42)$$

$$|MC(s-1,t-1)-MC(s+1,t+1)| \quad (43)$$

$$|MC(s-1,t+1)-MC(s+1,t-1)| \quad (44)$$

Assuming the position of the pixel of interest as (s,t), the kind of the color filter of the right and left adjacent pixels of the pixel of interest as J (J is either MC, GY, MY or GC), the kind of the color filter of the upper and lower adjacent pixels of the color pixel of interest as K (K is either MC, GY, MY or GC), and the kind of the color filter of the diagonally adjacent pixels of the pixel of interest as L (L is either MC, GY, MY or GC), then the results of the calculations below are compared to the threshold to select one of the methods of generating luminance signal.

$$|J(s,t-1)-J(s,t+1)| \qquad (45)$$

$$|K(s-1,t)-K(s+1,t)| \qquad (46)$$

$$|L(s-1,t-1)-L(s+1,t+1)| \qquad (47)$$

$$|L(s-1,t+1)-L(s+1,t-1)| \qquad (48)$$

Embodiment 16

Although the composition of the color video camera in embodiment 16 is the same as that of embodiment 13 (FIG. 31), signal processing operations in the arithmetic logic unit 32 and in the comparator 27 are different.

In embodiment 16, difference between the output signals of the diagonally adjacent pixels interposing the pixel of interest is compared to a particular threshold. And it is determined that the portion has high spatial frequency if the difference between the output signals is greater than the threshold, and the operation in embodiment 11 is carried out, and, it is determined that the portion has low spatial frequency if the difference between the output signals is less than the threshold, and the operation in embodiment 13 is carried out.

For example, the results of the calculations shown below are compared to the threshold at the position of the color filter of GC at row s, column t in FIG. 6, to select one of the methods of generating luminance signal.

$$|MC(s-1,t-1)-MC(s+1,t+1)| \qquad (49)$$

$$|MC(s+1,t-1)-MC(s-1,t+1)| \qquad (50)$$

Assuming the position of the pixel of interest as (s,t), the kind of the diagonally adjacent pixels of the color filter of the pixel of interest as J (J is either MC, GY, MY or GC), the results of the calculations shown below are compared to the threshold to select one of the methods of generating luminance signal.

$$|J(s-1,t-1)-J(s+1,t+1)| \qquad (51)$$

$$|J(s+1,t-1)-J(s-1,t+1)| \qquad (52)$$

Embodiment 17

Figure 32:
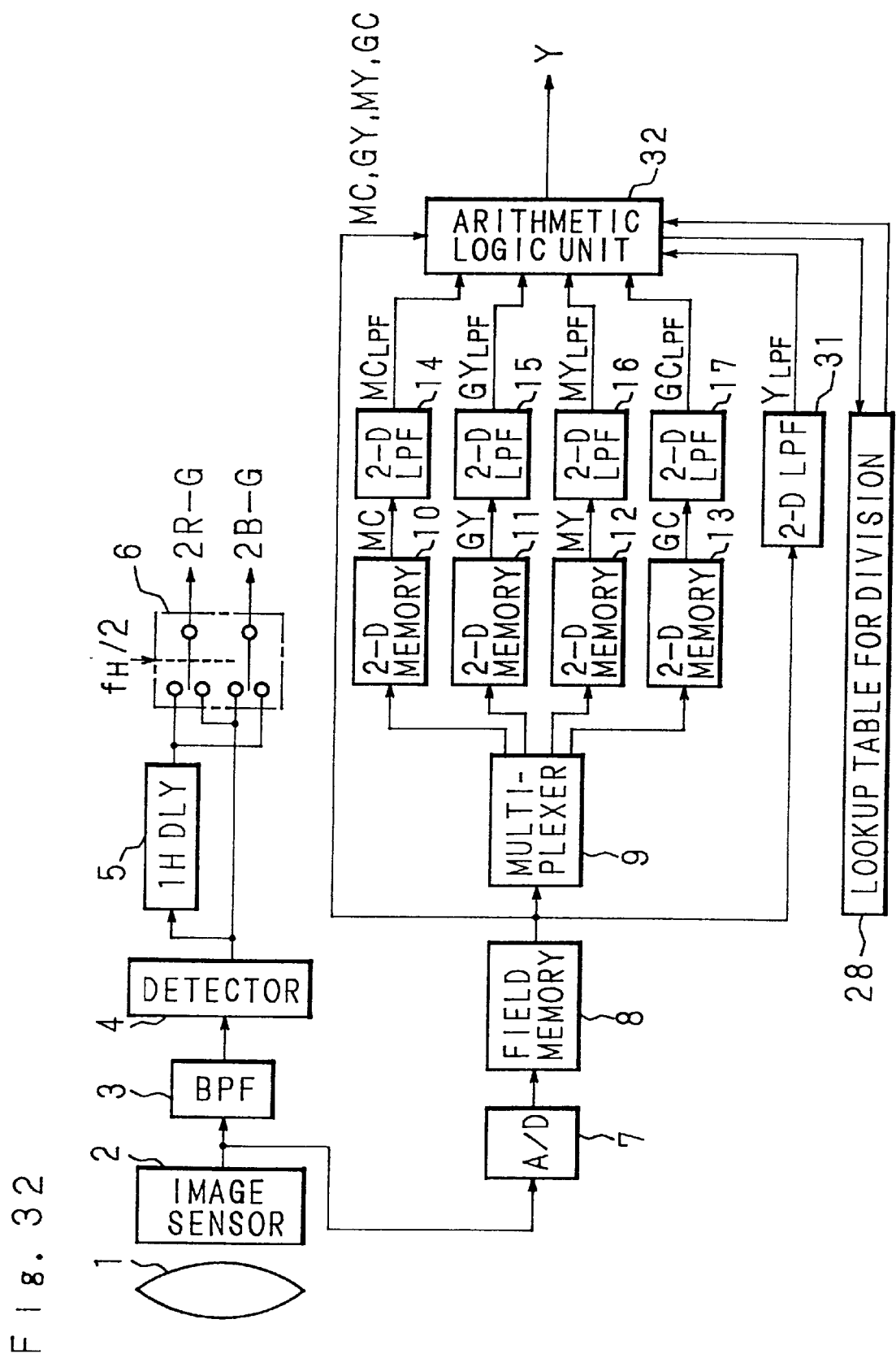
FIG. 32 shows a block circuit diagram illustrating further another color video camera of the invention.

FIG. 32 shows a block circuit diagram of the color video camera in embodiment 17. Symbols which are the same as those of FIG. 28 indicate the identical portions and numeral 28 represents a lookup table for division which is similar to that of FIG. 23 (embodiment 6).

The operation in the lookup table for division 28 is the same as that of embodiment 6, and will not be described here.

Embodiment 18

Application of the calculation method of embodiment 7 with respect to embodiment 6 to the above embodiment 17 is the embodiment 18. The operation in embodiment 18 is the same as that of embodiment 7, and will be omitted.

Embodiment 19

Figure 33:
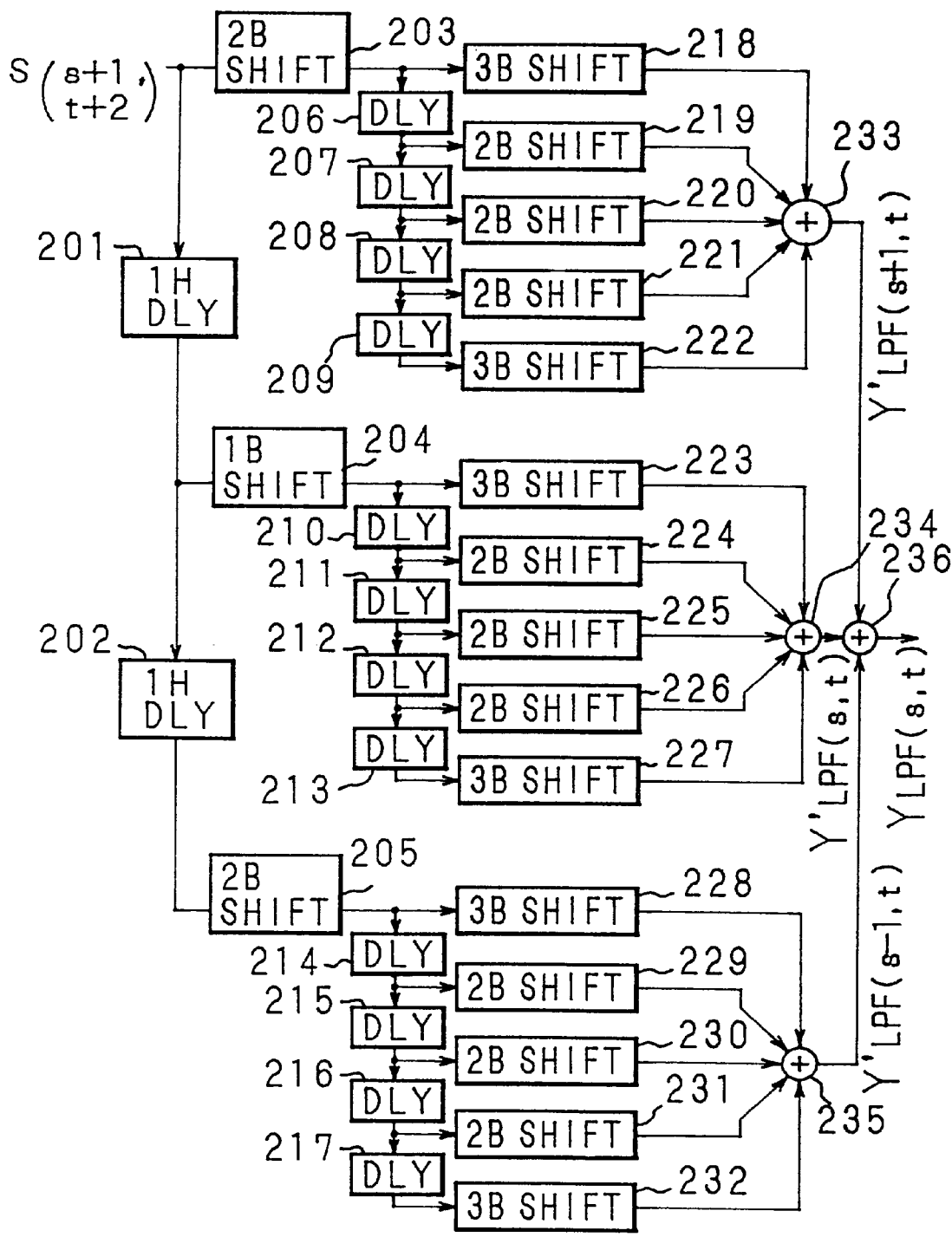
FIG. 33 shows the constitution of the two-dimensional low-pass filter.

The composition of the color video camera in embodiment 19 is the same as that of embodiment 11 (FIG. 28). In embodiment 19, a two-dimensional low-pass filter is used as a digital filter. The filter is made up of only bit shift circuits such as, for example, the number of horizontal taps is set to 5, number of vertical taps being 3, the weightings are ⅛, ¼, ¼, ¼, ⅛ for the horizontal direction and ¼, ½, ¼, for the vertical direction. FIG. 33 shows the composition of the two-dimensional low-pass filter. In FIG. 33, 201 and 202 are one horizontal period delay circuits (1HDLY), 204 is a 1-bit shift circuit (1B SHIFT), 203, 205, 219 through 221, 224 through 226 and 229 through 231 are 2-bit shift circuits (2B SHIFT), 218, 222, 223, 227, 228, 232 are 3-bit shift circuits (3B SHIFT), 206 through 217 are one clock delay circuits (DLY) and 233 through 236 are adders.

Assume that an image sensor output S(s+1,t+2) is fed to the two-dimensional low-pass filter of such a composition. The output of the 2-bit shift circuit 203 is S(s+1,t+2)/4 and the output of the 3-bit shift circuit 218 is S(s+1,t+2)/32. Output S(s+1,t+1)/4 of the image sensor delivered at the time one clock earlier is fed via the one clock delay circuit 206 to the 2-bit shift circuit 219 to obtain an output S(s+1,t+1)/16. Similarly, outputs S(s+1,t)/16, S(s+1,t−1)/16 and S(s+1,t−2)/32 are obtained from the 2-bit shift circuits 220, 221 and the 3-bit shift circuit 222. Accordingly, the output of the adder 233 is given as Y'LPF(s+1,t) expressed by equation (53).

$$Y'LPF(s+1,t)=S(s+1,t+2)/32+S(s+1,t+1)/16+S(s+1,t)/16+S(s+1,t-1)/16+S(s+1,t-2)/32 \qquad (53)$$

Similarly, the output of the adder 234 is given as Y'LPF (s,t) expressed by equation (54).

$$Y'LPF(s,t)=S(s,t+2)/16+S(s,t+1)/8+S(s,t)/8+S(s,t-1)/8+S(s,t-2)/16 \qquad (54)$$

Similarly, the output of the adder 235 is given as Y'LPF (s−1,t) expressed by equation (55).

$$Y'LPF(s-1,t)=S(s-1,t+2)/32+S(s-1,t+1)/16+S(s-1,t)/16+S(s-1,t-1)/16+S(s-1,t-2)/32 \qquad (55)$$

Accordingly, two-dimensional low-pass filter output YLPF(s,t) of the image sensor output at the position (s,t) of the pixel of interest can be obtained in the adder 236 as shown by equation (56).

$$YLPF(s,t)=Y'LPF(s+1,t)+Y'LPF(s,t)+Y'LPF(s-1,t) \qquad (56)$$

Although the described above are two-dimensional low-pass filter outputs of image sensor outputs, the two-dimensional low-pass filters of the Jth color filters at the position (s,t) of the pixel of interest are made of the Jth color filters which are arranged alternately at every other pixel in both horizontal and vertical directions. Therefore use of a two clock delay circuit instead of a one clock delay circuit, and a two horizontal period delay circuit instead of a one horizontal period delay circuit will serve the purpose.

Embodiment 20

Although the composition of the color video camera in embodiment 20 is the same as that of embodiment 11 (FIG. 28), method of calculating the luminance signal in the arithmetic logic unit 32 is different.

In embodiment 12, a luminance signal is obtained by adding 1 to each of the multiplier, divisor and dividend and subtracting 1 from the result of calculation at the end to minimize the calculation error, as shown in equations (33) and (34). However, as the number 1 is LSB which has no significant effect on the result of calculation, subtraction of 1 at the end may be omitted for the simplification of the circuit. Embodiment 20 is an example of such simplification. Luminance signal component Y(s,t) at the position of GC color filter of row s, column t is calculated by the equation (57) below.

$$Y(s,t)=(GC(s,t)+1)\times((YLPF(s,t)+1)/(GCLPF(s,t)+1)) \quad (57)$$

Luminance signal component Y(s,t) at position (s,t) of color filter of kind K (K is either MC, GY, MY or GC) is given by the equation (58) below.

$$Y(s,t)=(K(s,t)+1)\times((YLPF(s,t)+1)/(KLPF(s,t)+1)) \quad (58)$$

Embodiment 21

Figure 34:
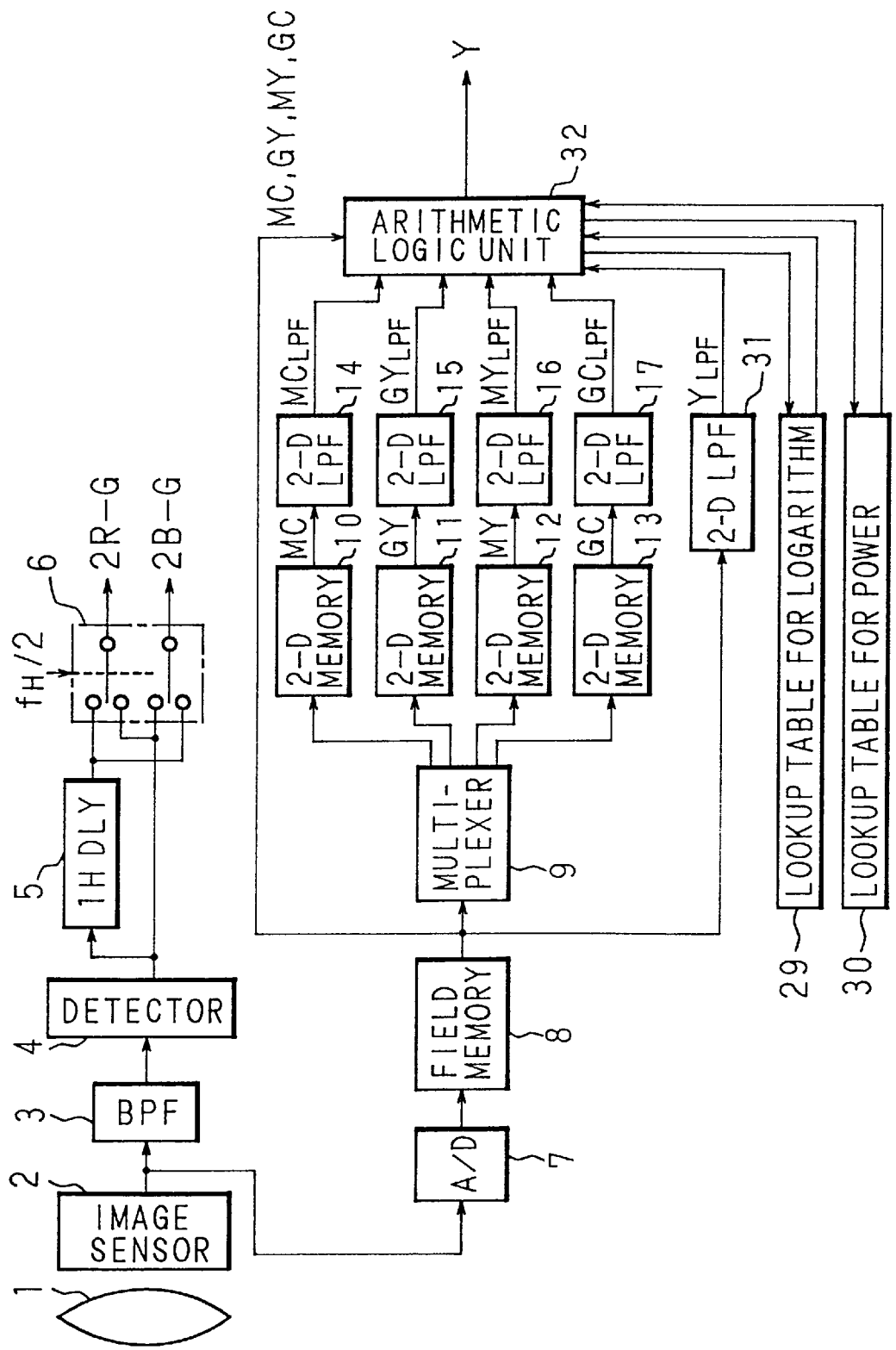
FIG. 34 shows a block circuit diagram illustrating further another color video camera of the invention.

FIG. 34 shows a block circuit diagram of the color video camera in embodiment 21. In FIG. 34, symbols which are the same as those in FIG. 28 indicate the identical portions. Numerals 29, 30 represent a lookup table for logarithm and a lookup table for power similar to those shown in FIG. 27 (embodiment 10).

The operation will now be described below. Luminance signal component Y(s,t) in case the kind of color filter of the pixel at position (s,t) is K (K is either MC, GY, MY or GC) is given, for example, by the equation (58) as described in embodiment 20. Now logarithmic conversion with base x is applied to equation (58) as shown in equation (59), where ^ represents power.

$$\begin{aligned} Y(s,t) &= x^{\wedge}\log x\{(K(s,t)+1)\times((YLPF(s,t)+1)/ \\ &\quad (KPLF(s,t)+1))\} \\ &= x^{\wedge}\{\log x(K(s,t)+1)+\log x(YLPF(s,t)+1)- \\ &\quad \log x(KPLF(s,t)+1)\} \end{aligned} \quad (59)$$

In embodiment 21, arithmetic operation can be made using lookup tables of small capacity similarly to embodiment 10 described before. Although the above description is for the case of calculating a luminance signal based on the equation of embodiment 20, it goes without saying that the calculation by means of a lookup table for logarithm and a lookup table for power may be applied to embodiment 11.

Embodiment 22

Figure 35:
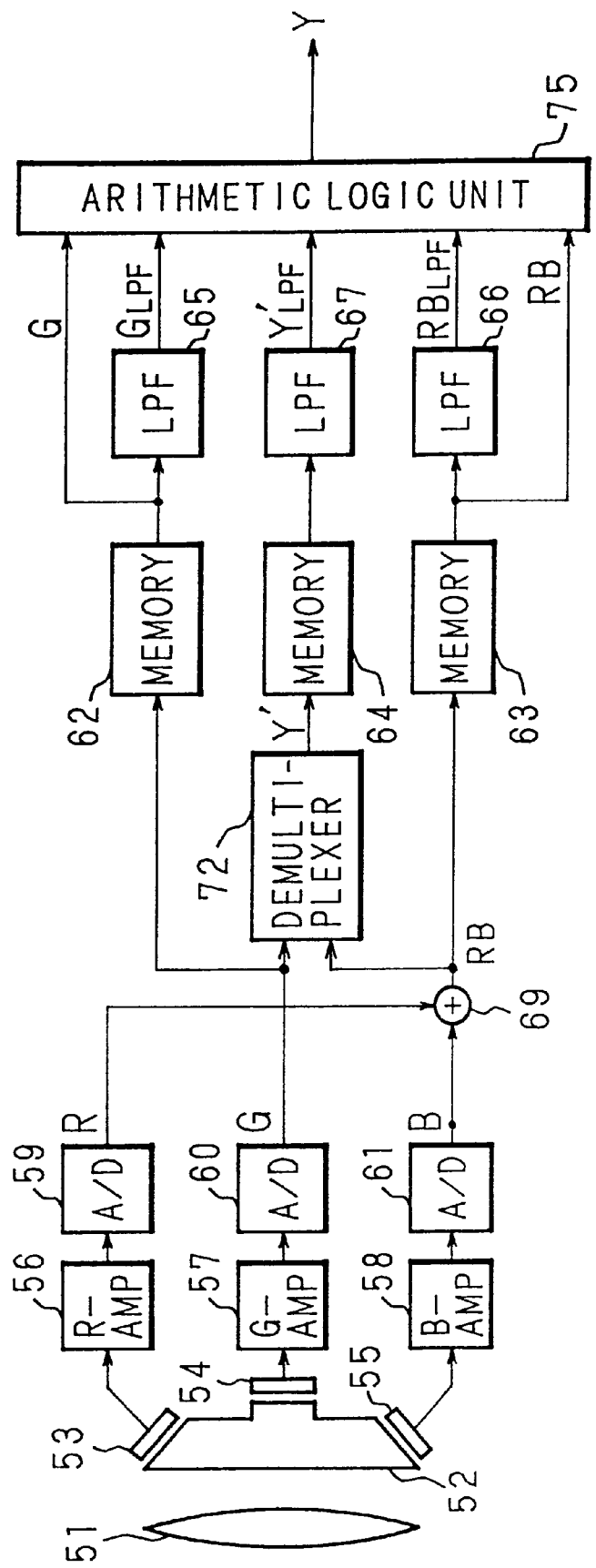
FIG. 35 shows a block circuit diagram illustrating further another color video camera of the invention.
Figure 36:
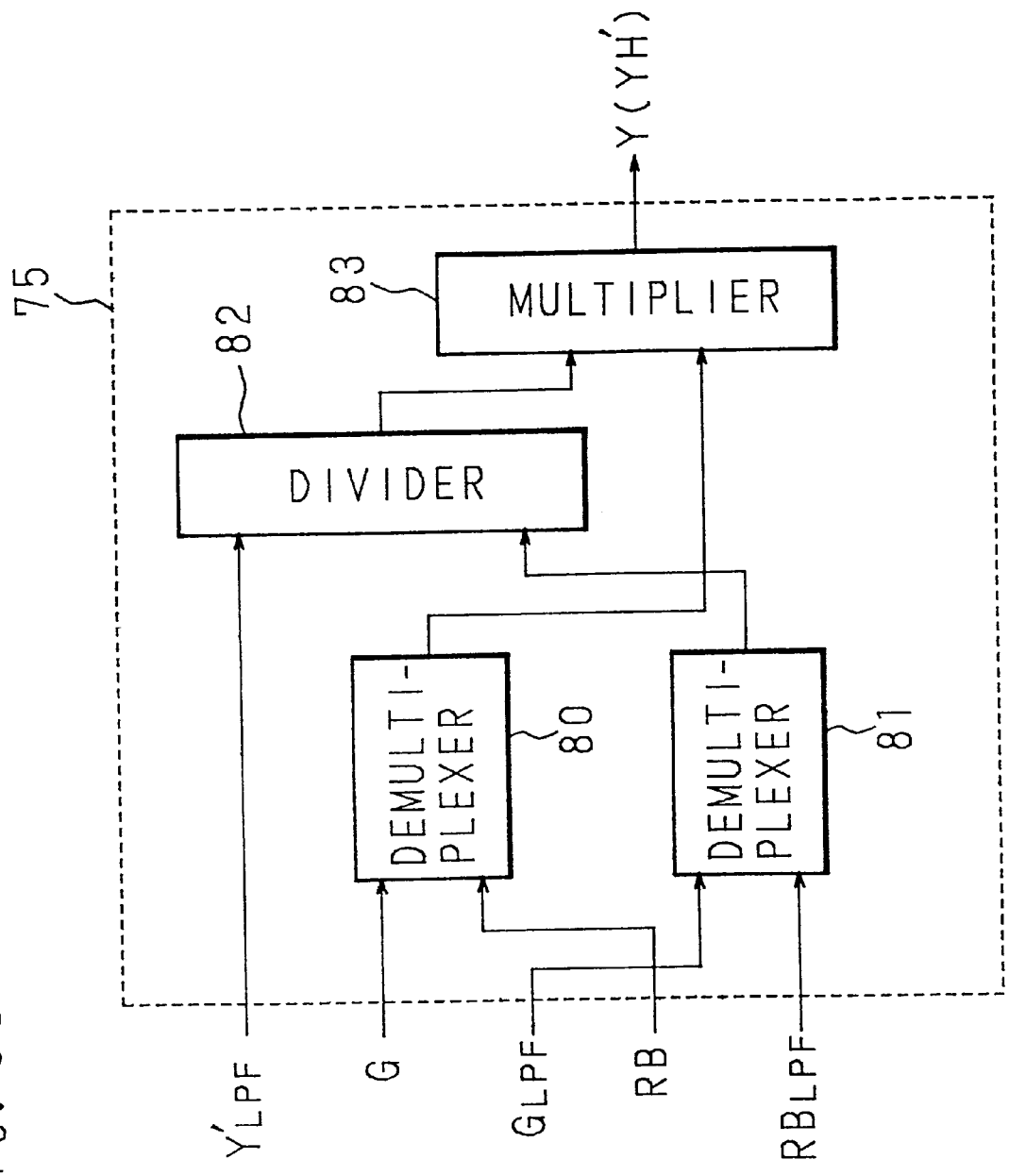
FIG. 36 shows a block circuit diagram illustrating the constitution of the arithmetic logic unit.

FIG. 35 shows a block circuit diagram of the color video camera in embodiment 22. In FIG. 35, numeral 51 represents a lens, numeral 52 represents a refracting prism, numerals 53, 54, 55 represent image sensors, numeral 56 represents a red signal amplifier, numeral 57 represents a green signal amplifier, numeral 58 represents a blue signal amplifier, numerals 59, 60, 61 represent A/D converters, numerals 62, 63, 64 represent memories, numerals 65, 66, 67 represent low-pass filters (LPF), numeral 69 represents an adder, numeral 72 represents a demultiplexer, and numeral 75 represents an arithmetic logic unit. FIG. 36 shows the internal composition of the arithmetic logic unit 75 which has demultiplexers 80, 81, a divider 82 and a multiplier 83.

Figure 37:
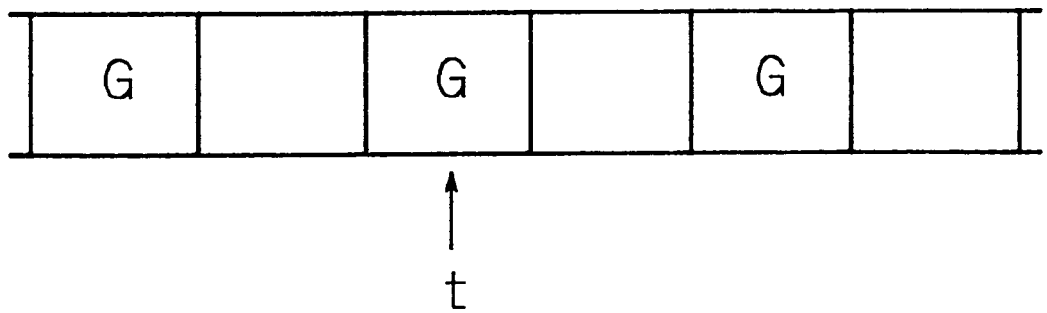
FIG. 37 shows the signals written in the one-dimensional memory.
Figure 38:
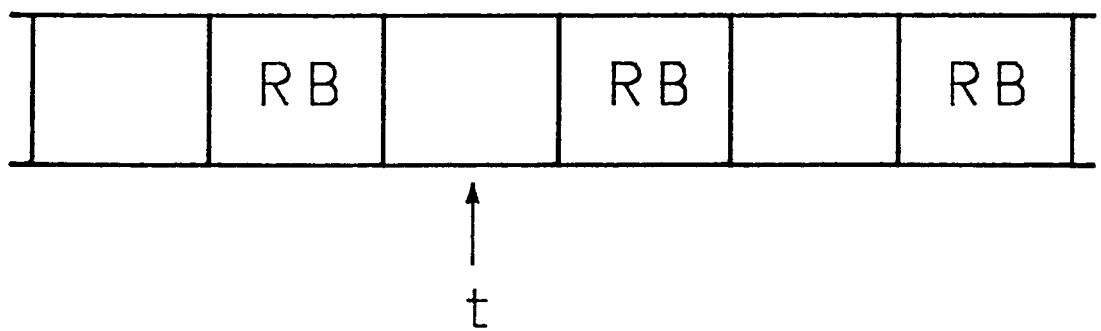
FIG. 38 shows the signals written in the one-dimensional memory.
Figure 39:
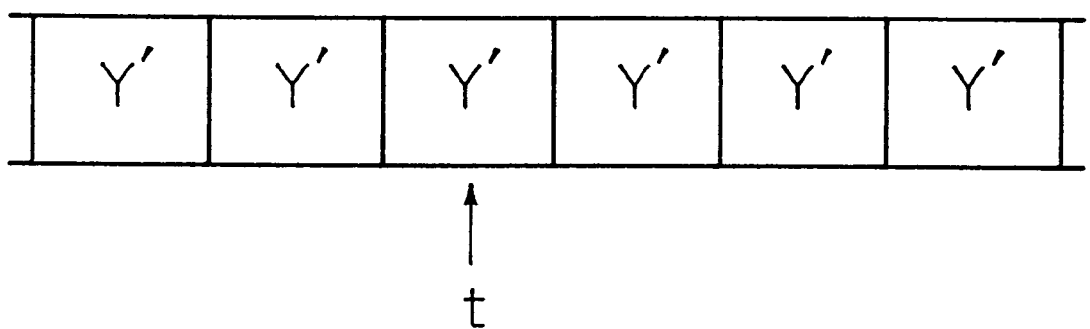
FIG. 39 shows the signals written in the one-dimensional memory.
Figure 40:
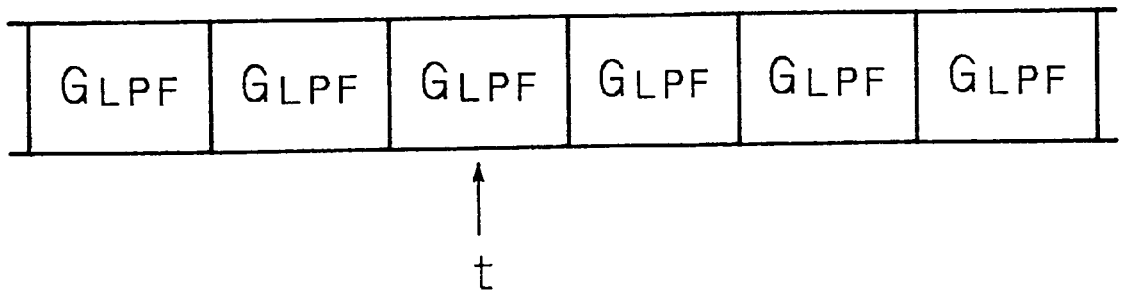
FIG. 40 shows the output signals of the one-dimensional low-pass filter.
Figure 41:
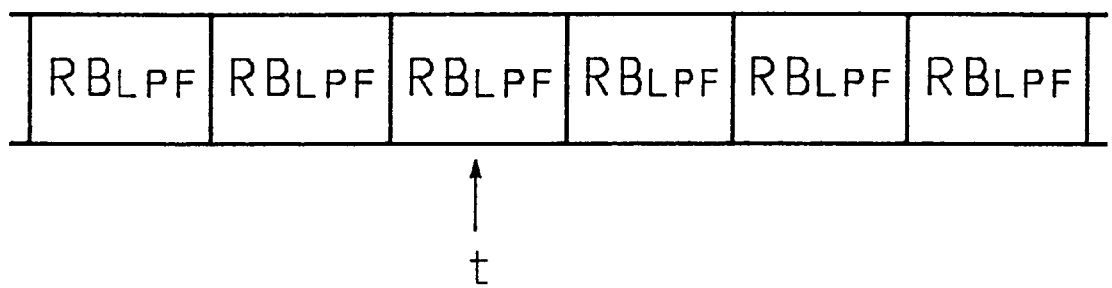
FIG. 41 shows the output signals of the one-dimensional low-pass filter.
Figure 42:
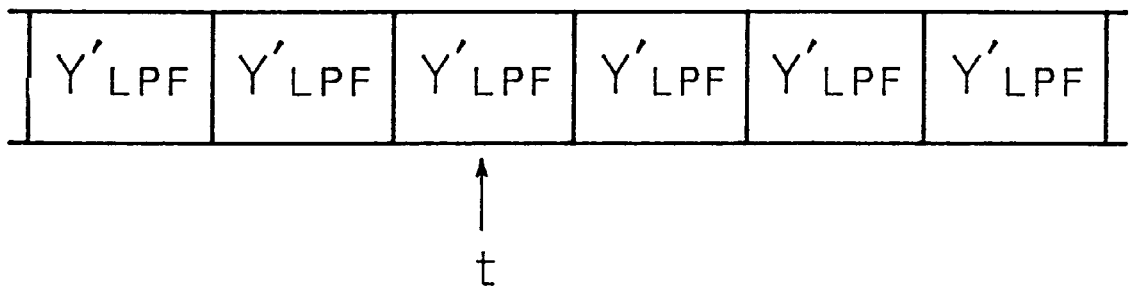
FIG. 42 shows the output signals of the one-dimensional low-pass filter.

The operation will now be described below. In FIG. 35, incident ray on the lens 51 is decomposed into red, green and blue by the refracting prism 52, with the light rays of respective colors forming images on the image sensors 53, 54, 55 which are formed by arranging photoelectric transducers optically staggering from each other on a two-dimensional plane. Each of the image sensors 53, 54, 55 mixes the signals of two upper and lower adjacent pixels to give one signal output. The output signals of the image sensors 53, 54, 55 are amplified by the red signal amplifier 56, the green signal amplifier 57 and the blue signal amplifier 58, respectively, so that the ratio of the output signals thereof becomes, in the case of NTSC system, R:G:B= 0.30:0.59:0.11. The amplified signals are converted form analog to digital signals by the A/D converters 59, 60, 61, respectively, to obtain R, G and B signals. R is the red pixel signal, G is the green pixel signal and B is the blue pixel signal. G signal is stored in memory 62, R and B signals are mixed by the adder 69 and stored in memory 63. The demultiplexer 72 switches alternately between G signal and R, B composite signal to produce a synthesized signal Y' which is stored in memory 64. FIG. 37, FIG. 38 and FIG. 39 partly illustrate the configuration of G signal, R, B composite signal and Y' signal written in the memories 62, 63, 64. RB in the drawings represents the R, B composite signal. The signals shown in these drawings are smoothed by the low-pass filters 65, 66, 67. FIG. 40, FIG. 41 and FIG. 42 show the outputs of the low-pass filters 65, 66 and 67, respectively. LPF in the drawing is a symbol representing a low-pass filter output.

The operation of the arithmetic logic unit 75 will be described below. The low-pass filter output of the synthesized signal Y' is fed to the divider 82 as the dividend. The demultiplexer 81 switches to the low-pass filter output of G signal if the pixel of interest is a green pixel or to the low-pass filter output of R, B composite signal if the pixel of interest is a red, blue pixel, and the output thereof is fed to the divider 82 as the divisor. The output of the divider 82 is supplied to the multiplier 83 as the input. The demultiplexer 80 switches to the G signal if the pixel of interest is a green pixel or to the R, B composite signal if the pixel of interest is a red, blue pixel, and the output thereof is fed to the multiplier 83. Thus the output of the multiplier 83 is obtained as Y signal at the pixel of interest.

In FIG. 37, luminance signal component Y (t) at the position of green pixel of column t, for example, is calculated by equation (60) below.

$$Y(t)=G(t)\times(Y'LPF(t)/GLPF(t)) \quad (60)$$

Luminance signal component Y (t) at the position t of pixel of kind K (K is either G or RB) is calculated by equation (61) below. In this embodiment, letter t represents the coordinate of memory 64 shown in FIG. 39, or represents the coordinate of memory 62 shown in FIG. 37 in case the pixel of interest is G, or represents the coordinate of memory 63 shown in FIG. 38 in case the pixel of interest is RB.

$$Y(t)=K(t)\times(Y'LPF(t)/KLPF(t)) \quad (61)$$

Embodiment 23

Figure 43:
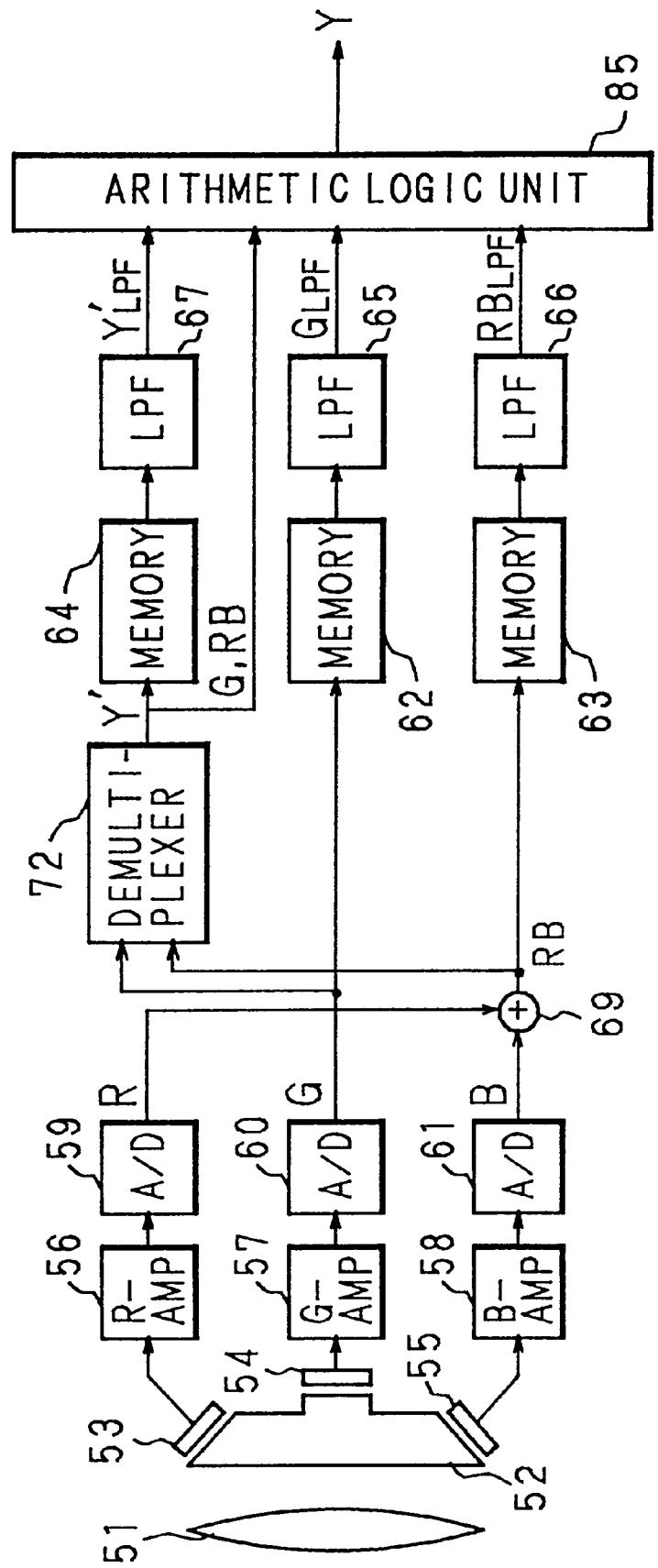
FIG. 43 shows a block circuit diagram illustrating further another color video camera of the invention.

FIG. 43 shows a block circuit diagram of the color video camera in embodiment 23. In FIG. 43, numerals which are the same as those in FIG. 35 indicate the identical portions and numeral 85 represents an arithmetic logic unit with the internal composition thereof being shown in FIG. 44. The arithmetic logic unit 85 has a demultiplexer 80, a divider 82 and a multiplier 83.

The operation will now be described below. In embodiment 23, G signal and R, B composite signal from the demultiplexer 72 are fed to the arithmetic logic unit 85. Low-pass filter output of the synthesized signal Y' is fed to the divider 82 as the dividend. The demultiplexer 80 switches to the low-pass filter output of G signal if the pixel of interest is a green pixel, or to the low-pass filter output of R, B composite signal if the pixel of interest is a red, blue pixel, and the output thereof is fed to the divider 82 as the divisor. The output of the divider 82 is supplied to the multiplier 83 as the input. The multiplier 82 receives G signal as the input if the pixel of interest is a green pixel, or R, B composite signal if the pixel of interest is a red, blue pixel. As a result, output of the multiplier 83 is obtained as Y signal at the pixel of interest. The rest of the operation is the same as that of embodiment 22.

The principle of calculating Y signal in the above-mentioned embodiments 22 and 23 will now be described below. This method is based on an assumption that the color does not change significantly in a localized region. This implies that ratios of signals of different colors (G, RB) to Y' signal are approximately equal to each other in the localized region. Ratios between signals of different colors G, RB and Y' signal in a localized region are given by the ratios between low-pass filter outputs of G, RB and low-pass filter output of Y'.

At the position of G of column t as shown by equation (60), for example, Y(t) is obtained by multiplying G(t) by the ratio of Y' and G in the localized region (the ratio of the low-pass filter output of Y' signal and low-pass filter output of G signal).

In the conventional method of 3-chip CCD color camera based on spatial offset, the purpose is set at improving the resolution. Although there arises no problem in the case of such objects that have green signal and red-blue composite signal in similar proportions, vertical lines appear in the case of objects which have significantly different proportions. Vertical lines have been reduced by passing the luminance signal through a low-pass filter in the prior art, though it has a problem of causing attenuation of harmonics in the luminance signal. According to this invention, Y signal is obtained by multiplying G(t) by the ratio of Y' and G in the localized region (the ratio of the low-pass filter output of Y' signal and low-pass filter output of G signal), and consequently it is made possible to suppress the generation of vertical lines without attenuating the harmonics of the luminance signal.

Embodiment 24

Although the composition of the color video camera in embodiment 24 is the same as that shown in FIG. 35, signal processing in the arithmetic logic unit 75 is different, and Y signal is calculated by employing 1 of LSB similarly to embodiment 3 described above. Specifically, Y(t) at the position of G of column t is calculated by equation (62).

$$Y(t)=(G(t)+1)\times((Y'LPF(t)+1)/(GLPF(t)+1))-1 \qquad (62)$$

Luminance signal component Y(t) at the position t of a pixel of kind K (K is either G or RB) is calculated by equation (63) below. Letter t represents the coordinate of memory 64 shown in FIG. 39 in this embodiment, coordinate of memory 62 shown in FIG. 37 in case the pixel of interest is G, or coordinate of memory 63 shown in FIG. 38 in case the pixel of interest is RB.

$$Y(t)=(K(t)+1)\times((Y'LPF(t)+1)/(KLPF(t)+1))-1 \qquad (63)$$

Embodiment 25

Figure 45:
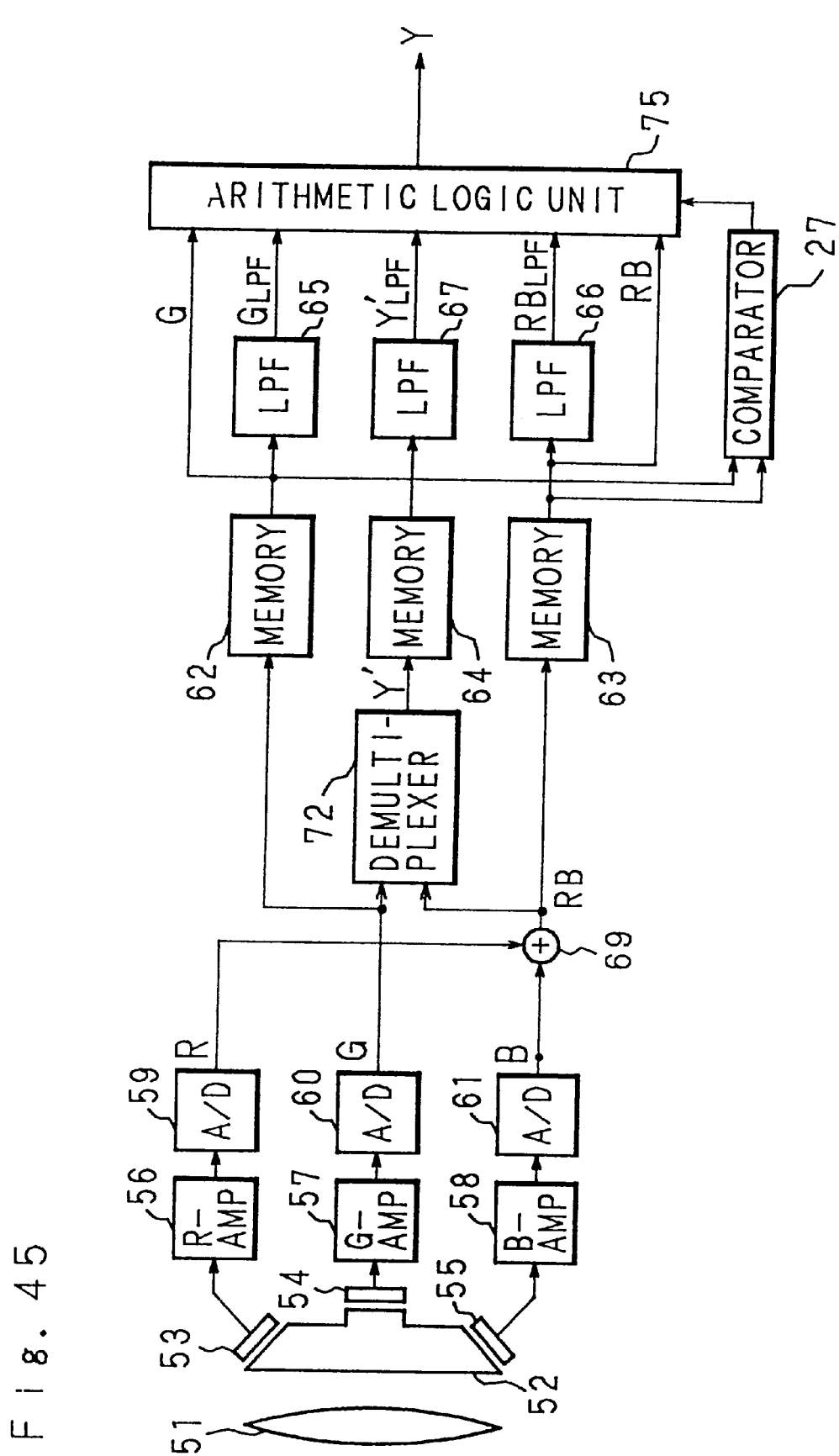
FIG. 45 shows a block circuit diagram illustrating further another color video camera of the invention.

FIG. 45 shows a block circuit diagram of the color video camera in embodiment 25. In FIG. 45, symbols which are the same as those in FIG. 35 indicate the identical portions, and numeral 27 represents a comparator similar to that shown in FIG. 22 (embodiment 4).

The operation will now be described below. The output signals of an appropriate pixel in the vicinity of the pixel of interest are supplied from memories 62, 63 to the comparator 27. And it is determined that the image has a high spatial frequency if the difference between the output signals from pixels of the same kind is greater than a particular threshold, and it is determined that the image has a low spatial frequency if the difference between the output signals is within the threshold. In a portion of image having a high spatial frequency, luminance signal is calculated similarly to embodiment 22 and, in a portion of low spatial frequency, luminance signal is calculated from the weighted averaging value of the outputs of G signal and RB signal.

The arithmetic logic unit 75 operates similarly to embodiment 22 in the portion of high spatial frequency. In the portion of low spatial frequency, luminance signal component Y(t) at the position where there is no output signal of column t in FIG. 38, for example, is calculated by equation (64) below.

$$Y(t)=RB(t-1)/4+G(t)/2+RB(t+1)/4 \qquad (64)$$

When the pixel of interest is located at position t, the kind of the pixel of interest is J (J is either G or RB), and the kind of the right and left horizontal pixels of the pixel of interest is K (K is either G or RB), luminance signal component Y(t) is calculated by equation (65).

$$Y(t)=K(t-1)/4+J(t)/2+K(t+1)/4 \qquad (65)$$

Embodiment 26

Although the composition of the color video camera in embodiment 26 is the same as that of embodiment 25 (FIG. 45), signal processing operations in the arithmetic logic unit 75 and in the comparator 27 are different.

In embodiment 26, difference the between the output signals of the right and left adjacent pixels of the pixel of interest is compared to a particular threshold. And it is determined that the portion has high spatial frequency if the difference between the output signals is greater than the threshold, and the operation of embodiment 22 is carried out, and, it is determined that the portion has low spatial frequency if the difference between the output signals is less than the threshold, and the operation of embodiment 25 described above is carried out.

For example, the result of the following calculation is compared to the threshold at the position of G of column t in FIG. 37 and at the position where there is no output signal of column t in FIG. 38, to select one of the methods of generating luminance signal.

$$|RB(t-1)-RB(t+1)| \qquad (66)$$

Assuming the position of the pixel of interest as t, the kind of the right and left adjacent pixels of the pixel of interest as K (K is either G or RB), the result of the calculation below is compared to the threshold to select one of the methods of generating luminance signal.

$$|K(t-1)-K(t+1)| \qquad (67)$$

Embodiment 27

Figure 46:
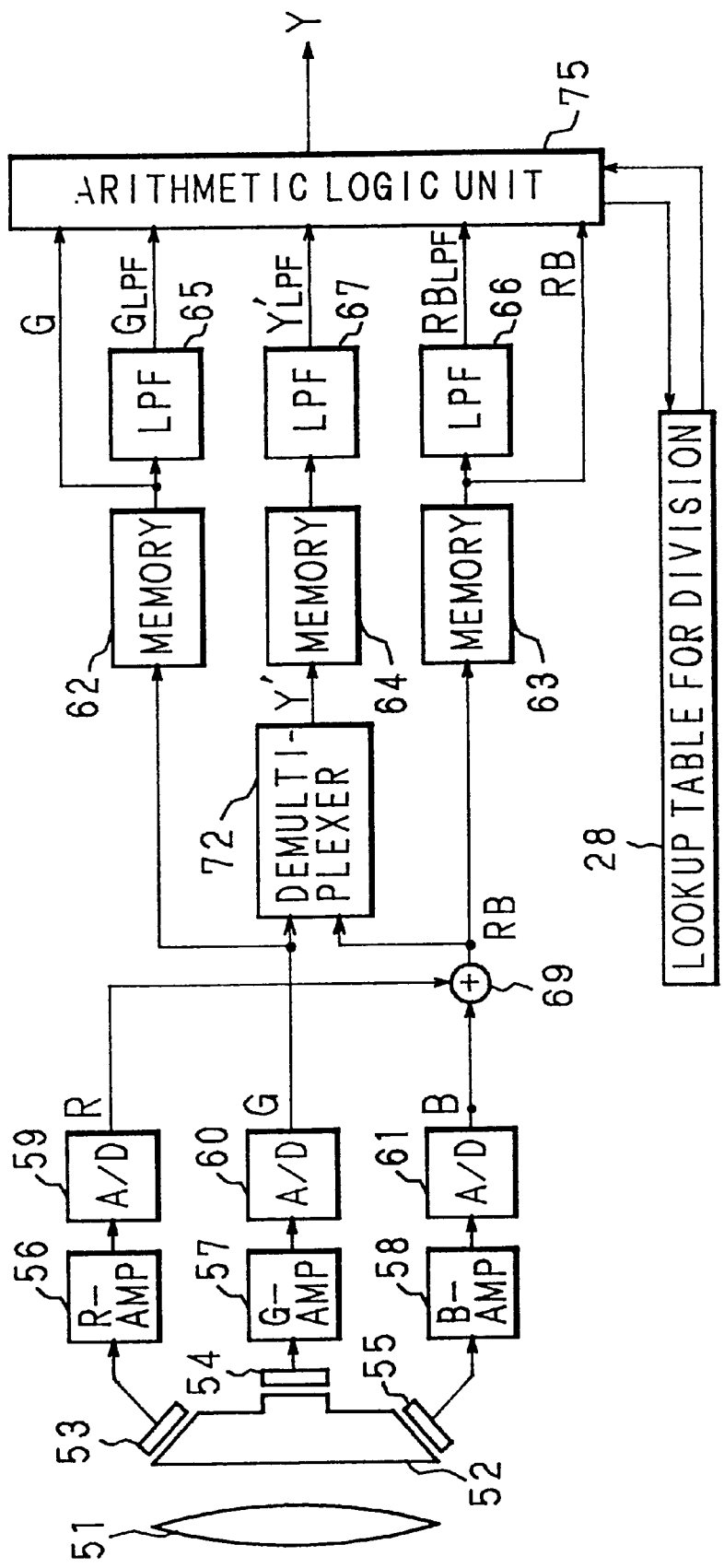
FIG. 46 shows a block circuit diagram illustrating further another color video camera of the invention.

FIG. 46 shows a block circuit diagram of the color video camera in embodiment 27. In FIG. 46, symbols which are the same as those in FIG. 35 indicate the identical portions, and numeral 28 represents a lookup table for division similar to that shown in FIG. 23 (embodiment 6).

The operation of the lookup table for division 28 is the same as that in embodiment 6, and description thereof will be omitted here.

Embodiment 28

An embodiment where the method of calculation in embodiment 7 with respect to embodiment 6 is applied to embodiment 27 described above is embodiment 28. The operation of the lookup table for division 28 in embodiment 28 is the same as that in embodiment 7, and description thereof will be omitted here.

Embodiment 29

The composition of the color video camera in embodiment 29 is the same as that of embodiment 22 (FIG. 35). In embodiment 29, a one-dimensional low-pass filter is used as a digital filter which is made up of only bit shift circuits having weightings such as ⅛, ¼. The construction of the one-dimensional low-pass filter is the same as that in embodiment 8 (FIG. 26) and will not be described here.

Embodiment 30

Although the composition of the color video camera in embodiment 30 is the same as that of embodiment 22 (FIG. 35), the method of calculating the luminance signal in the arithmetic logic unit 75 is different.

In embodiment 24, the luminance signal is obtained by adding 1 to each of the multiplier, divisor and dividend and subtracting 1 from the result of calculation at the end to minimize the calculation error, as shown in equations (62) and (63). However, as the number 1 is LSB which has no significant effect on the result of calculation, subtraction of 1 at the end may be omitted for the simplification of the circuit. Embodiment 30 is an example of such simplification. Luminance signal component Y(t) at the position of G of column t is calculated by the equation (68) below.

$$Y(t)=(G(t)+1)\times((Y'\text{LPF}(t)+1)/(\text{GLPF}(t)+1)) \quad (68)$$

Luminance signal component Y(t) at position t of pixel of kind K (K is either G or RB) is given by the equation (69) below.

$$Y(t)=(K(t)+1)\times((Y'\text{LPF}(t)+1)/(\text{KLPF}(t)+1)) \quad (69)$$

Embodiment 31

Figure 47:
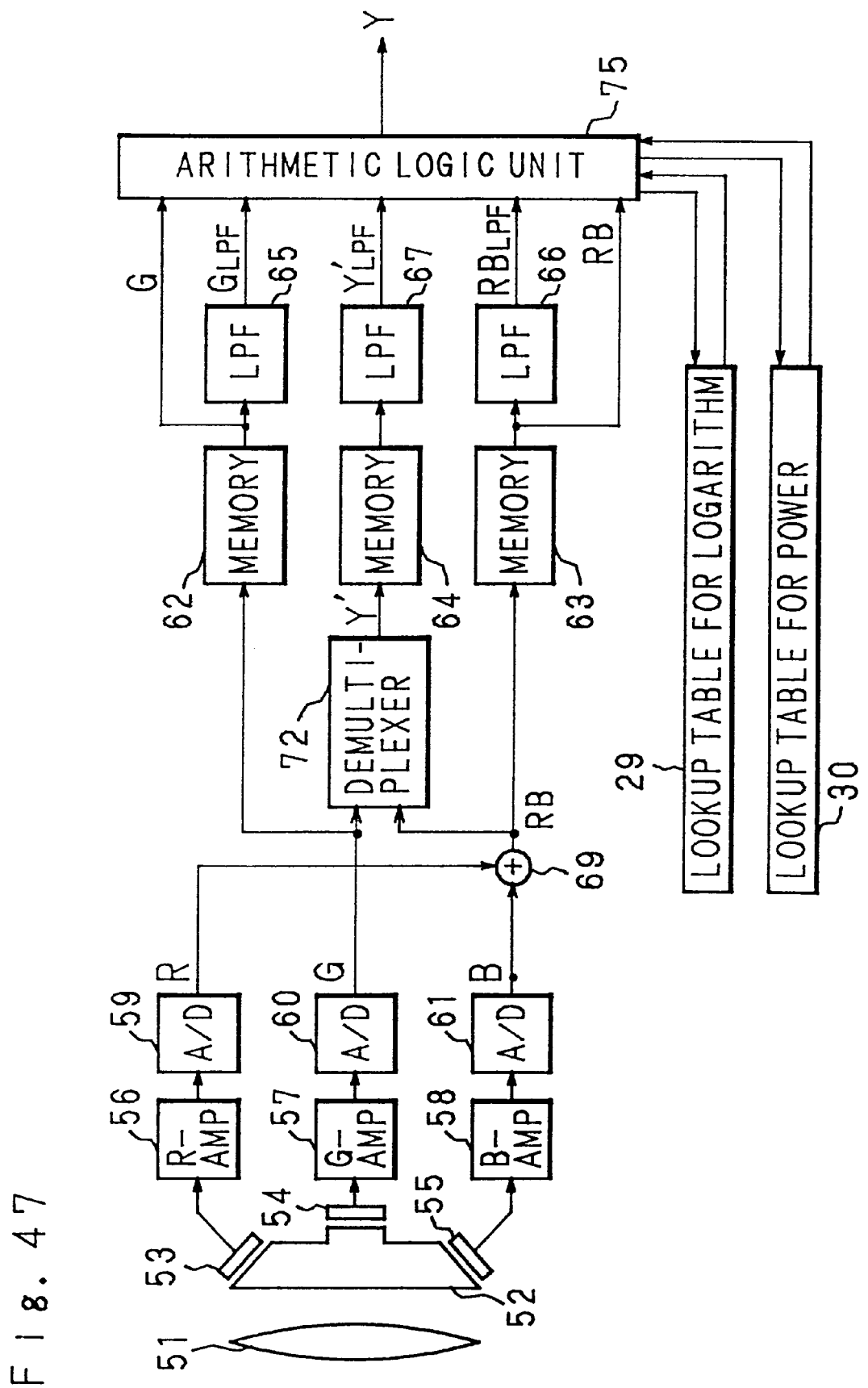
FIG. 47 shows a block circuit diagram illustrating further another color video camera of the invention.

FIG. 47 shows a block circuit diagram of the color video camera in embodiment 31. In FIG. 47, symbols which are the same as those in FIG. 35 indicate the identical portions. Numerals 29, 30 represent a lookup table for logarithm and a lookup table for power which are similar to those shown in FIG. 27 (embodiment 10).

The operation will now be described below. Luminance signal component Y(t) in case the kind of the pixel at position t is K (K is either G or RB), for example, is given by equation (69) as described in embodiment 30. Now logarithmic conversion with base x as shown in equation (70) is applied to equation (69), where ^ represents power.

$$Y(s,t) = x^{\wedge}\log x\{(K(t)+1)\times((Y'LPF(t)+1)/ \quad (70)$$
$$(KPLF(t)+1))\}$$
$$= x^{\wedge}\{\log x(K(t)+1) + \log x(Y'LPF(t)+1) -$$
$$\log x(KPLF(t)+1)\}$$

In embodiment 31, calculation can be made by using lookup tables of small capacity as in embodiment 10 described before. Although the above description is for the case of calculating luminance signal based on the equation of embodiment 30, it goes without saying that the calculation by means of a lookup table for logarithm and a lookup table for power may be applied to embodiment 22.

Embodiment 32

Figure 48:
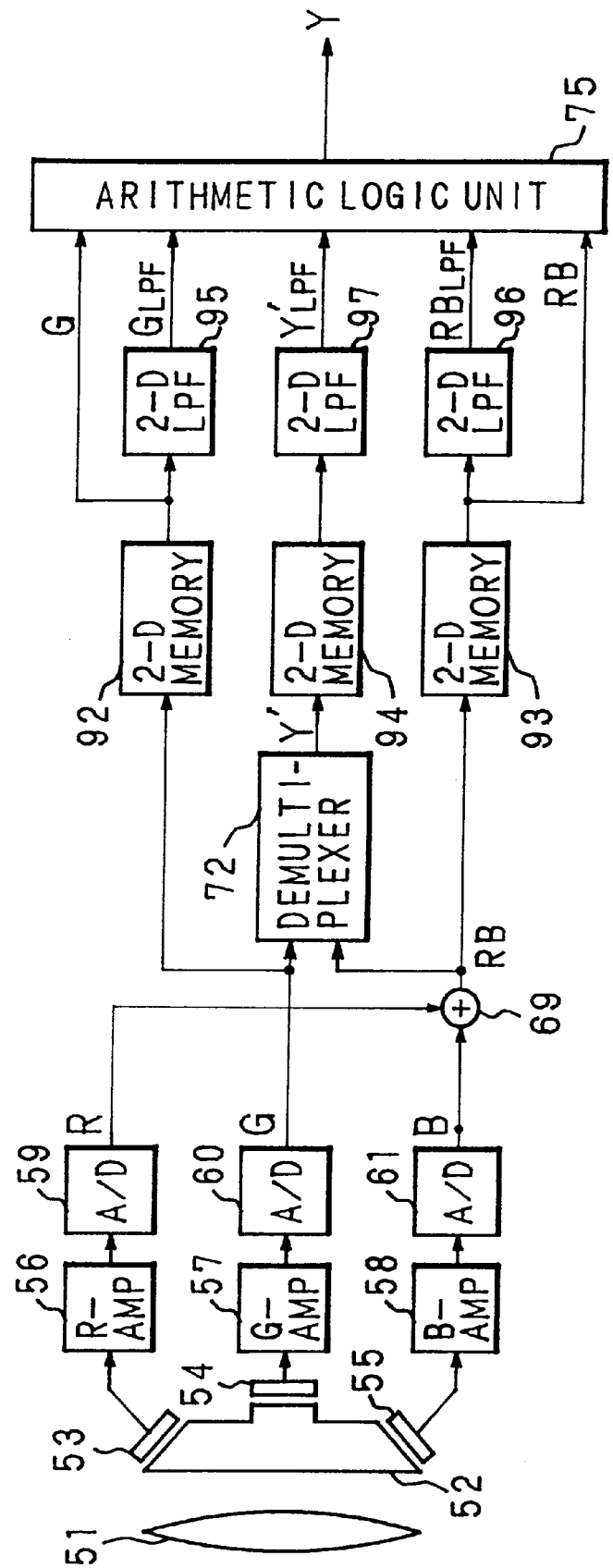
FIG. 48 shows a block circuit diagram illustrating further another color video camera of the invention.

FIG. 48 shows a block circuit diagram of the color video camera in embodiment 32. In FIG. 48, numerals which are the same as those in FIG. 35 indicate the identical portions and will not be described here. In FIG. 48, numerals 92, 93, 94 represent two-dimensional memories, and numerals 95, 96, 97 represent two-dimensional low-pass filters (LPF).

Figure 51:
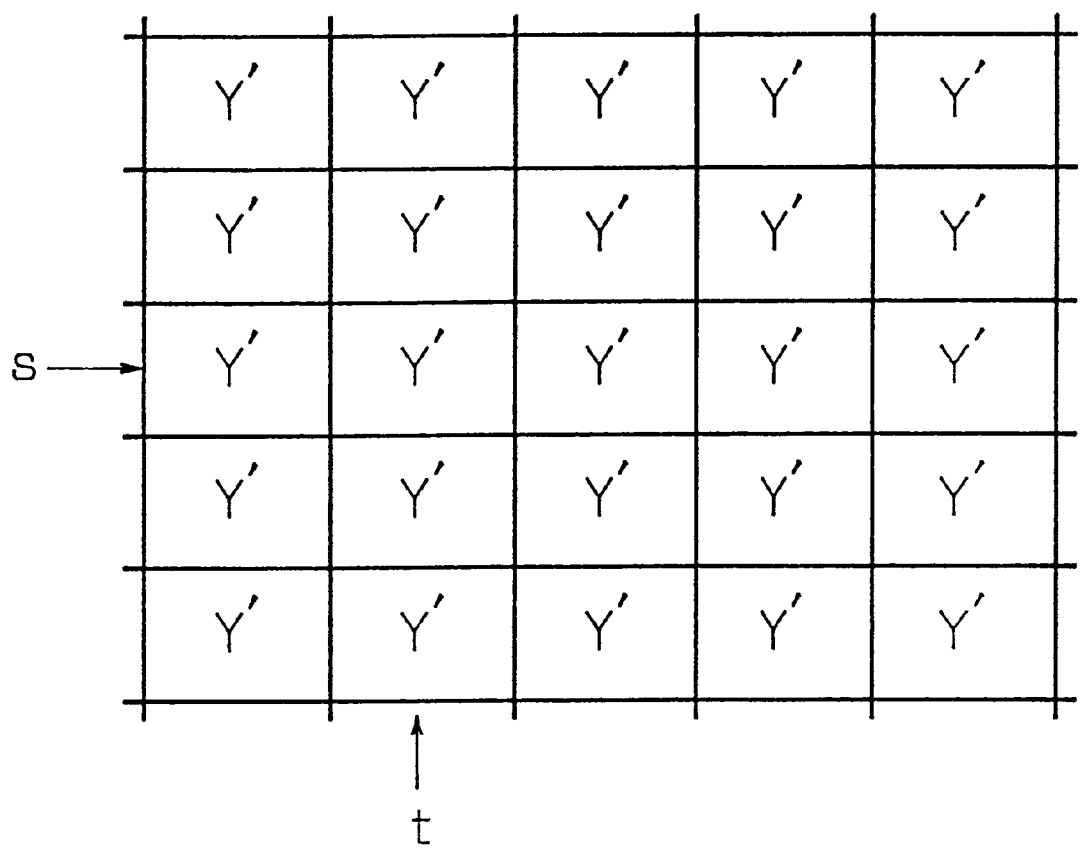
FIG. 51 shows the signals written in the two-dimensional memory.
Figure 52:
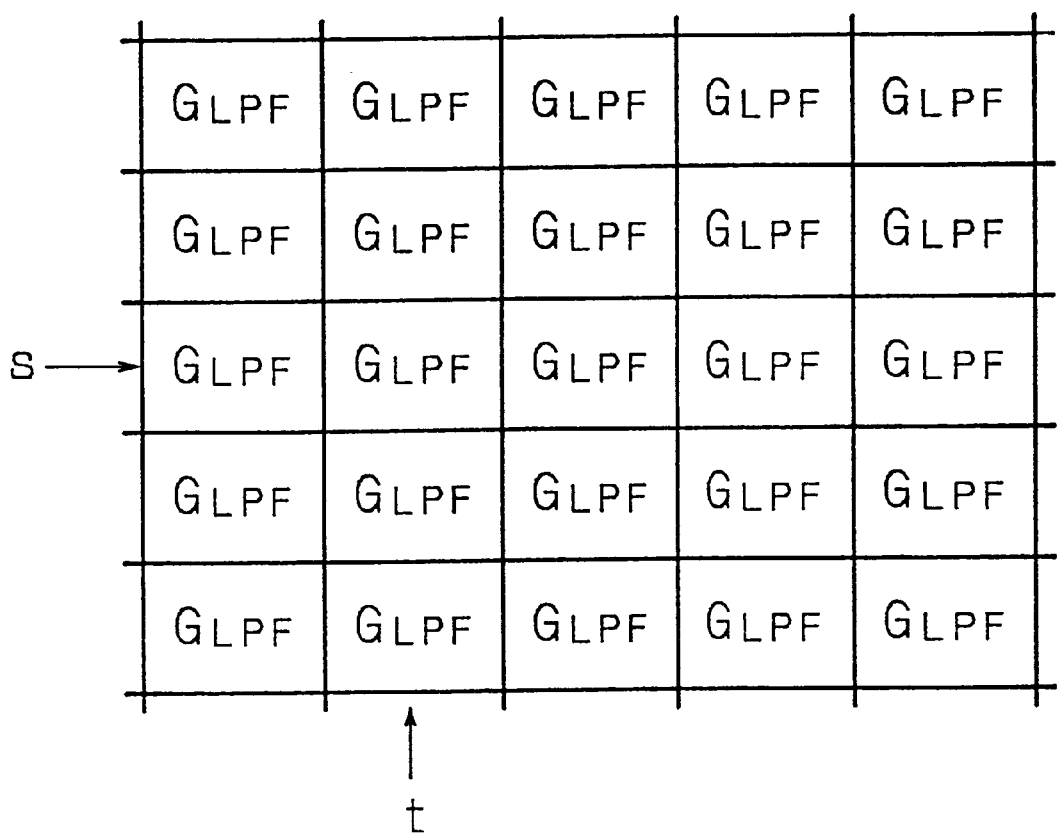
FIG. 52 shows the output signals of the two-dimensional low-pass filter.
Figure 53:
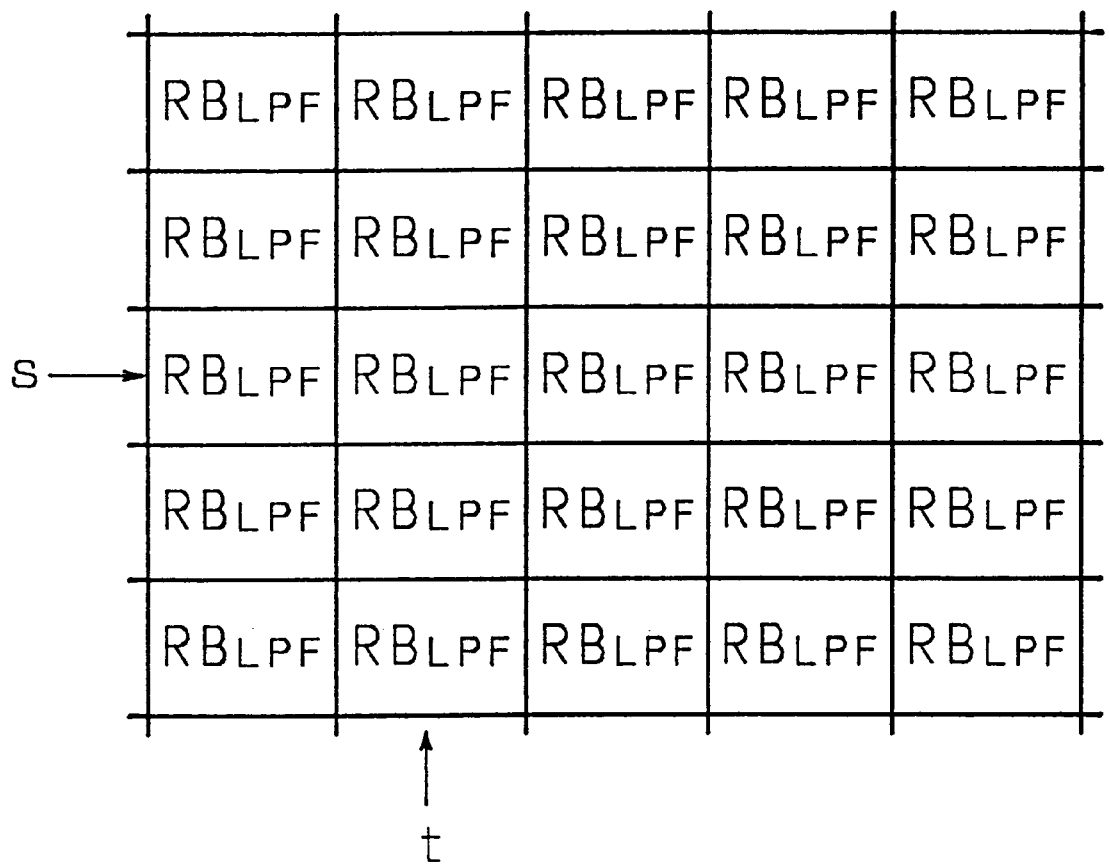
FIG. 53 shows the output signals of the two-dimensional low-pass filter.
Figure 54:
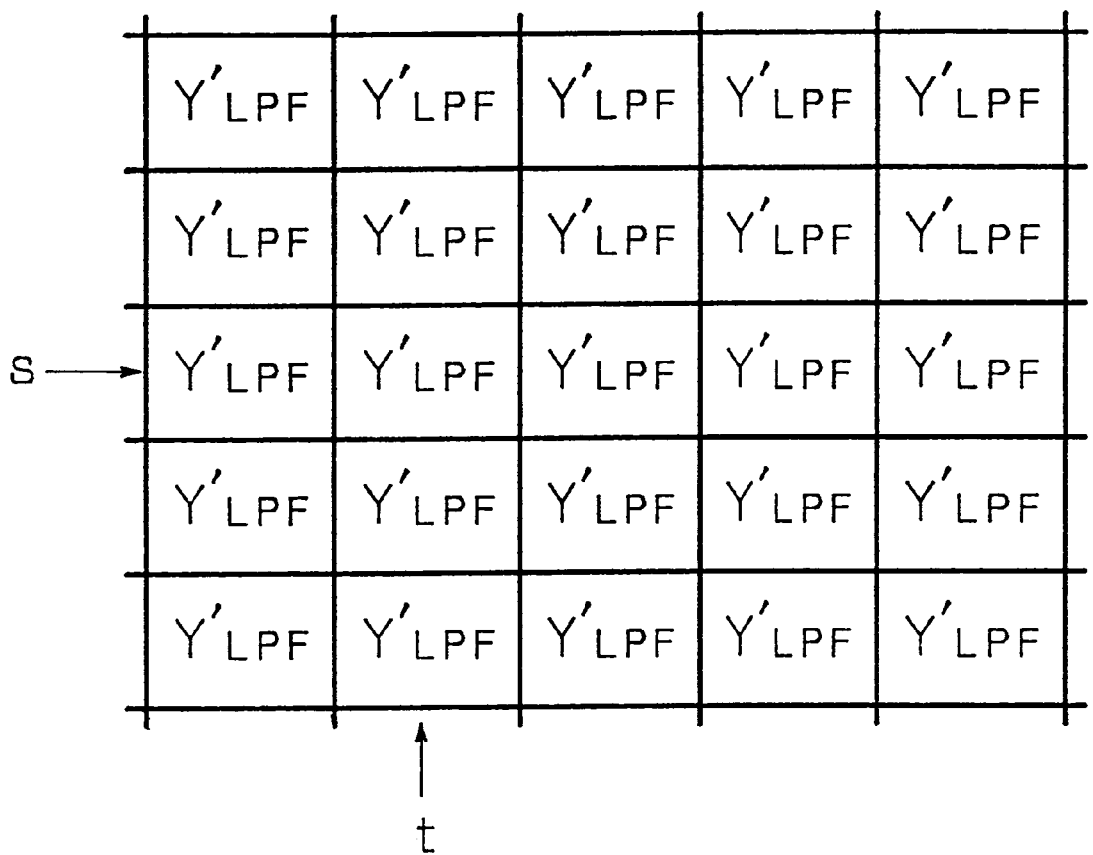
FIG. 54 shows the output signals of the two-dimensional low-pass filter.

The operation will now be described below. The basic operation is the same as that of embodiment 22. The configuration of G signal, R, B composite signal and Y' signal written in the two-dimensional memories 95, 96, 97 is partially illustrated in FIG. 49, FIG. 50 and FIG. 51. The signals shown in these drawings are smoothed by the two-dimensional low-pass filters 95, 96, 97. FIG. 52, FIG. 53, FIG. 54 show the outputs of the two-dimensional low-pass filters 95, 96, 97. Letters LPF in the drawing indicate the low-pass filter output.

Figure 49:
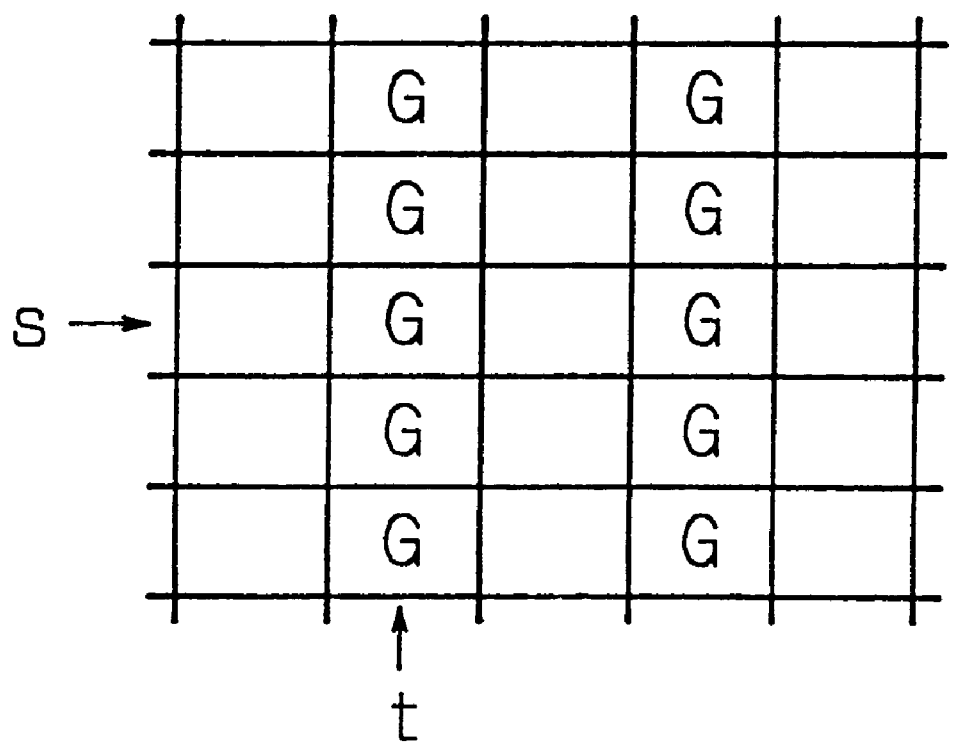
FIG. 49 shows the signals written in the two-dimensional memory.

Embodiment 32 is an example of using two-dimensional low-pass filters instead of one-dimensional low-pass filters of embodiment 22. In FIG. 49, luminance signal component Y(s,t) at the position of green pixel of row s, column t, for example, is calculated by equation (71).

$$Y(s,t)=G(s,t)\times(Y'\text{LPF}(s,t)/\text{GLPF}(s,t)) \quad (71)$$

Figure 50:
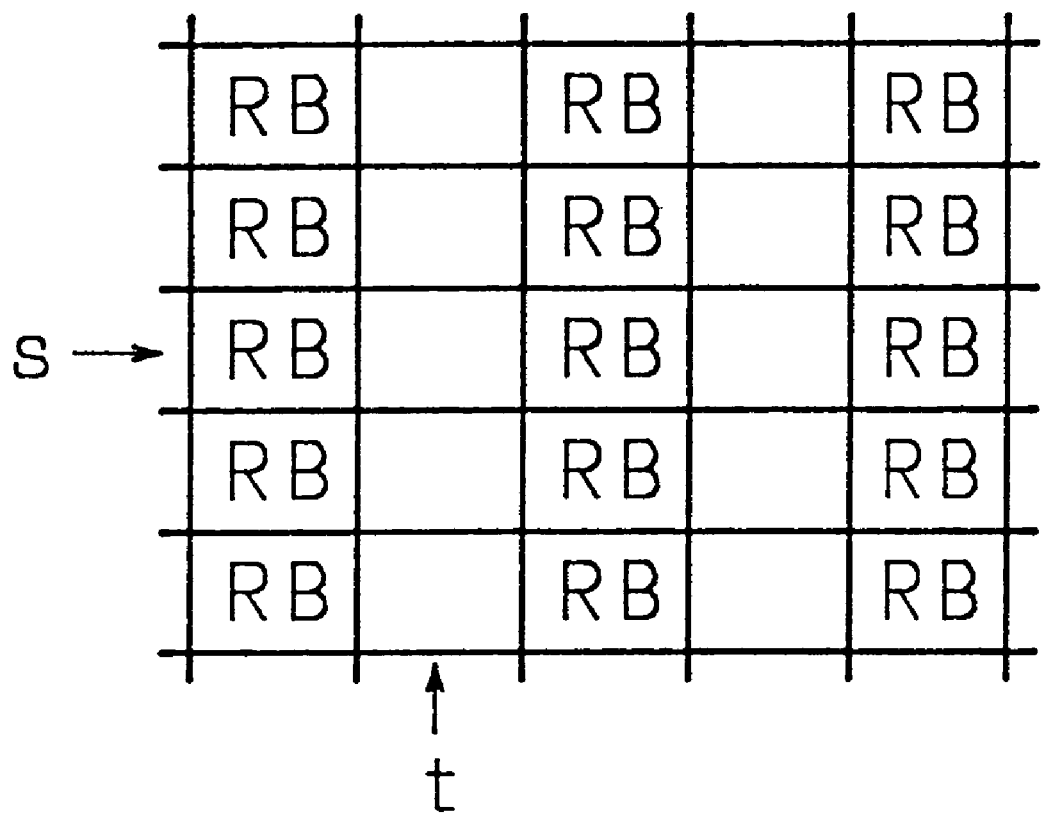
FIG. 50 shows the signals written in the two-dimensional memory.

Luminance signal component Y(s,t) at the position (s,t) of a pixel of kind K (K is either G or RB) is given by equation (72) below, where (s,t) represents the coordinates of the two-dimensional memory 94 shown in FIG. 51, the coordinates of the two-dimensional memory 92 shown in FIG. 49 in case the pixel of interest is G, and the coordinates of the two-dimensional memory 93 shown in FIG. 50 in case the pixel of interest is RB.

$$Y(s,t)=K(s,t)\times(Y'\text{LPF}(s,t)/\text{KLPF}(s,t)) \quad (72)$$

Embodiment 33

Figure 55:
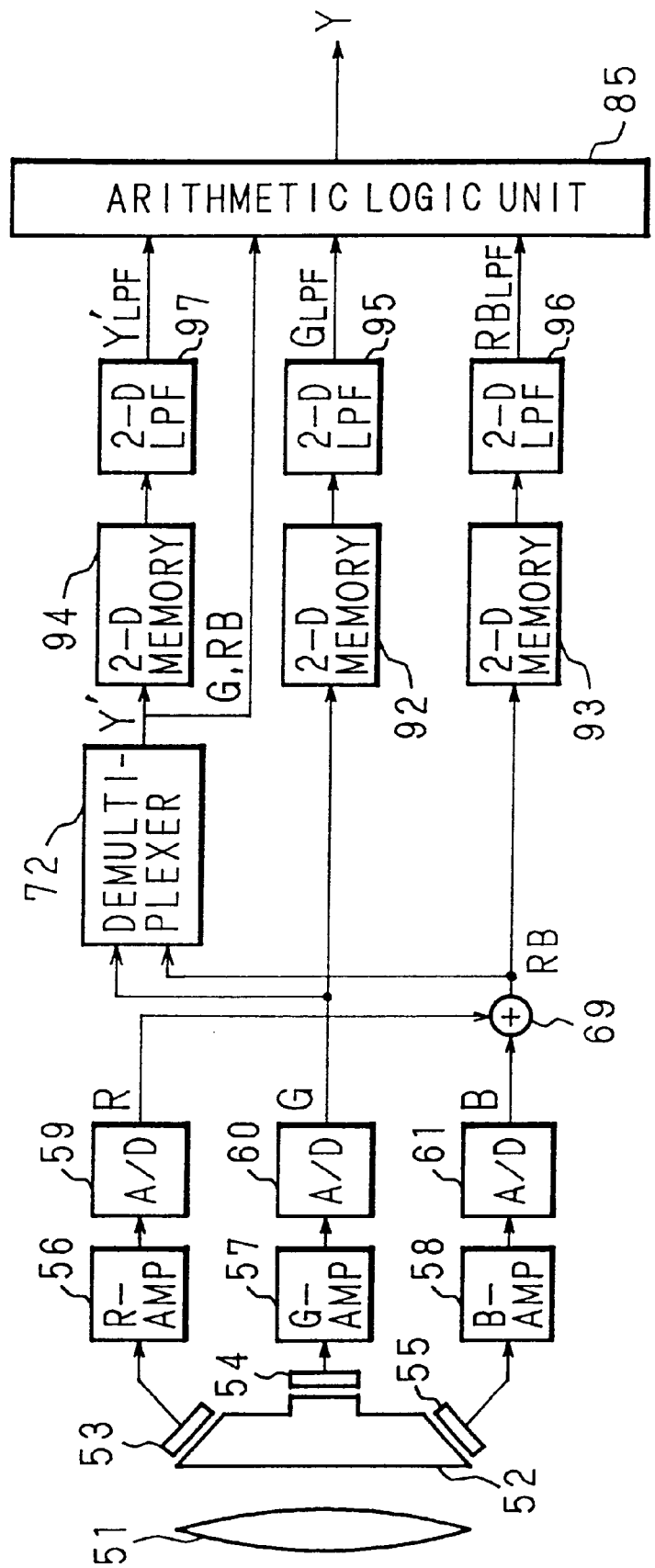
FIG. 55 shows a block circuit diagram illustrating further another color video camera of the invention.

FIG. 55 shows a block circuit diagram of the color video camera in embodiment 33. In FIG. 55, numerals which are the same as those in FIG. 48 indicate the identical portions and will not be described here. In FIG. 55, the arithmetic logic unit 85 has the same composition as that of the arithmetic logic unit 85 in embodiment 23 described previously (FIG. 44). In this embodiment 33, a demultiplexer 72 feeds G signal and R, B composite signal to the arithmetic logic unit 85. In embodiment 33, two-dimensional low-pass filters are used instead of one-dimensional low-pass filters of embodiment 23.

The principle of calculating the Y signal in embodiments 32, 33 is basically the same as that in embodiments 22, 23, and is capable of eliminating the modulated components of the color signal without reducing the harmonics of the luminance signal.

Embodiment 34

Although the composition of the color video camera in embodiment 34 is the same as that of embodiment 32 (FIG. 48), the method of calculating the Y signal in the arithmetic logic unit 75 is different.

The arithmetic operation in the arithmetic logic unit 75 will be described below. If each signal is made up of eight bits to represent the hue in 256 steps, for example, and value 1 of LSB is employed as a constant, the luminance signal component Y(s,t) at the position of G of row s, column t is calculated by equation (73) as shown below.

$$Y(s,t)=(G(s,t)+1)\times((Y'LPF(s,t)+1)/(GLPF(s,t)+1))-1 \qquad (73)$$

The luminance signal component Y(s,t) at position (s,t) of pixel of kind K (K is either G or RB) is given by equation (74) below.

$$Y(s,t)=(K(s,t)+1)\times((Y'LPF(s,t)+1)/(KLPF(s,t)+1))-1 \qquad (74)$$

Embodiment 35

Figure 56:
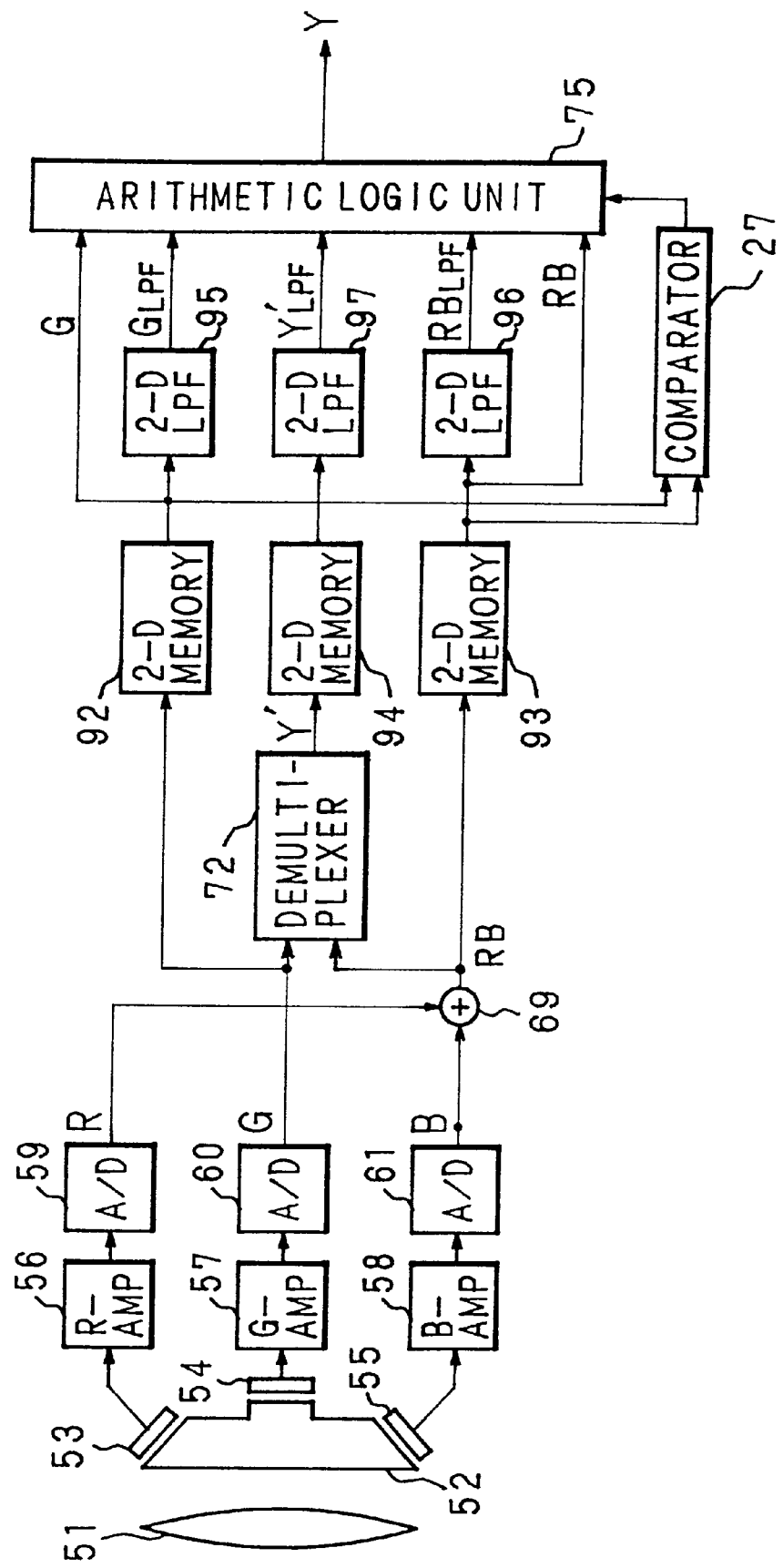
FIG. 56 shows a block circuit diagram illustrating further another color video camera of the invention.

FIG. 56 shows a block circuit diagram of the color video camera in embodiment 35. In FIG. 56, symbols which are the same as those in FIG. 48 indicate the identical portions and numeral 27 represents a comparator which is similar to that of FIG. 22 (embodiment 4).

The operation will now be described below. Difference between output signals of pixels of the same kind which are fed to the comparator 27 from the two-dimensional memories 92, 93 is compared to a particular threshold to determine whether the spatial frequency of the image is high or low. In a portion of the image with high spatial frequency, the luminance signal is calculated similarly to embodiment 32 and, in a portion of low spatial frequency, the luminance signal is calculated from the weighted averaging value of the G signal and RB signal in the vicinity of the pixel of interest.

The arithmetic logic unit 75 operates similarly to that in embodiment 32 in a portion of high spatial frequency. In a portion of low spatial frequency, the luminance signal component Y(s,t) at the position of G of row s, column t in FIG. 49, and at a position where there is no output signal of row s, column t in FIG. 50, for example, is calculated by equation (75).

$$Y(s,t) = RB(s-1,t-1)/16 + G(s-1,t)/8 + \qquad (75)$$
$$RB(s-1,t+1)/16 + RB(s,t-1)/8 +$$
$$G(s,t)/4 + RB(s,t+1)/8 +$$
$$RB(s+1,t-1)/16 + G(s+1,t)/8 +$$
$$RB(s+1,t+1)/16$$

Assuming the position of the pixel of interest as (s,t), kind of the pixel of interest as J (J is either G or RB), kind of the right and left adjacent pixels of the pixel of interest as K (K is either G or RB), then the luminance signal component Y(s,t) is calculated by equation (76) below.

$$Y(s,t) = K(s-1,t-1)/16 + J(s-1,t)/8 + \qquad (76)$$
$$K(s-1,t+1)/16 + K(s,t-1)/8 +$$
$$J(s,t)/4 + K(s,t+1)/8 +$$
$$K(s+1,t-1)/16 + J(s+1,t)/8 +$$
$$K(s+1,t+1)/16$$

Embodiment 36

Although the composition of the color video camera in embodiment 36 is the same as that of embodiment 35 (FIG. 56), the signal processing operations in the arithmetic logic unit 75 and in the comparator 27 are different.

In embodiment 36, the difference between the output signals of the right and left pixels, or between the output signals of the upper and lower pixels, of the pixel of interest is compared to a particular threshold. And it is determined that the portion has high spatial frequency if the difference between the output signals is greater than the threshold, and the operation in embodiment 32 is carried out, and, it is determined that the portion has low spatial frequency if the difference between the output signals is less than the threshold, and accordingly the operation in embodiment 35 described above is carried out.

For example, result of the calculation described below is compared to a particular threshold at the position of G at row s, column t in FIG. 49, and at the position where there is no output signal at row s, column t in FIG. 50, thereby to select one of the methods of generating the luminance signal.

$$|RB(s,t-1)-RB(s,t+1)| \qquad (77)$$
$$|G(s-1,t)-G(s+1,t)| \qquad (78)$$

Assuming the position of the pixel of interest as (s,t), the kind of the pixel of interest as J (J is either G or RB), and the kind of the right and left adjacent pixel s of the pixel of interest as K (K is either G or RB), then the results of the calculations below are compared to a particular threshold to select one of the two methods of generating the luminance signal.

$$|K(s,t-1)-K(s,t+1)| \qquad (79)$$
$$|J(s-1,t)-J(s+1,t)| \qquad (80)$$

Embodiment 37

Although the composition of the color video camera in embodiment 37 is the same as th at of embodiment 35 (FIG. 56), the signal processing operations in the arithmetic logic unit 75 and in the comparator 27 are different.

In embodiment 37, the difference between the outputs of the pixels of the same kind in the vicinity of the pixel of interest is compared to a particular threshold. And it is determined that the portion has high spatial frequency if the difference is greater than the threshold, and the operation of embodiment 32 is carried out, and, it is determined that the portion has low spatial frequency if the difference is less than the threshold, and accordingly the operation of embodiment 35 described previously is carried out.

For example, the results of the calculations below are compared to a particular threshold at the position of G of row s, column t in FIG. 49 and at a position where there is no output signal of row s, column t in FIG. 50, to select one of the two methods of generating the luminance signal.

$$|RB(s,t-1)-RB(s,t+1)| \qquad (81)$$
$$|G(s-1,t)-G(s+1,t)| \qquad (82)$$
$$|RB(s-1,t-1)-RB(s+1,t+1)| \qquad (83)$$
$$|RB(s-1,t+1)-RB(s+1,t-1)| \qquad (84)$$

Assuming that the position of the pixel of interest is (s, t), the kind of the pixel of interest as J (J is either G or RB), and the kind of the right and left adjacent pixels of the pixel of interest as K (K is either G or RB), the results of the calculations below are compared to a particular threshold to select one of the two methods of generating the luminance signal.

$$|K(s,t-1)-K(s,t+1)| \qquad (85)$$

$$|J(s-1,t)-J(s+1,t)| \quad (86)$$

$$|K(s-1,t-1)-K(s+1,t+1)| \quad (87)$$

$$|K(s-1,t+1)-K(s+1,t-1)| \quad (88)$$

Embodiment 38

Although the composition of the color video camera in embodiment 38 is the same as that of embodiment 35 (FIG. 56), the signal processing operations in the arithmetic logic unit 75 and in the comparator 27 are different.

In embodiment 38, the difference between the output signals of the diagonally adjacent pixels interposing the pixel of interest is compared to a particular threshold. And it is determined that the portion has high spatial frequency if the difference between the output signals is greater than the threshold, and the operation in embodiment 32 is carried out, and, it is determined that the portion has low spatial frequency if the difference between the output signals is less than the threshold, and the operation in embodiment 35 described previously is carried out.

For example, results of the calculations shown below are compared to the threshold at the position of G at row s, column t in FIG. 49, and at a position where there is no output signal of row s, column t in FIG. 50, thereby to select one of the two methods of generating the luminance signal accordingly.

$$|RB(s-1,t-1)-RB(s+1,t+1)| \quad (89)$$

$$|RB(s+1,t-1)-RB(s-1,t+1)| \quad (90)$$

Assuming the position of the pixel of interest as (s,t), the kind of the diagonally adjacent pixels of the pixel of interest as J (J is either G or RB), the results of the calculations shown below are compared to the threshold, thereby to select one of the two methods of generating the luminance signal.

$$|J(s-1,t-1)-J(s+1,t+1)| \quad (91)$$

$$|J(s+1,t-1)-J(s-1,t+1)| \quad (92)$$

Embodiment 39

Figure 57:
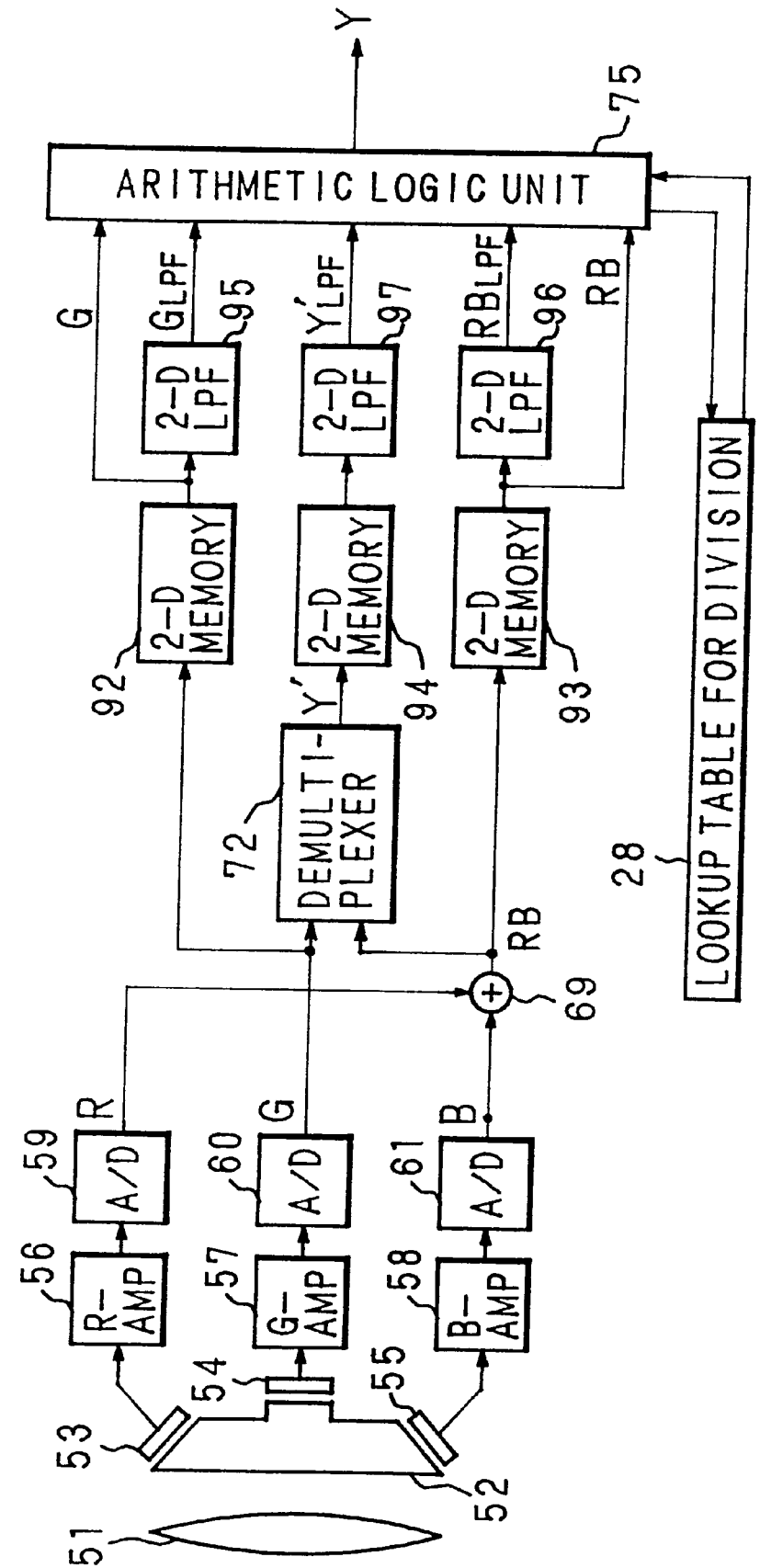
FIG. 57 shows a block circuit diagram illustrating further another color video camera of the invention.

FIG. 57 shows a block circuit diagram of the color video camera in embodiment 39. In FIG. 57, symbols which are the same as those of FIG. 48 indicate the identical portions, and numeral 28 represents a lookup table for division which is similar to that of FIG. 23 (embodiment 6).

The operation in the lookup table for division 28 is the same as that of embodiment 6, and will not be described here.

Embodiment 40

Application of the method of calculation in embodiment 7 with respect to embodiment 6 to the above embodiment 39 is this embodiment 40. The operation of the lookup table for division 28 in embodiment 40 is the same as that of embodiment 7, and will not be described here.

Embodiment 41

The composition of the color video camera in embodiment 41 is the same as that of embodiment 32 (FIG. 48). In embodiment 41, a two-dimensional low-pass filter made up of only bit shift circuits of weightings such as ⅛, ¼, ½ is used as a digital filter. The composition of the two-dimensional low-pass filter is similar to that of embodiment 19 (FIG. 33) where output Y'LPF(s, t) is obtained from the two-dimensional low-pass filter in response to the synthesized signal Y', and description thereof will be omitted here. It should be noted here, however, that use of a two clock delay circuit instead of a one clock delay circuit serves the purpose, because the two-dimensional low-pass filter for the Kth pixel at the position (s, t) of the pixel of interest is made by arranging the Kth pixels alternately every other pixel in the horizontal direction.

Embodiment 42

Although the composition of the color video camera in embodiment 42 is the same as that of embodiment 32 (FIG. 48), the method of calculating the luminance signal in the arithmetic logic unit 75 is different.

In embodiment 34, the luminance signal is obtained by adding 1 to each of the multiplier, divisor and dividend and subtracting 1 from the result of calculation at the end to minimize the calculation error, as shown in equations (73) and (74). However, because the number 1 is LSB which has no significant effect on the result of calculation, subtraction of 1 at the end may be omitted for the simplification of the circuit. Embodiment 42 is an example of such simplification. The luminance signal component Y(s,t) at the position of G of row s, column t is calculated by equation (93) below.

$$Y(s,t)=(G(s,t)+1)\times((Y'\text{LPF}(s,t)+1)/(\text{GLPF}(s,t)+1)) \quad (93)$$

The luminance signal component Y(s,t) at position (s,t) of pixel of kind K (K is either G or RB) is given by equation (94) below.

$$Y(s,t)=(K(s,t)+1)\times((Y'\text{LPF}(s,t)+1)/(\text{KLPF}(s,t)+1)) \quad (94)$$

Embodiment 43

Figure 58:
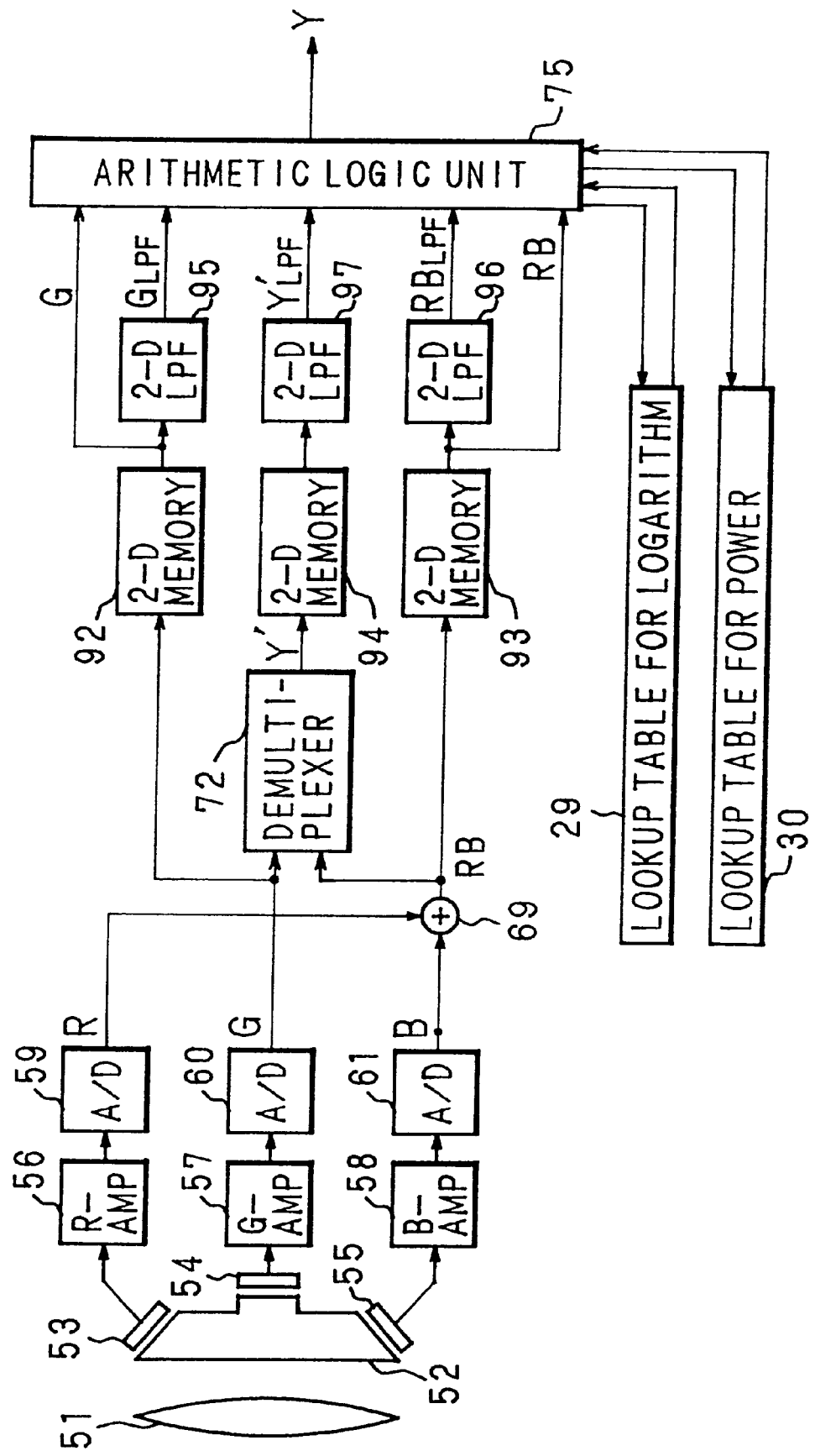
FIG. 58 shows a block circuit diagram illustrating further another color video camera of the invention.

FIG. 58 shows a block circuit diagram of the color video camera in embodiment 43. In FIG. 58, symbols which are the same as those in FIG. 48 indicate the identical portions. Numerals 29, 30 represent a lookup table for logarithm and a lookup table for power similar to those shown in FIG. 27 (embodiment 10).

The operation will now be described below. The calculation of the luminance signal component Y(s,t) in case the kind of the pixel at position (s,t) is K (K is either G or RB) is given, for example, by the equation (94) as described in embodiment 42. To this equation (94), the logarithmic conversion with base x is applied as shown in equation (95), where ^ represents power.

$$\begin{aligned}Y(s,t) &= X\hat{\ }\log x\{(K(s,t)+1)\times((Y'LPF(s,t)+1)/\\ &\quad (KPLF(s,t)+1))\}\\ &= X\hat{\ }\{\log x(K(s,t)+1)+\log x(Y'LPF(s,t)+1)-\\ &\quad \log x(KPLF(s,t)+1)\}\end{aligned} \quad (95)$$

In this embodiment 43, the arithmetic operation can be made using lookup tables of small capacity similarly to embodiment 10 described before. Although the above description is for the case of calculating a luminance signal based on the equation of embodiment 42, the calculation by means of a lookup table for logarithm and a lookup table for power may be applied to embodiment 32.

Embodiment 44

Figure 59:
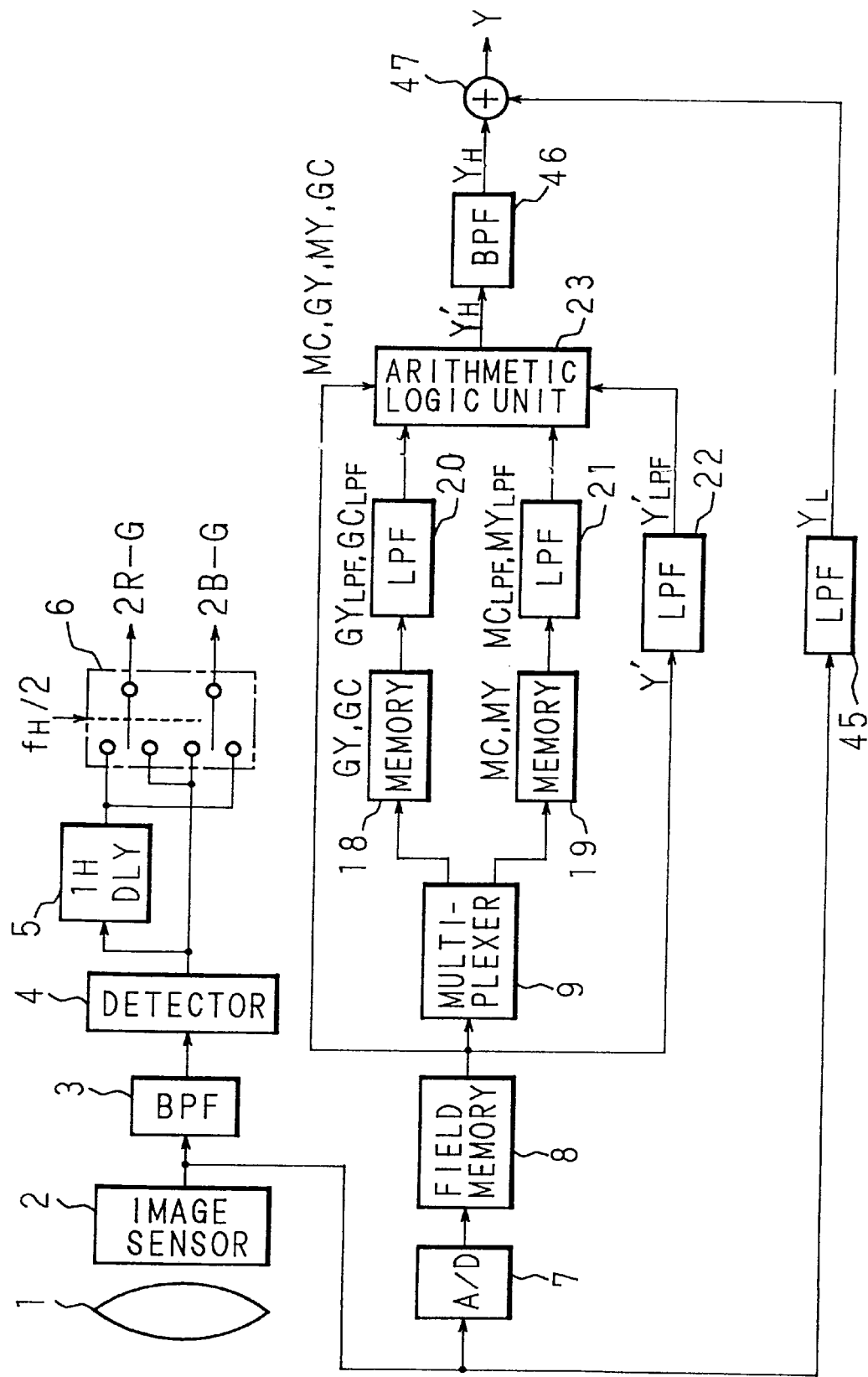
FIG. 59 shows a block circuit diagram illustrating further another color video camera of the invention.

FIG. 59 shows a block circuit diagram of the color video camera in embodiment 44. In FIG. 59, numerals which are the same as those in FIG. 15 indicate the identical portions. In FIG. 59, numeral 45 represents a low-pass filter (LPF), numeral 46 represents a band-pass filter (BPF) and numeral 47 represents an adder.

Figure 2:
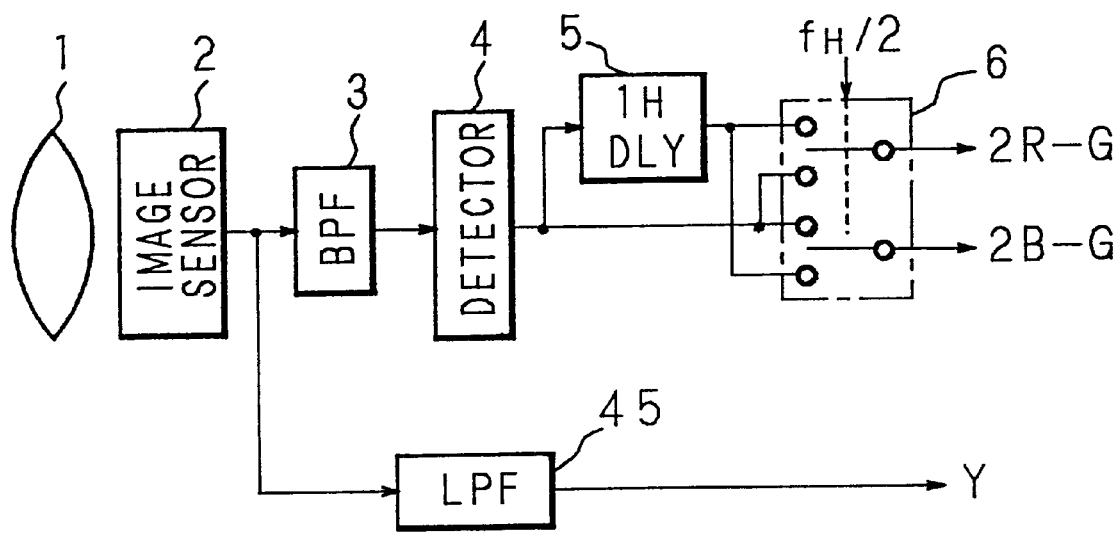
FIG. 2 shows a part of signal processing circuit of the conventional color video camera.

The operation will now be described below. The basic operation from the lens 1 to the arithmetic logic unit 23 is the same as that of embodiment 2. The output of the image sensor 2 is fed to the low-pass filter 45 to obtain YL signal as the output. The YL signal is similar to the luminance signal obtained with the prior art (see FIG. 2).

The operation of the arithmetic logic unit 23 will be described below. When the low-pass filter output of Y' signal is fed to the divider 25 as the dividend (FIG. 16), the arithmetic operation similar to that in embodiment 2 is performed to obtain the output of the multiplier 26 as the YH' signal of the pixel of interest.

In FIG. 17, YH' signal at the position of color filter GC of column t, for example, is calculated by equation (96) below.

$$YH'(t)=GC(t)\times(Y'LPF(t)/GCLPF(t)) \quad (96)$$

YH' signal at the position t of the color filter of kind K (K is either MC, GY, MY or GC) is calculated by equation (97) below, similarly to embodiment 2.

$$YH'(t)=K(t)\times(Y'LPF(t)/KLPF(t)) \quad (97)$$

The aperture correction is carried out by taking harmonics component YH from the YH' signal by means of the band-pass filter 46, combining the harmonics component YH and the YL signal in the adder 47 and thereby obtaining the luminance signal Y.

The principle of calculating the YH' signal in this embodiment 44 is basically the same as the calculation of the Y signal in embodiment 2. Calculating the YH' signal in this way makes it possible to eliminate the modulated components of the color signal without reducing the harmonics of the luminance signal. Consequently, the aperture correction without unnatural enhancement is made possible by taking the harmonics component YH from the YH' signal and mixing it with the YL signal.

Embodiment 45

Although the composition of the color video camera in embodiment 45 is the same as that of embodiment 44 (FIG. 59), the method of calculating the YH' signal in the arithmetic logic unit 23 is different.

The arithmetic operation in the arithmetic logic unit 23 will be described below. If each signal is made up of eight bits to represent the hue in 256 steps, for example, and value 1 of LSB is employed as a constant, YH' signal at the position of color filter GC of column t is calculated by equation (98) as shown below.

$$YH'(t)=(GC(t)+1)\times((Y'LPF(t)+1)/(GCLPF(t)+1)) \quad (98)$$

The calculation of YH' signal at the position t of color filter of kind K (K is either MC, GY, MY or GC) is given by equation (99).

$$YH'(t)=(K(t)+1)\times((Y'LPF(t)+1)/(KLPF(t)+1))-1 \quad (99)$$

Embodiment 46

Figure 60:
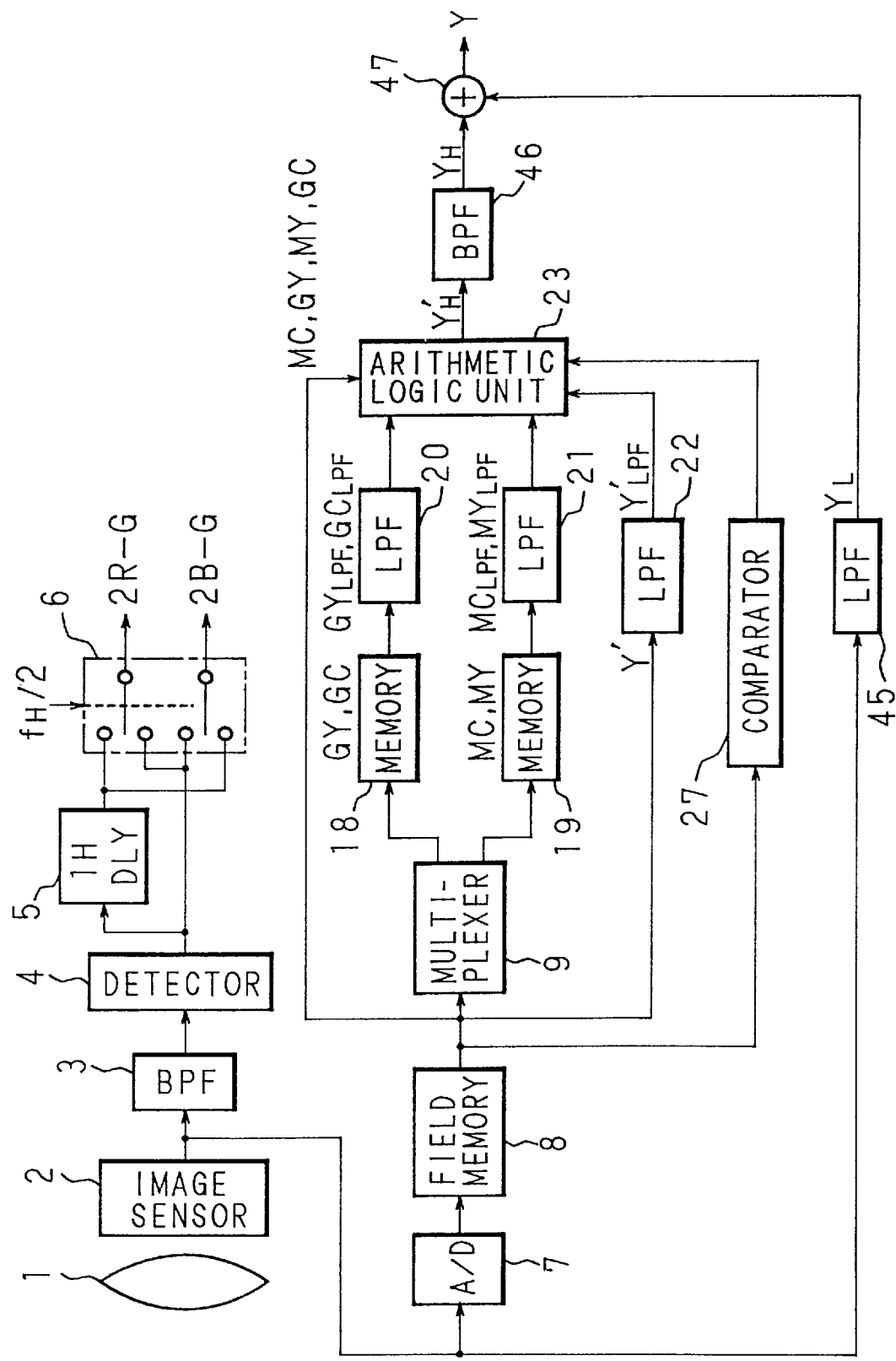
FIG. 60 shows a block circuit diagram illustrating further another color video camera of the invention.

FIG. 60 shows a block circuit diagram of the color video camera in embodiment 46. In FIG. 60, symbols which are the same as those in FIG. 59 indicate the identical portions, and numeral 27 represents a comparator similar to that shown in FIG. 22 (embodiment 4).

The operation will now be described below. The output signals of appropriate pixels in the vicinity of the pixel of interest are supplied from the field memory 8 to the comparator 27. In a portion where the image has a high spatial frequency, YH' signal is calculated similarly to embodiment 44 and, in a portion of a low spatial frequency, YH' signal is calculated from the weighted averaging value of the outputs of pixels of N kinds in the vicinity of the pixel of interest.

The arithmetic logic unit 23 operates similarly to embodiment 44 in the portion of high spatial frequency. In the portion of low spatial frequency, YH' signal at the position of color filter of GC of column t in FIG. 17, and at the position where there is no output signal of column t in FIG. 18, for example, is calculated by equation (100) below, similarly to embodiment 4.

$$YH'(t)=MY(t-1)/4+GC(t)/2+MY(t+1)/4 \quad (100)$$

The YH' signal, when the pixel of interest is located at position t, kind of the color filter of the pixel of interest is J and the kind of the color filters of the right and left adjacent pixels of the pixel of interest is K, is calculated by equation (101) below similarly to embodiment 4.

$$YH'(t)=K(t-1)/4+J(t)/2+K(t+1)/4 \quad (101)$$

Embodiment 47

Although the composition of the color video camera in embodiment 47 is the same as that of embodiment 46 (FIG. 60), the signal processing operations in the arithmetic logic unit 23 and in the comparator 27 are different.

In embodiment 47, the difference between the output signals of the right and left adjacent pixels of the pixel of interest is compared to a particular threshold. And it is determined that the portion has a high spatial frequency if the difference between the output signals is greater than the threshold, and the operation in embodiment 44 is carried out, and, it is determined that the portion has a low spatial frequency if the difference between the output signals is less than the threshold, and accordingly the operation in embodiment 46 is carried out.

Results of the calculations by the same equations (20), (21) as in embodiment 5 are compared to a particular threshold, and the method of calculating the YH' signal is selected according to the result of comparison.

Embodiment 48

Figure 61:
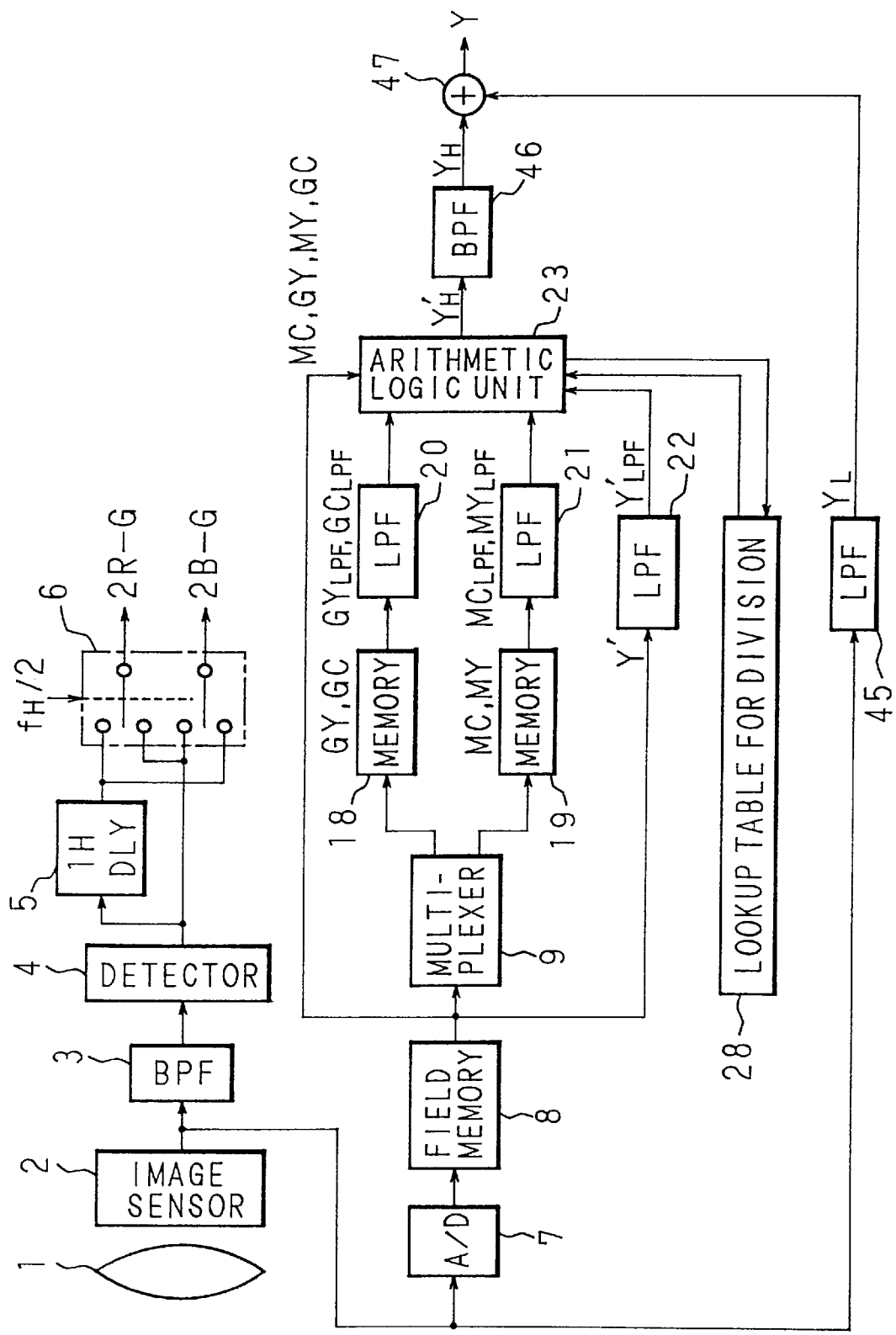
FIG. 61 shows a block circuit diagram illustrating further another color video camera of the invention.

FIG. 61 shows a block circuit diagram of the color video camera in embodiment 48. In FIG. 61, symbols which are the same as those in FIG. 59 indicate the identical portions, and numeral 28 represents a lookup table for division similar to that shown in FIG. 23 (embodiment 6).

The operation of the lookup table for division 28 is the same as that in embodiment 6, and will not be described here.

Embodiment 49

Application of the calculation method of embodiment 7 with respect to embodiment 6 to the above embodiment 48 is this embodiment 49. The operation of the lookup table for division 28 in embodiment 49 is the same as that of embodiment 7, and will not be described here.

Embodiment 50

The composition of the color video camera in embodiment 50 is the same as that of embodiment 44 (FIG. 59). In embodiment 50, a one-dimensional low-pass filter made up of only bit shift circuits of weightings such as ⅛, ¼ is used as a digital filter, The composition of the one-dimensional low-pass filter is similar to that of embodiment 8 (FIG. 26), and description thereof will be omitted here.

Embodiment 51

Although the composition of the color video camera in embodiment 51 is the same as that of embodiment 44 (FIG. 59), the method of calculating the YH' signal in the arithmetic logic unit 23 is different.

In embodiment 45, YH' signal is obtained by adding 1 to each of the multiplier, divisor and dividend and subtracting 1 from the result of calculation at the end to minimize the calculation error, as shown in equations (98) and (99). However, because the number 1 is LSB which has no significant effect on the result of calculation, subtraction of 1 at the end may be omitted for the simplification of the circuit. Embodiment 51 is an example of such simplification, where YH' signal at the position of color filter GC of column t is calculated by equation (102) below.

$$YH'(t) = (GC(t)+1) \times ((Y'LPF(t)+1)/(GCLPF(t)+1)) \quad (102)$$

The YH' signal at the position t of color filter of kind K is given by equation (103) below.

$$YH'(t) = (K(t)+1) \times ((Y'LPF(t)+1)/(KLPF(t)+1)) \quad (103)$$

Embodiment 52

Figure 62:
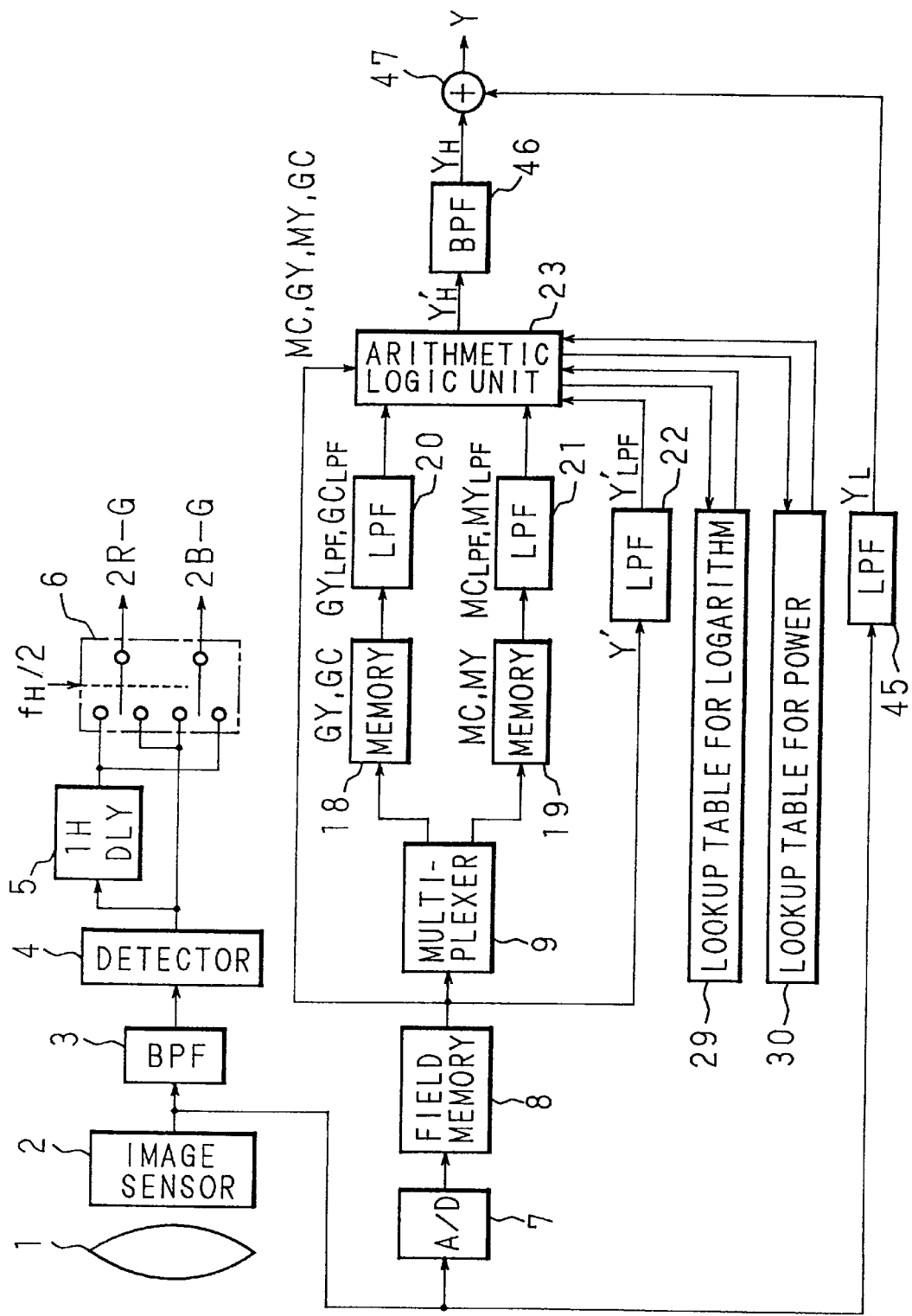
FIG. 62 shows a block circuit diagram illustrating further another color video camera of the invention.

FIG. 62 shows a block circuit diagram of the color video camera in embodiment 52. In FIG. 62, symbols which are the same as those in FIG. 59 indicate the identical portions, and numerals 29, 30 represent a lookup table for logarithm and a lookup table for power which are similar to those shown in FIG. 27 (embodiment 10).

The operation will now be described below. The calculation of the YH' signal in case the kind of the color filter at position t is K, for example, is given by equation (103) as described in embodiment 51. Logarithmic conversion with base x as shown in equation (104) is applied to equation (103), where ^ represents power.

$$YH'(t) = X^{\wedge} \log x\{(K(t) + 1) \times ((Y'LPF(t) + 1)/ \quad (104)$$
$$(KPLF(t) + 1))\}$$
$$= X^{\wedge}\{\log x(K(t) + 1) + \log x(Y'LPF(t) + 1) -$$
$$\log x(KPLF(t) + 1)\}$$

In this embodiment 52, too, the calculation can be carried out with lookup tables of small capacity as in the case of embodiment 10 described previously. Although the above description is for the case of calculating YH' signal based on the equation of embodiment 51, it goes without saying that the calculation by means of a lookup table for logarithm and a lookup table for power may be applied to embodiment 44.

Embodiment 53

Figure 63:
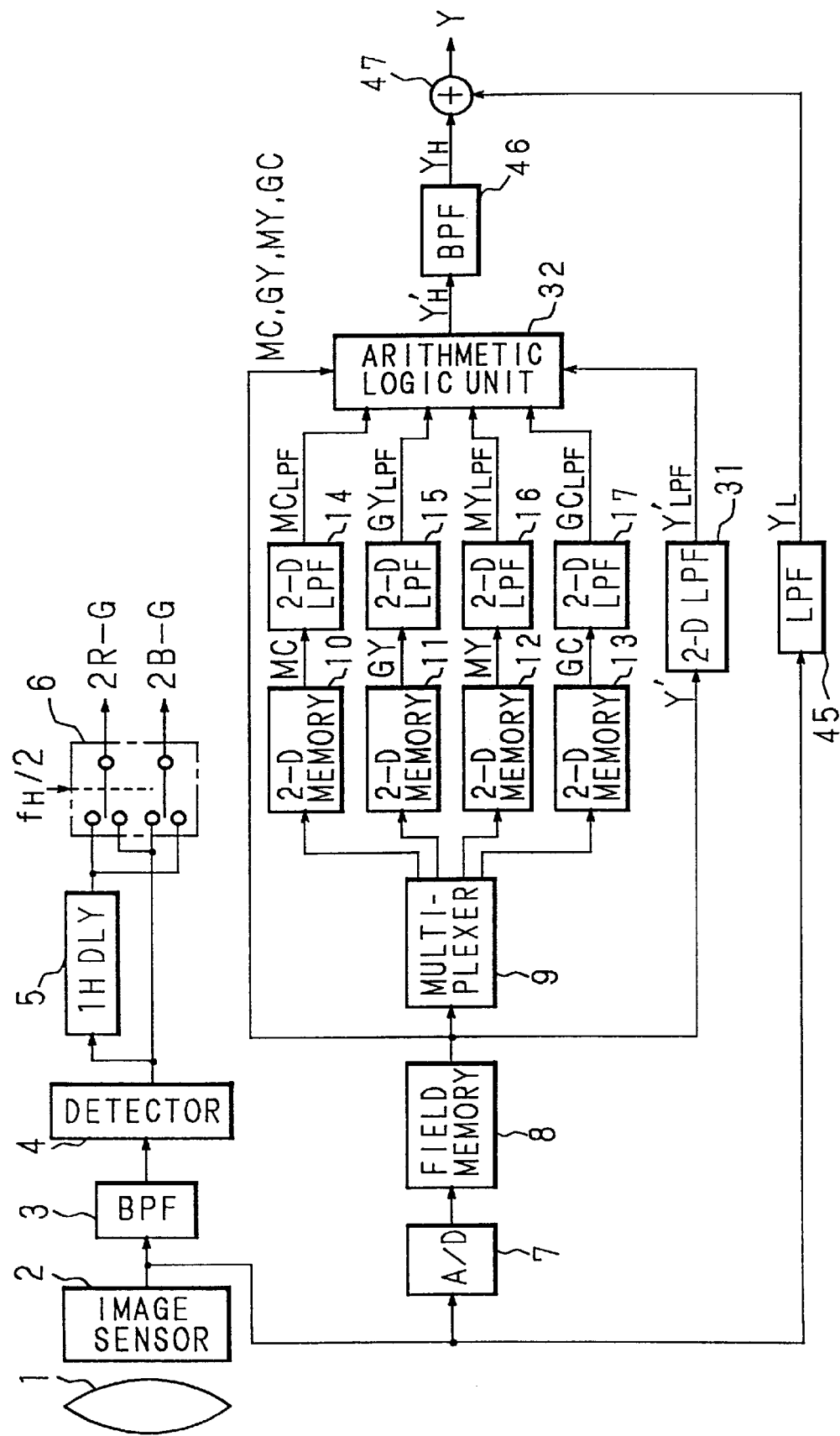
FIG. 63 shows a block circuit diagram illustrating further another color video camera of the invention.

FIG. 63 shows a block circuit diagram of the color video camera in embodiment 53. In FIG. 63, numerals which are the same as those of FIG. 28 indicate the identical portions, and will not be described here.

The operation will now be described below. Embodiment 53 is an example of using two-dimensional low-pass filters instead of one-dimensional low-pass filters in embodiment 44. In FIG. 6, YH' signal at the position of the color filter GC of row s, column t, for example, is calculated by equation (105).

$$YH'(s,t) = GC(s,t) \times (Y'LPF(s,t)/GCLPF(s,t)) \quad (105)$$

The calculation of the YH' signal at the position (s,t) of color filter of kind K is given by equation (106) below.

$$YH'(s,t) = K(s,t) \times (Y'LPF(s,t)/KLPF(s,t)) \quad (106)$$

The principle of calculating the YH' signal in this embodiment is basically the same as that in embodiment 44. Similarly to the case of embodiment 44, it is possible to eliminate the modulated components of the color signal without reducing the harmonics of the luminance signal, thereby enabling to carry out aperture correction without unnatural enhancement.

Embodiment 54

Although the composition of the color video camera in embodiment 54 is the same as that of embodiment 53 (FIG. 63), the method of calculating the Y signal in the arithmetic logic unit 32 is different.

The arithmetic operation in the arithmetic logic unit 32 will be described below. If each signal is made up of eight bits to represent the hue in 256 steps, for example, and value 1 of LSB is employed as a constant, YH' signal at the position of color filter GC of row s, column t is calculated by equation (107) as shown below.

$$YH'(s,t) = (GC(s,t)+1) \times ((Y'LPF(s,t)+1)/(GCLPF(s,t)+1))-1 \quad (107)$$

The calculation of the YH' signal at the position (s,t) of color filter of kind K is given by equation (108) below.

$$YH'(s,t) = (K(s,t)+1) \times ((Y'LPF(s,t)+1)/(KLPF(s,t)+1))-1 \quad (108)$$

Embodiment 55

Figure 64:
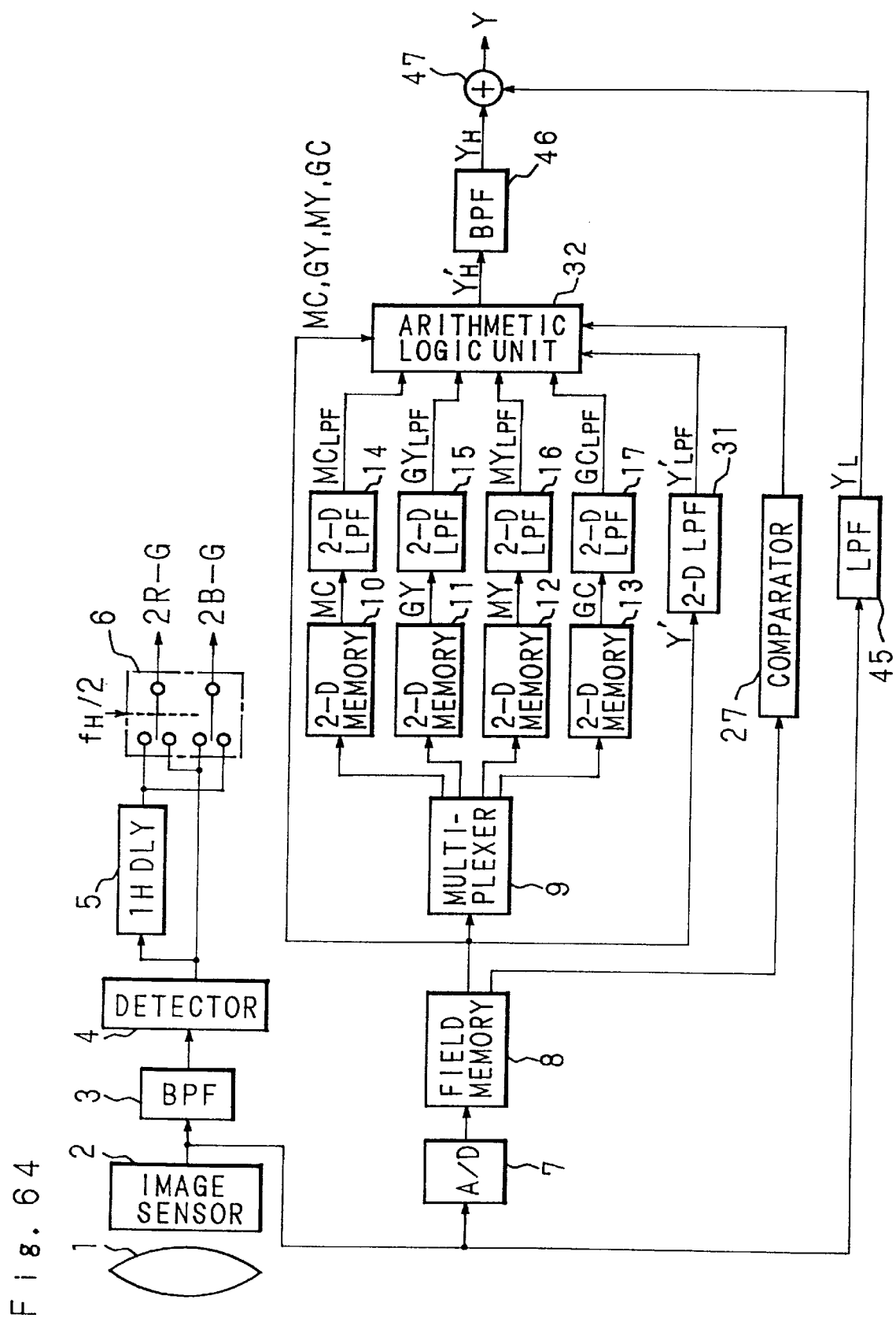
FIG. 64 shows a block circuit diagram illustrating further another color video camera of the invention.

FIG. 64 shows a block circuit diagram of the color video camera in embodiment 55. In FIG. 64, symbols which are the same as those in FIG. 63 indicate the identical portions and numeral 27 represents a comparator which is similar to that of FIG. 22 (embodiment 4).

The operation will now be described below. The output signals of appropriate pixels around the pixel of interest are fed to the comparator 27 from the field memory 8. In a portion of the image with a high spatial frequency, YH' signal is calculated similarly to embodiment 53 and, in a portion of low spatial frequency, YH' signal is calculated from the weighted averaging value of the outputs of pixels of N kinds around the pixel of interest.

The arithmetic logic unit 32 operates similarly to that in embodiment 53 in the portion of high spatial frequency. In a portion of low spatial frequency, YH' signal at position of color filter GC of row s, column t in FIG. 6, for example, is calculated by equation (109).

$$YH'(s, t) = MC(s - 1, t - 1)/16 + GY(s - 1, t)/8 + \quad (109)$$
$$MC(s - 1, t + 1)/16 + MY(s, t - 1)/8 +$$
$$GC(s, t)/4 + MY(s, t + 1)/8 +$$
$$MC(s + 1, t - 1)/16 + GY(s + 1, t)/8 +$$

-continued $$MC(s+1, t+1)/16$$

Assuming the position of the pixel of interest as (s, t), kind of color filter of the pixel of interest as J, kind of the color filters of the right and left adjacent pixels of the pixel of interest as K, kind of the color filters of the upper and lower adjacent pixels of the pixel of interest as L, kind of the color filters of the diagonally adjacent pixels of the pixel of interest as M, then YH' signal is calculated by equation (110) below.

$$YH'(s, t) = M(s-1, t-1)/16 + L(s-1, t)/8 + \qquad (110)$$
$$M(s-1, t+1)/16 + K(s, t-1)/8 +$$
$$J(s, t)/4 + K(s, t+1)/8 +$$
$$M(s+1, t-1)/16 + L(s+1, t)/8 +$$
$$M(s+1, t+1)/16$$

Embodiment 56

Although the composition of the color video camera in embodiment 56 is the same as that of embodiment 55 (FIG. 64), the signal processing operations in the arithmetic logic unit 32 and in the comparator 27 are different.

In embodiment 56, the difference between the output signals of the right and left adjacent pixels of the pixel of interest or the difference between the output signals of the upper and lower adjacent pixels of the pixel of interest is compared to a particular threshold. And it is determined that the portion has high spatial frequency if the difference between the output signals is greater than the threshold, and the operation of embodiment 53 is carried out, and it is determined that the portion has low spatial frequency if the difference between the output signals is less than the threshold, and accordingly the operation of embodiment 55 described above is carried out.

Results of calculation of the same equations (37) through (40) as in embodiment 14 described previously are compared to a particular threshold, and the method of calculating the YH' signal is selected according to the result of comparison.

Embodiment 57

Although the composition of the color video camera in embodiment 57 is the same as that of embodiment 55 (FIG. 64), the signal processing operations in the arithmetic logic unit 32 and in the comparator 27 are different.

In embodiment 57, the difference between pixels of the same spectral response characteristics around the pixel of interest is compared to a particular threshold. And it is determined that the portion has a high spatial frequency if the difference is greater than the threshold, and the operation of embodiment 53 is carried out, and, it is determined that the portion has a low spatial frequency if the difference is less than the threshold, and the operation of embodiment 55 described above is carried out.

Results of calculation of the same equations (41) through (48) as in embodiment 15 described previously are compared to a particular threshold, and the method of calculating the YH' signal is selected according to the result of comparison.

Embodiment 58

Although the composition of the color video camera in embodiment 58 is the same as that of embodiment 55 (FIG. 64), the signal processing operations in the arithmetic logic unit 32 and in the comparator 27 are different.

In embodiment 58, the difference between the output signals of diagonally adjacent pixels interposing the pixel of interest is compared to a particular threshold. And it is determined that the portion has a high spatial frequency if the difference between the output signals is greater than the threshold, and the operation of embodiment 53 is carried out, and, it is determined that the portion has a low spatial frequency if the difference between the output signals is less than the threshold, and accordingly the operation of embodiment 55 described previously is carried out.

Results of calculation of the same equations (49) through (52) as in embodiment 16 described previously are compared to a particular threshold, and the method of calculating the YH' signal is selected according to the result of comparison.

Embodiment 59

Figure 65:
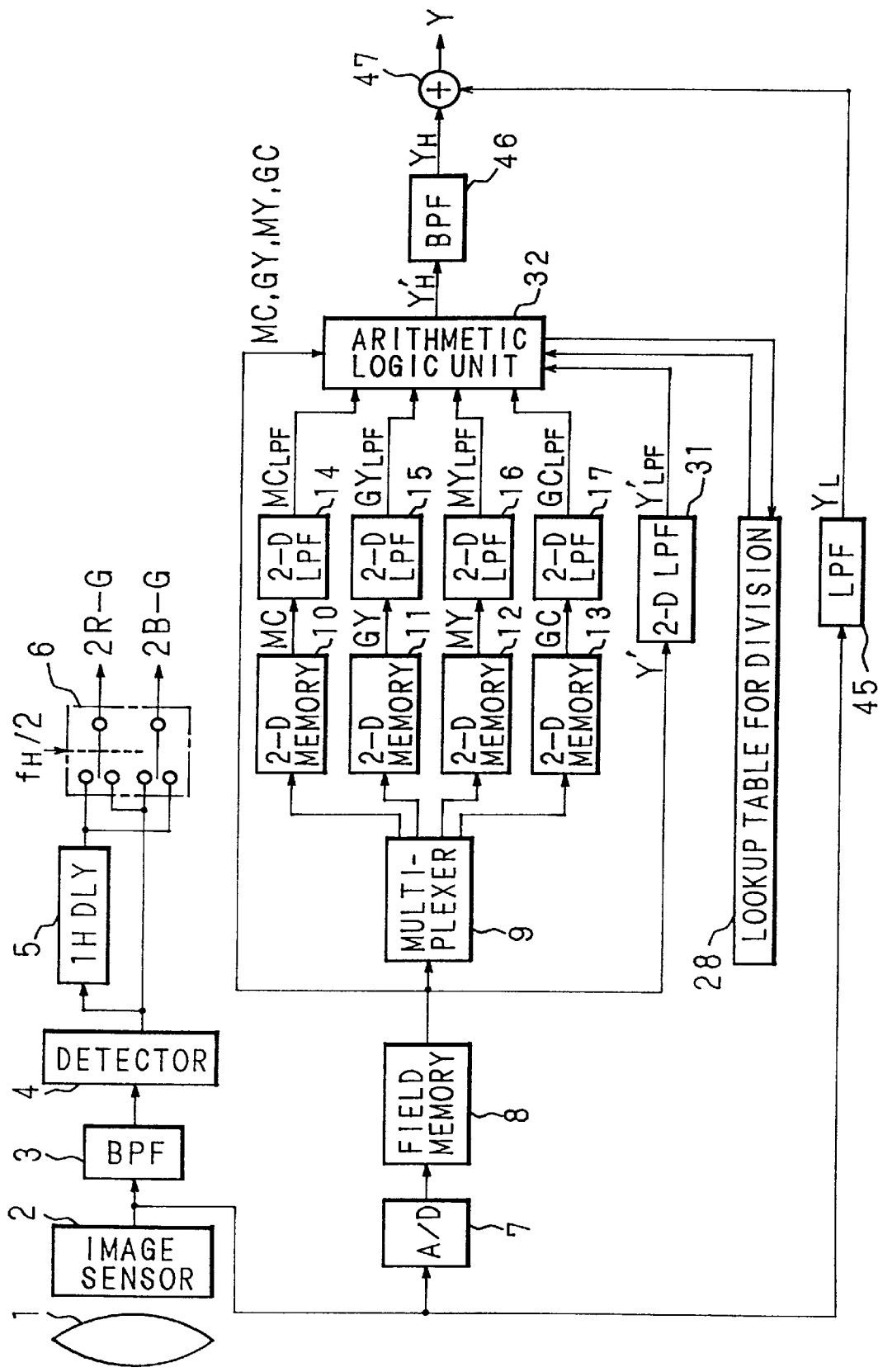
FIG. 65 shows a block circuit diagram illustrating further another color video camera of the invention.

FIG. 65 shows a block circuit diagram of the color video camera in embodiment 59. In FIG. 65, symbols which are the same as those in FIG. 63 indicate the identical portions, and numeral 28 represents a lookup table for division similar to that shown in FIG. 23 (embodiment 6).

The operation of the lookup table for division 28 is the same as that in embodiment 6, and will not be described here.

Embodiment 60

Application of the calculation method of embodiment 7 with respect to embodiment 6 to the above embodiment 59 is this embodiment 60. The operation of the lookup table for division 28 in embodiment 60 is the same as that of embodiment 7, and will not be described here.

Embodiment 61

The composition of the color video camera in embodiment 61 is the same as that of embodiment 53 (FIG. 63). In embodiment 61, a two-dimensional low-pass filter made up of only bit shift circuits of weightings such as ⅛, ¼, ½ is used as a digital filter. The composition of the two-dimensional low-pass filter is similar to that of embodiment 19 (FIG. 33), and the description thereof will be omitted.

Embodiment 62

Although the composition of the color video camera in embodiment 62 is the same as that of embodiment 53 (FIG. 63), the method of calculating the YH' signal in the arithmetic logic unit 32 is different.

In embodiment 54, the luminance signal is obtained by adding 1 to each of the multiplier, divisor and dividend and subtracting 1 from the result of calculation at the end to minimize the calculation error, as expressed by equations (107) and (108). However, because the number 1 is LSB which has no significant effect on the result of calculation, subtraction of 1 at the end may be omitted for the simplification of the circuit. Embodiment 62 is an example of such simplification, where YH' signal at the position GC of row s, column t is calculated by equation (111) below.

$$YH'(s,t) = (GC(s,t)+1) \times ((YLPF(s,t)+1)/(GCLPF(s,t)+1)) \qquad (111)$$

The YH' signal at the position (s, t) of the color filter of kind K of the pixel of interest is given by the equation (112) below.

$$YH'(s,t)=(K(s,t)+1)\times((Y'LPF(s,t)+1)/(KLPF(s,t)+1)) \quad (112)$$

Embodiment 63

Figure 66:
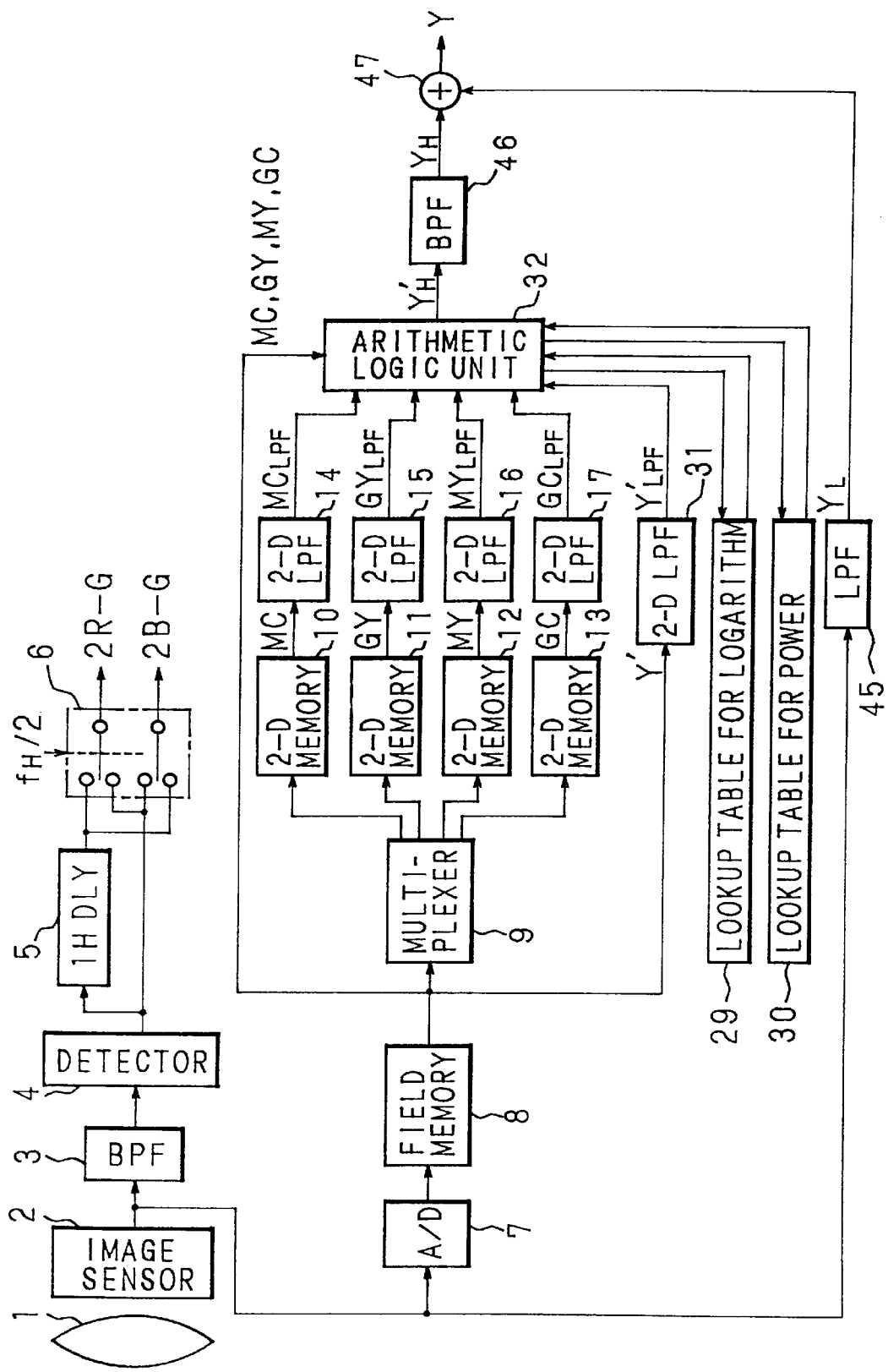
FIG. 66 shows a block circuit diagram illustrating further another color video camera of the invention.

FIG. 66 shows a block circuit diagram of the color video camera in embodiment 63. In FIG. 66, symbols which are the same as those in FIG. 63 indicate the identical portions. Numerals 29, 30 represent a lookup table for logarithm and a lookup table for power which are similar to those shown in FIG. 27 (embodiment 10).

The operation will now be described below. The calculation of the YH' signal in case the kind of the color filter of the pixel at position (s, t) is K is given by equation (112) as described in embodiment 62. Logarithmic conversion with base x as shown in equation (113) is applied to equation (112), where ^ represents power.

$$\begin{aligned}YH'(s,t) &= X^{\wedge}\log x\{(K(s,t)+1)\times((Y'LPF(s,t)+1)/\\ &\quad (KPLF(s,t)+1))\}\\ &= X^{\wedge}\{\log x(K(s,t)+1)+\log x(Y'LPF(s,t)+1)-\\ &\quad \log x(KPLF(s,t)+1)\}\end{aligned} \quad (113)$$

In this embodiment 63, the calculation can be carried out with lookup tables of small capacity as in the case of embodiment 10. Although the above description is for the case of calculating YH' signal based on the equation of embodiment 62, the calculation by means of a lookup table for logarithm and a lookup table for power may be applied to embodiment 53.

Embodiment 64

Figure 67:
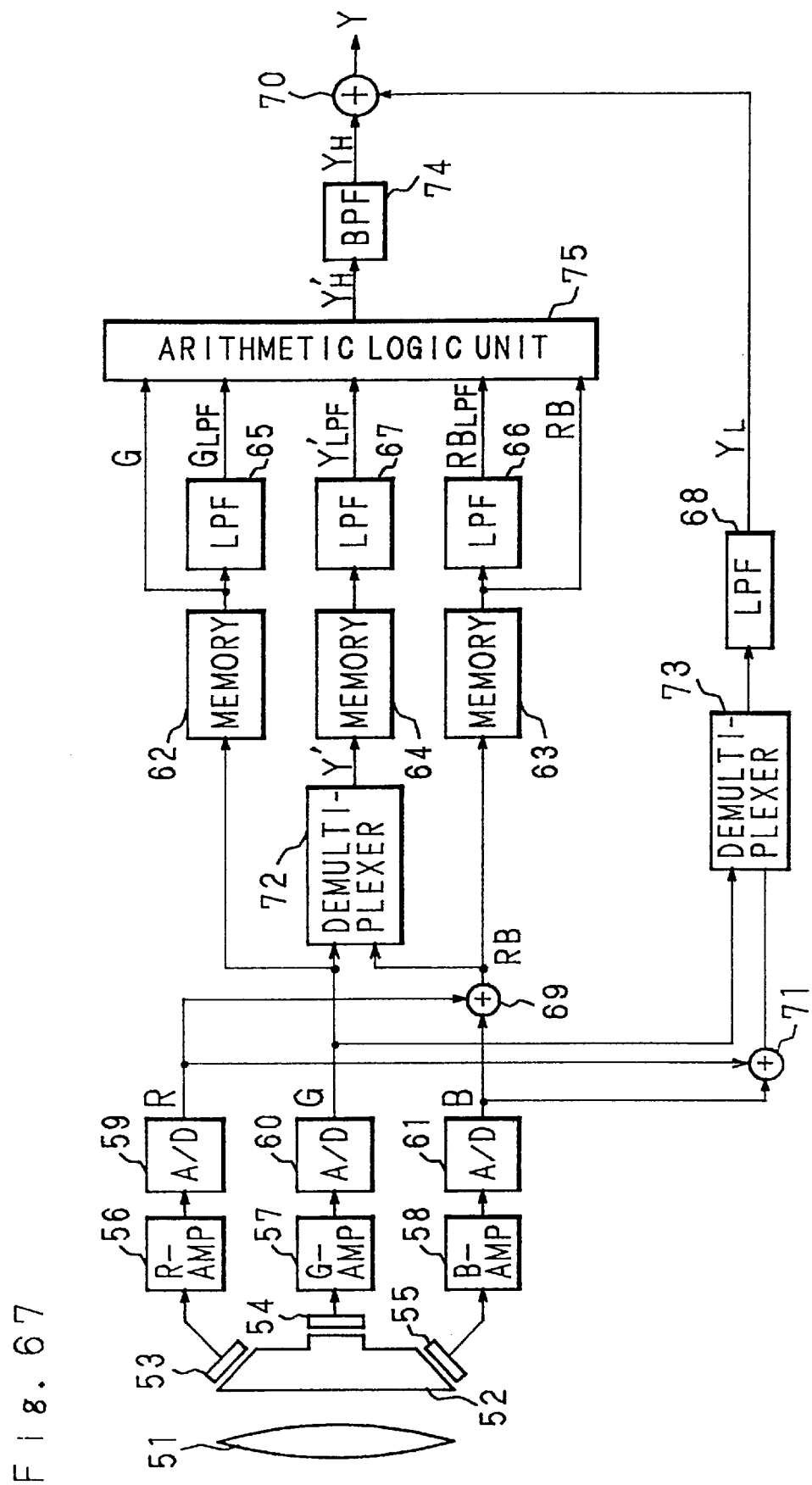
FIG. 67 shows a block circuit diagram illustrating further another color video camera of the invention.

FIG. 67 shows a block circuit diagram of the color video camera in embodiment 64. In FIG. 67, numerals which are the same as those in FIG. 35 indicate the identical portions. In FIG. 67, numeral 68 represents a low-pass filter (LPF), numeral 70, 71 represent adders, numeral 73 represents a demultiplexer. and numeral 74 represents a band-pass filter (BPF).

Figure 3:
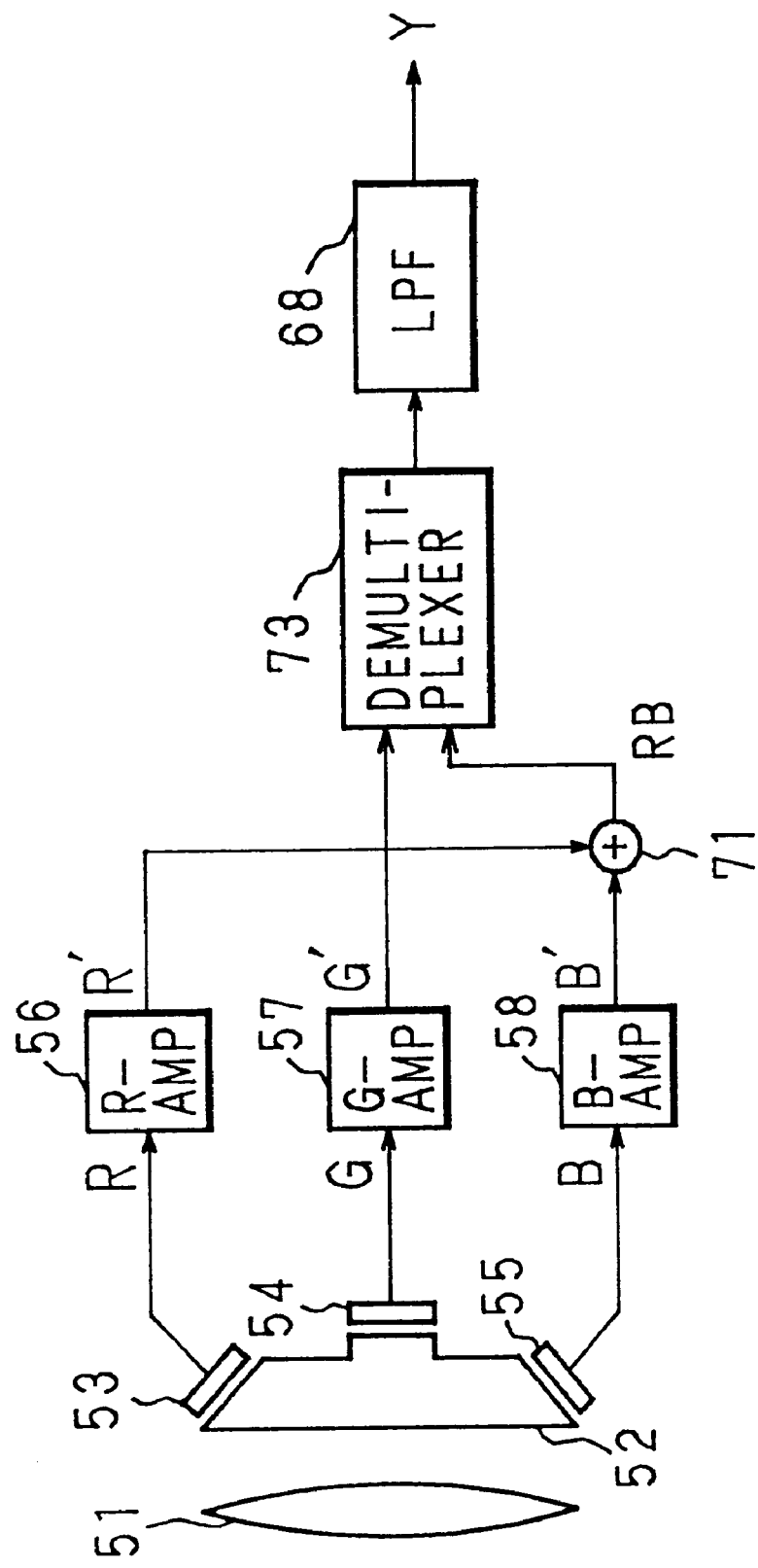
FIG. 3 shows a block circuit diagram illustrating a color video camera of the conventional spatial offset of 3-chip CCD color camera system.
Figure 4:
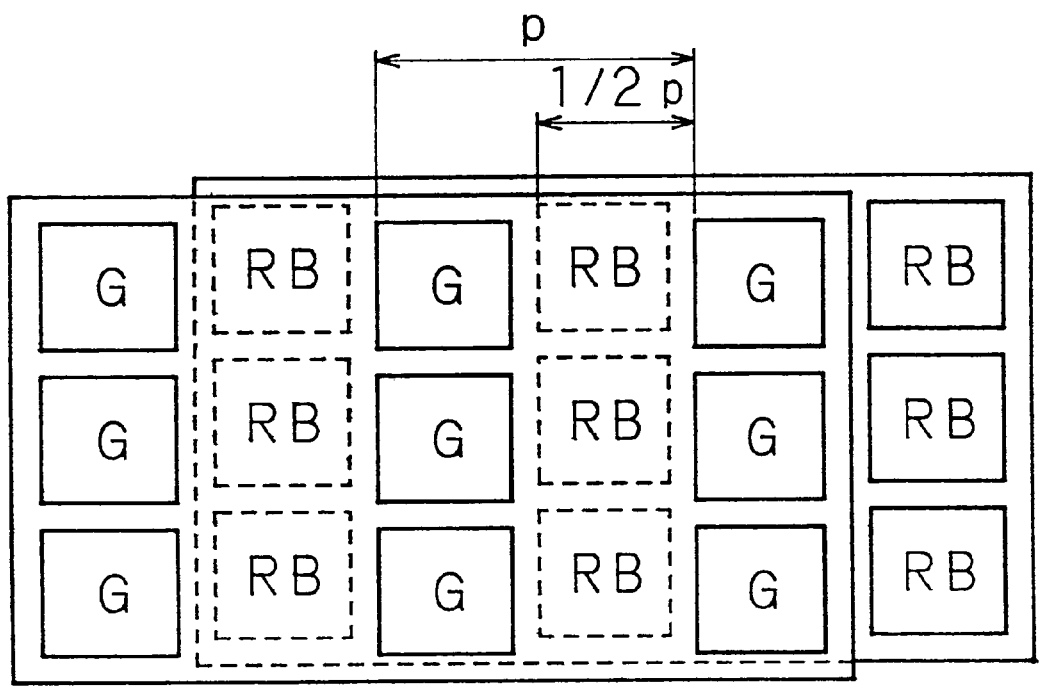
FIG. 4 shows the constitution of the output signals of the conventional spatial offset of 3-chip CCD color camera system.

The operation will now be described below. The basic operation from the lens 1 to the arithmetic logic unit 75 is the same as that of embodiment 22. The output signals of A/D converters 59, 61 are mixed in the adder 71. The demultiplexer 73 switches the composite signal and the output signal of A/D converter 60 alternately to supply input to the low-pass filter 68, thereby to obtain YL signal as the output. The YL signal is similar to the luminance signal obtained with the prior art (see FIG. 3).

The operation of the arithmetic logic unit 75 will be described below. The composition of the arithmetic logic unit 75 is the same as that of embodiment 22 (FIG. 36). When the low-pass filter output of Y' signal is fed to the divider 82 as the dividend, the arithmetic operation similar to that in embodiment 22 is performed to obtain the output of the multiplier 83 as the YH' signal.

In FIG. 37, YH' signal at the position of green pixel of column t, for example, is calculated by equation (114) below.

$$YH'(t)=G(t)\times(Y'LPF(t)/GLPF(t)) \quad (114)$$

The YH' signal at the position t of a pixel of kind K is calculated by equation (115) below, similarly to embodiment 22.

$$YH'(t)=K(t)\times(Y'LPF(t)/KLPF(t)) \quad (115)$$

The aperture correction is performed by taking harmonics component YH from the YH' signal by means of the band-pass filter 74, combining the harmonics component YH and the YL signal in the adder 70 and thereby obtaining the luminance signal Y.

Embodiment 65

Figure 44:
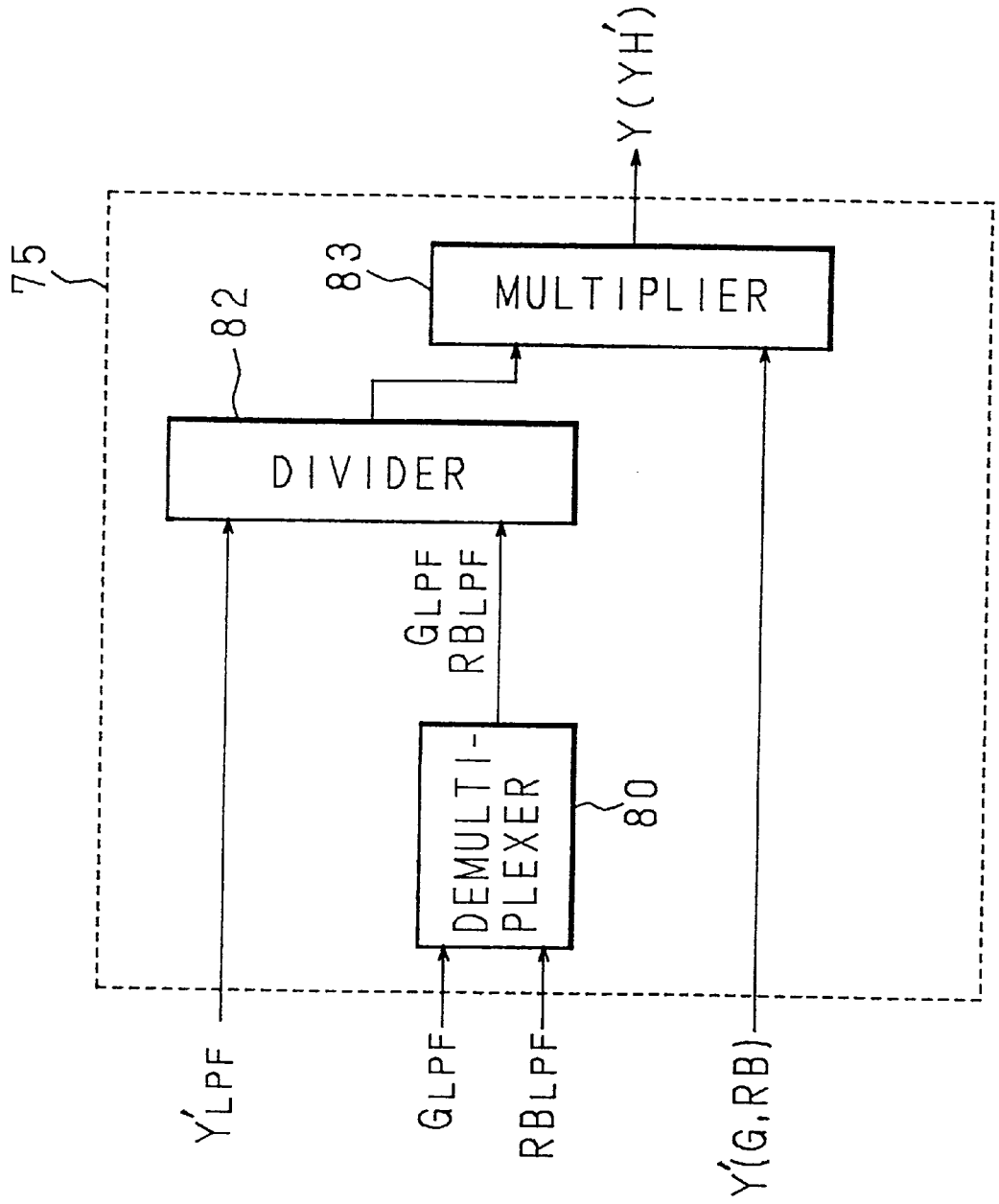
FIG. 44 shows a block circuit diagram illustrating the constitution of the arithmetic logic unit.
Figure 68:
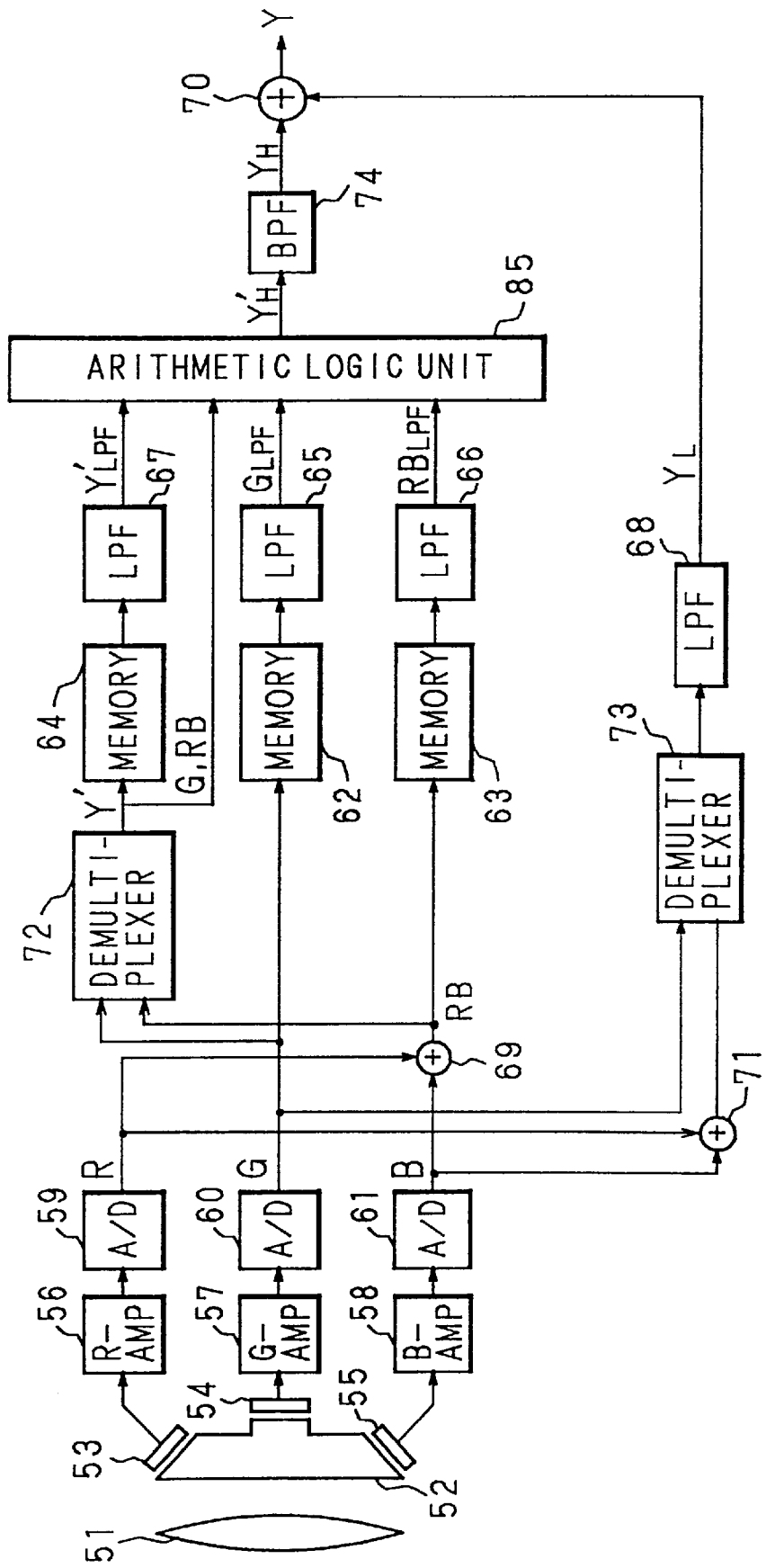
FIG. 68 shows a block circuit diagram illustrating further another color video camera of the invention.

FIG. 68 shows a block circuit diagram of the color video camera in embodiment 65. In FIG. 68, numerals which are the same as those of FIG. 67 or FIG. 43 indicate the identical portions. The composition of the arithmetic logic unit 85 is the same as that of embodiment 23 (FIG. 44).

In this embodiment, too, YH' signal which is similar to that of embodiment 64 is obtained from the arithmetic logic unit 85, with aperture correction being carried out similarly to embodiment 64 thereafter.

The principle of calculating the YH' signal in embodiments 64, 65 is basically the same as the calculation of Y signal in embodiments 22, 23. When the YH' signal is calculated, it is made possible to eliminate the modulated components of the color signal without reducing the harmonics of the luminance signal. Thus it is made possible to carry out aperture correction without unnatural enhancement, by taking harmonics component YH from the YH' signal and mixing it wit h the YL signal.

Embodiment 66

Although the composition of the color video camera in embodiment 66 is the same as that of FIG. 67, the signal processing operation in the arithmetic logic unit 75 is different. Specifically, YH'(t) at the position of G of column t is calculated by equation (116).

$$YH'(t)=(G(t)+1)\times((Y'LPF(t)+1)/(GLPF(t)+1))-1 \quad (116)$$

The calculation of the YH' signal at the position t of a pixel of kind K is given by equation (117) below.

$$YH'(t)=(K(t)+1)\times((Y'LPF(t)+1)/(KLPF(t)+1))-1 \quad (117)$$

Embodiment 67

Figure 69:
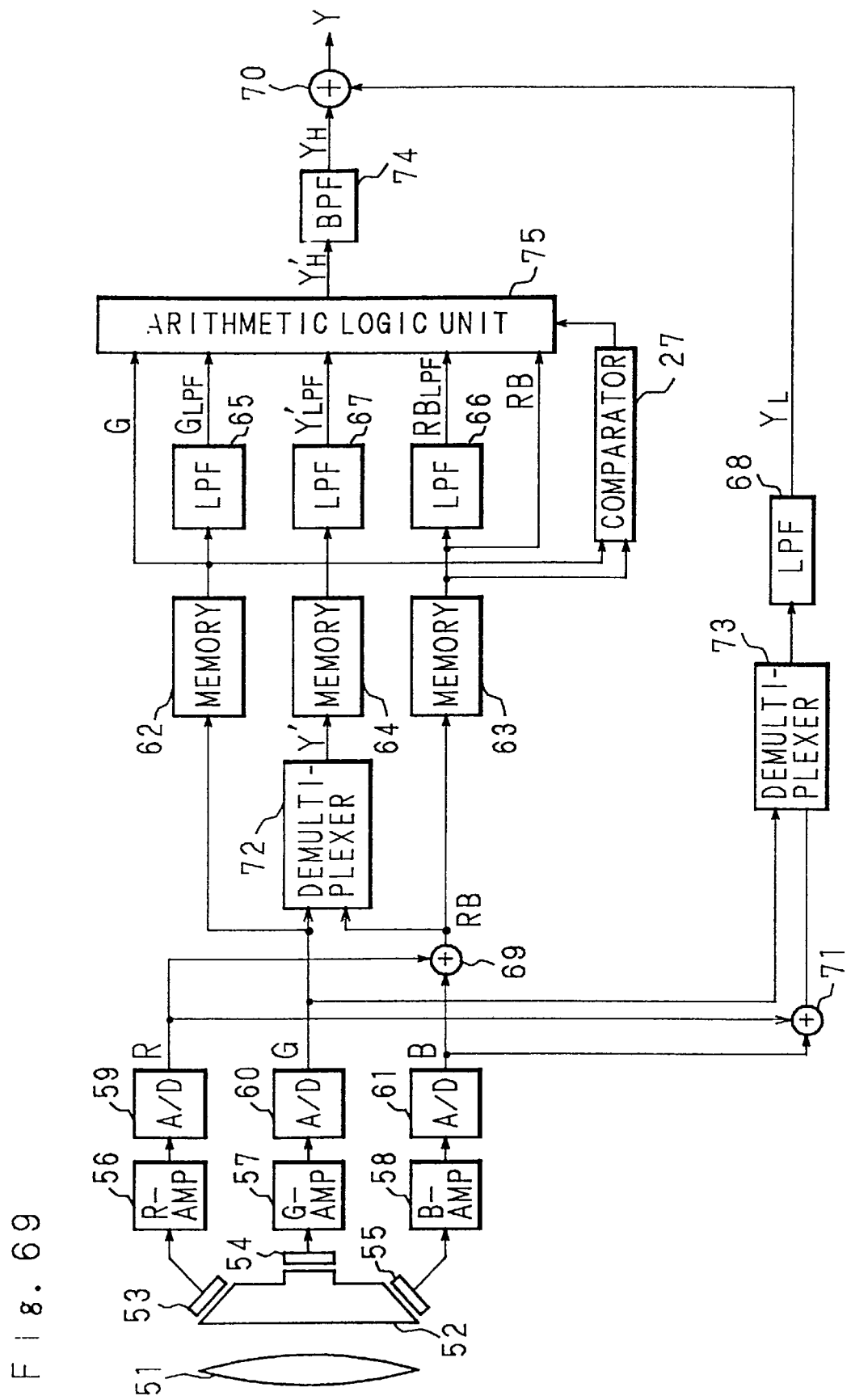
FIG. 69 shows a block circuit diagram illustrating further another color video camera of the invention.

FIG. 69 shows a block circuit diagram of the color video camera in embodiment 67. In FIG. 69, numerals which are the same as those in FIG. 67 indicate the identical portions, and numeral 27 represents a comparator similar to that shown in FIG. 22 (embodiment 4).

The operation will now be described below. The output signals of appropriate pixels in the vicinity of the pixel of interest are supplied from memories 62, 63 to the comparator 27. In a portion where the image has a high spatial frequency, YH' signal is calculated similarly to embodiment 64 and, in a portion of a low spatial frequency, YH' signal is calculated from the weighted averaging value of the G signal and RB signal.

The arithmetic logic unit 75 operates similarly to embodiment 64 in the portion of high spatial frequency. In the portion of low spatial frequency, YH' signal at the position of G of column t in FIG. 37, and at the position where there is no output signal of column t in FIG. 38, for example, is calculated by equation (118) below.

$$YH'(t)=RB(t-1)/4+G(t)/2+RB(t+1)/4 \quad (118)$$

The YH' signal, when the pixel of interest is located at position t, kind of the pixel of interest is J and the kind of the right and left adjacent pixels of the pixel of interest is K, is calculated by equation (119) below.

$$YH'(t)=K(t-1)/4+J(t)/2+K(t+1)/4 \qquad (119)$$

Embodiment 68

Although the composition of the color video camera in embodiment 68 is the same as that of embodiment 67 (FIG. 69), the signal processing operations in the arithmetic logic unit 75 and in the comparator 27 are different.

In embodiment 68, the difference between the output signals of the right and left adjacent pixels of the pixel of interest is compared to a particular threshold. And it is determined that the portion has a high spatial frequency if the difference between the output signals is greater than the threshold, and the operation of embodiment 64 is carried out, and it is determined that the portion has a low spatial frequency if the difference between the output signals is less than the threshold, and accordingly the operation of embodiment 67 described above is carried out.

Results of calculation of the same equations (66) and (67) as in embodiment 26 described previously are compared to a particular threshold, and the method of calculating the YH' signal is selected according to the result of comparison.

Embodiment 69

Figure 70:
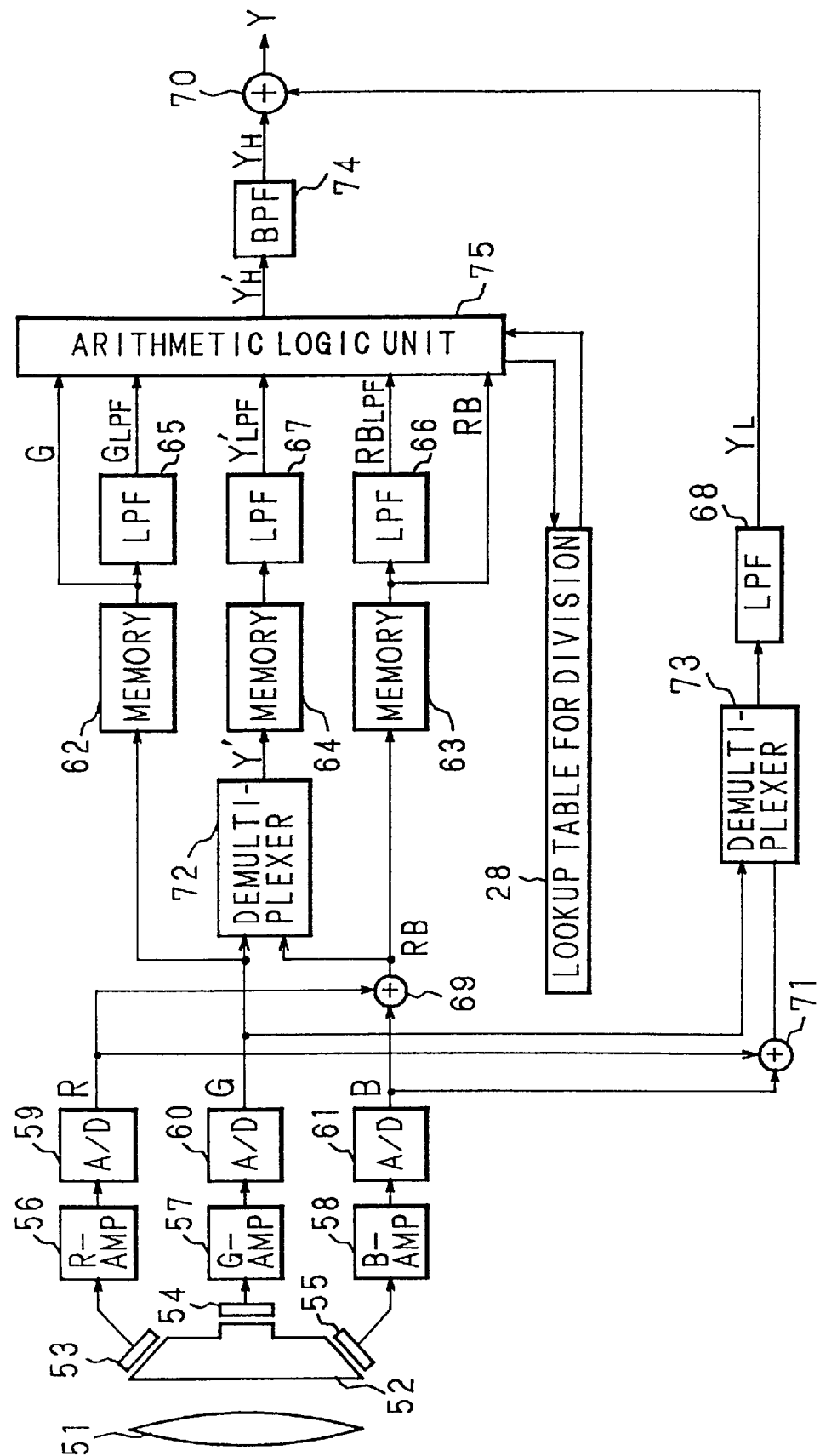
FIG. 70 shows a block circuit diagram illustrating further another color video camera of the invention.

FIG. 70 shows a block circuit diagram of the color video camera in embodiment 69. In FIG. 70, symbols which are the same as those in FIG. 67 indicate the identical portions, and numeral 28 represents a lookup table for division similar to that shown in FIG. 23 (embodiment 6).

The operation of the lookup table for division 28 is the same as that in embodiment 6, and description thereof will be omitted.

Embodiment 70

An example in which the method of calculation in embodiment 7 with respect to embodiment 6 is applied to embodiment 69 described above is this embodiment 70. The operation of the lookup table for division 28 in embodiment 70 is the same as that in embodiment 7, and description thereof will be omitted here.

Embodiment 71

The composition of the color video camera in embodiment 71 is the same as that of embodiment 64 (FIG. 67). In embodiment 71, a one-dimensional low-pass filter is used as a digital filter which is made up of only bit shift circuits having weightings such as ⅛, ¼. The construction of the one-dimensional low-pass filter is similar to that in embodiment 8 (FIG. 26) and will not be described here.

Embodiment 72

Although the composition of the color video camera in embodiment 72 is the same as that of embodiment 64 (FIG. 67), the method of calculating the YH' signal in the arithmetic logic unit 75 is different.

In embodiment 66, YH signal is obtained by adding 1 to each of the multiplier, divisor and dividend and subtracting 1 from the result of calculation at the end to minimize the calculation error, as expressed by equations (116) and (117). However, because the number 1 is LSB which has no significant effect on the result of calculation, subtraction of 1 at the end may be omitted for the simplification of the circuit. Embodiment 72 is an example of such simplification, where the YH' signal at the position of G of column t is calculated by equation (120) below.

$$YH'(t)=(G(t)+1)\times((Y'\text{LPF}(t)+1)/(\text{GLPF}(t)+1)) \qquad (120)$$

The calculation of the YH' signal at the position t of a pixel of kind K is given by equation (121).

$$YH'(t)=(K(t)+1)\times((Y'\text{LPF}(t)+1)/(\text{KLPF}(t)+1)) \qquad (121)$$

Embodiment 73

Figure 71:
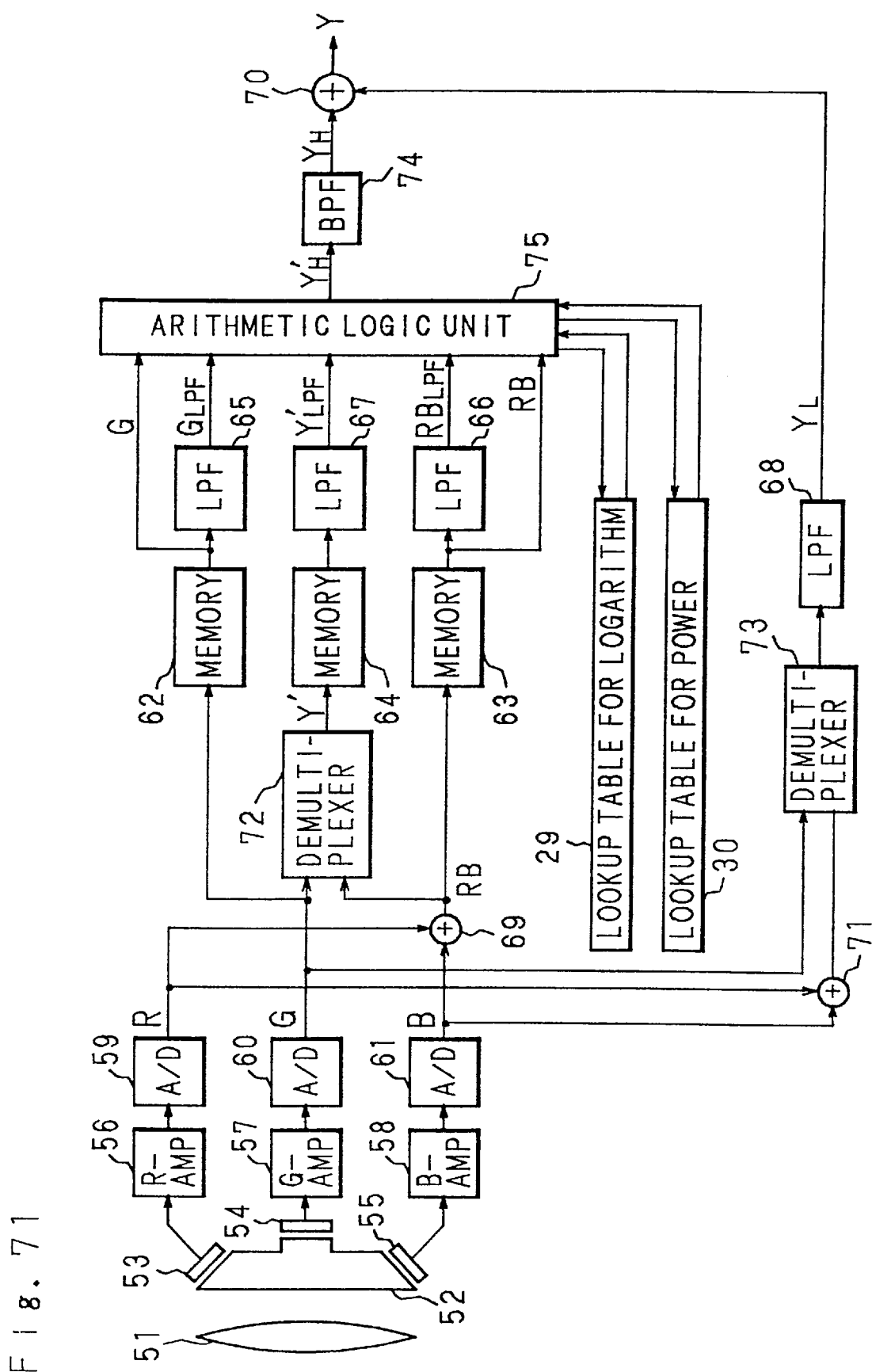
FIG. 71 shows a block circuit diagram illustrating further another color video camera of the invention.

FIG. 71 shows a block circuit diagram of the color video camera in embodiment 73. In FIG. 71, numerals which are the same as those in FIG. 67 indicate the identical portions and numerals 29, 30 represent a lookup table for logarithm and a lookup table for power which are similar to those shown in FIG. 27 (embodiment 10).

The operation will now be described below. YH' signal in case the kind of the pixel at position t is K, for example, is given by equation (121) as described in embodiment 72. To the equation (121), logarithmic conversion with base x as shown in equation (122) is applied, where ^ represents power.

$$\begin{aligned}YH'(t) &= X^{\wedge}\log x\{(K(t)+1)\times((Y'LPF(t)+1)/ \\ &\quad (KPLF(t)+1))\} \\ &= X^{\wedge}\{\log x(K(t)+1)+\log x(Y'LPF(t)+1)- \\ &\quad \log x(KPLF(t)+1)\}\end{aligned} \qquad (122)$$

In embodiment 73, too, the calculation can be carried out by using lookup tables of small capacity as in embodiment 10 described previously. Although the above description is for the case of calculating YH' signal based on the equation of embodiment 72, it goes without saying that the calculation by means of a lookup table for logarithm and a lookup table for power may be applied to embodiment 64.

Embodiment 74

Figure 72:
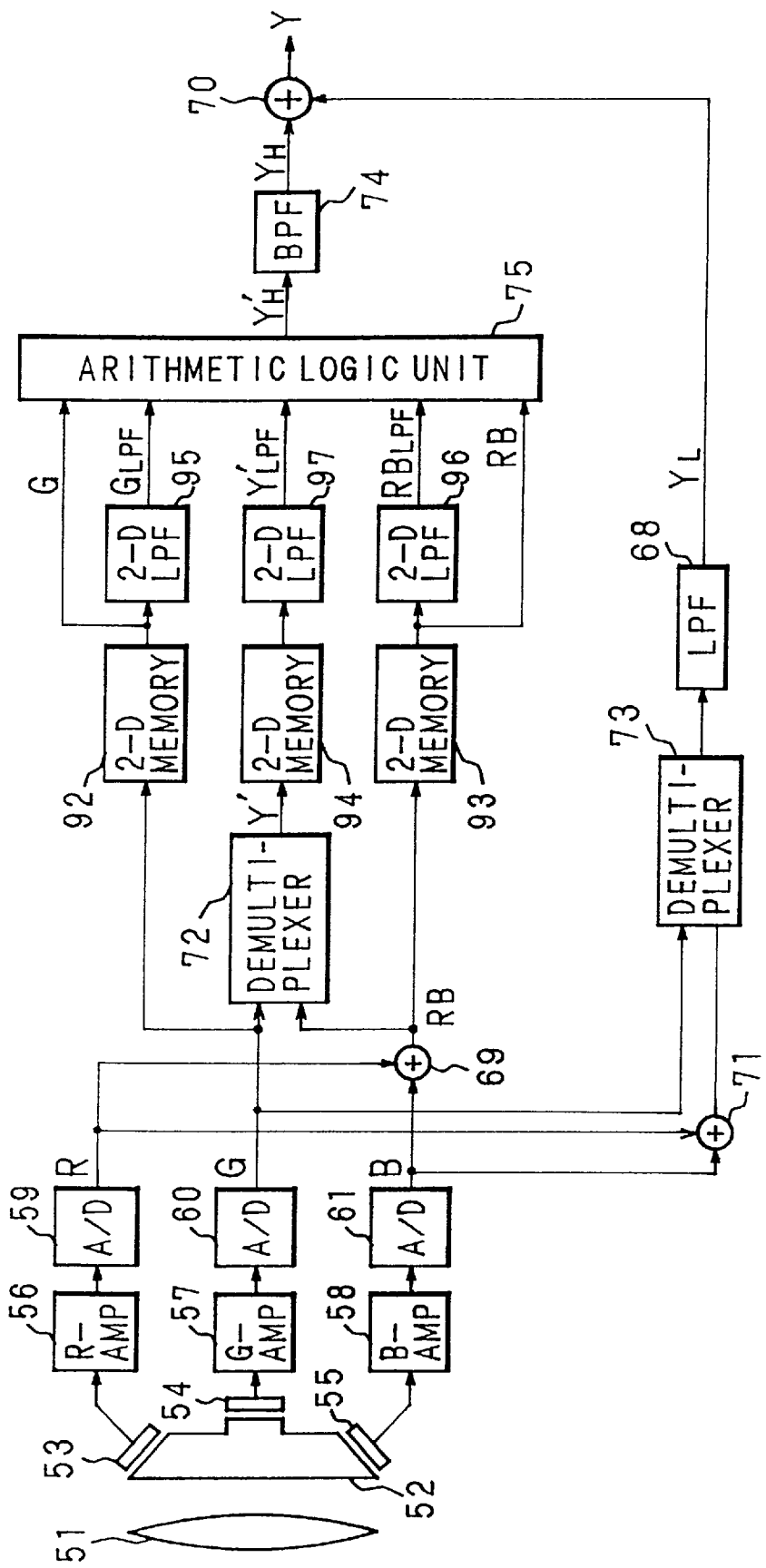
FIG. 72 shows a block circuit diagram illustrating further another color video camera of the invention.

FIG. 72 shows a block circuit diagram of the color video camera in embodiment 74. In FIG. 72, numerals which are the same as those in FIG. 67 indicate the identical portions and will not be described here. In FIG. 72, numerals 92, 93, 94 represent two-dimensional memories, and numerals 95, 96, 97 represent two-dimenisional low-pass filters (LPF). The composition of the arithmetic logic unit 75 is the same as that of embodiment 22 (see FIG. 36).

The operation will now be described below. The basic operation is the same as that of embodiment 64. Similarly to embodiment 32, the two-dimensional memories 92, 93, 94 store G signal, RB composite signal and Y' signal written therein (see FIG. 49, FIG. 50, FIG. 51), and two-dimensional low-pass filter outputs (see FIG. 52, FIG. 53, FIG. 54) are obtained from the two-dimensional low-pass filters 95, 96, 97.

Embodiment 74 is an example of using two-dimensional low-pass filters instead of one-dimensional low-pass filters in embodiment 64. In FIG. 49, YH' signal at the position of green pixel of row s, column t, for example, is calculated by equation (123).

$$YH'(s,t)=G(s,t)\times(Y'\text{LPF}(s,t)/\text{GLPF}(s,t)) \qquad (123)$$

The calculation of YH' signal at position (s,t) of pixel of kind K (K is either G or RB) is given by equation (124) below, similarly to embodiment 32.

$$YH'(s,t)=K(s,t)\times(Y\text{LPF}(s,t)/K\text{LPF}(s,t)) \quad (124)$$

Embodiment 75

Figure 73:
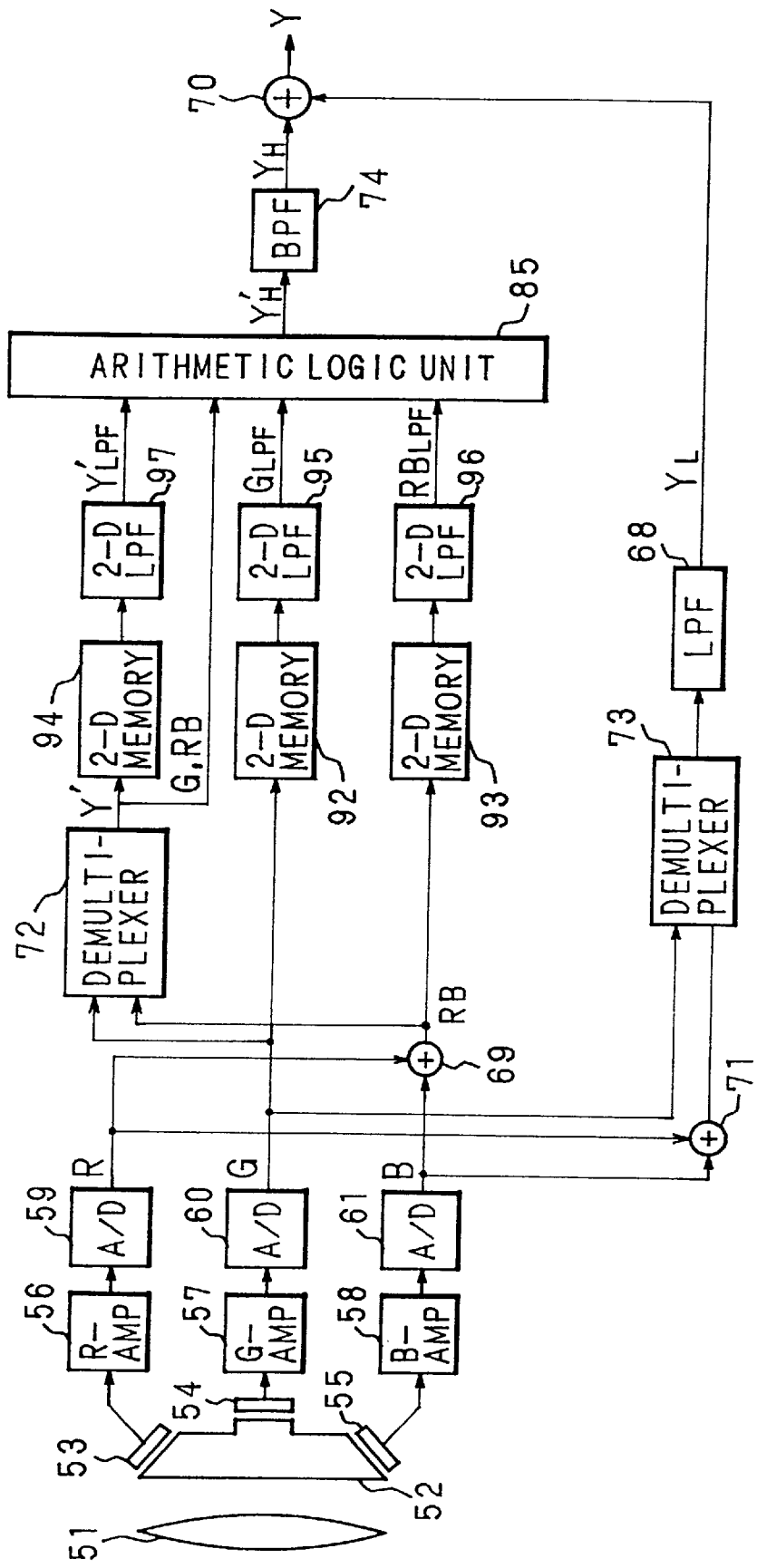
FIG. 73 shows a block circuit diagram illustrating further another color video camera of the invention.

FIG. 73 shows a block circuit diagram of the color video camera in embodiment 75. In FIG. 73, numerals which are the same as those in FIG. 72 indicate the identical portions and will not be described here. In FIG. 73, the arithmetic logic unit 85 has the same composition as that of the arithmetic logic unit 85 in embodiment 23 described previously (FIG. 44). In this embodiment 75, the demultiplexer 72 feeds G signal and R, B composite signal to the arithmetic logic unit 85. In embodiment 75, two-dimensional low-pass filters are used instead of one-dimensional low-pass filters in embodiment 65.

The principle of calculating Y signal in embodiments 74, 75 is basically the same as that in embodiments 64, 65, and is capable of eliminating the modulated components of the color signal without reducing the harmonics of the luminance signal to calculate the YH' signal, thereby enabling it to carry out the aperture correction without unnatural enhancement by taking the harmonics component YH from the YH' signal and mixing it with YL signal.

Embodiment 76

Although the composition of the color video camera in embodiment 76 is the same as that of FIG. 72, the signal processing operation in the arithmetic logic unit 75 is different. Specifically, YH' (s,t) at the position of G at (s, t) is calculated by equation (125).

$$YH'(s,t)=(G(s,t)+1)\times((Y\text{LPF}(s,t)+1)/(G\text{LPF}(s,t)+1))-1 \quad (125)$$

The calculation of the YH' signal at the position (s, t) of a pixel of kind K is given by equation (126) below.

$$YH'(s,t)=(K(s,t)+1)\times((Y\text{LPF}(s,t)+1)/(K\text{LPF}(s,t)+1))-1 \quad (126)$$

Embodiment 77

Figure 74:
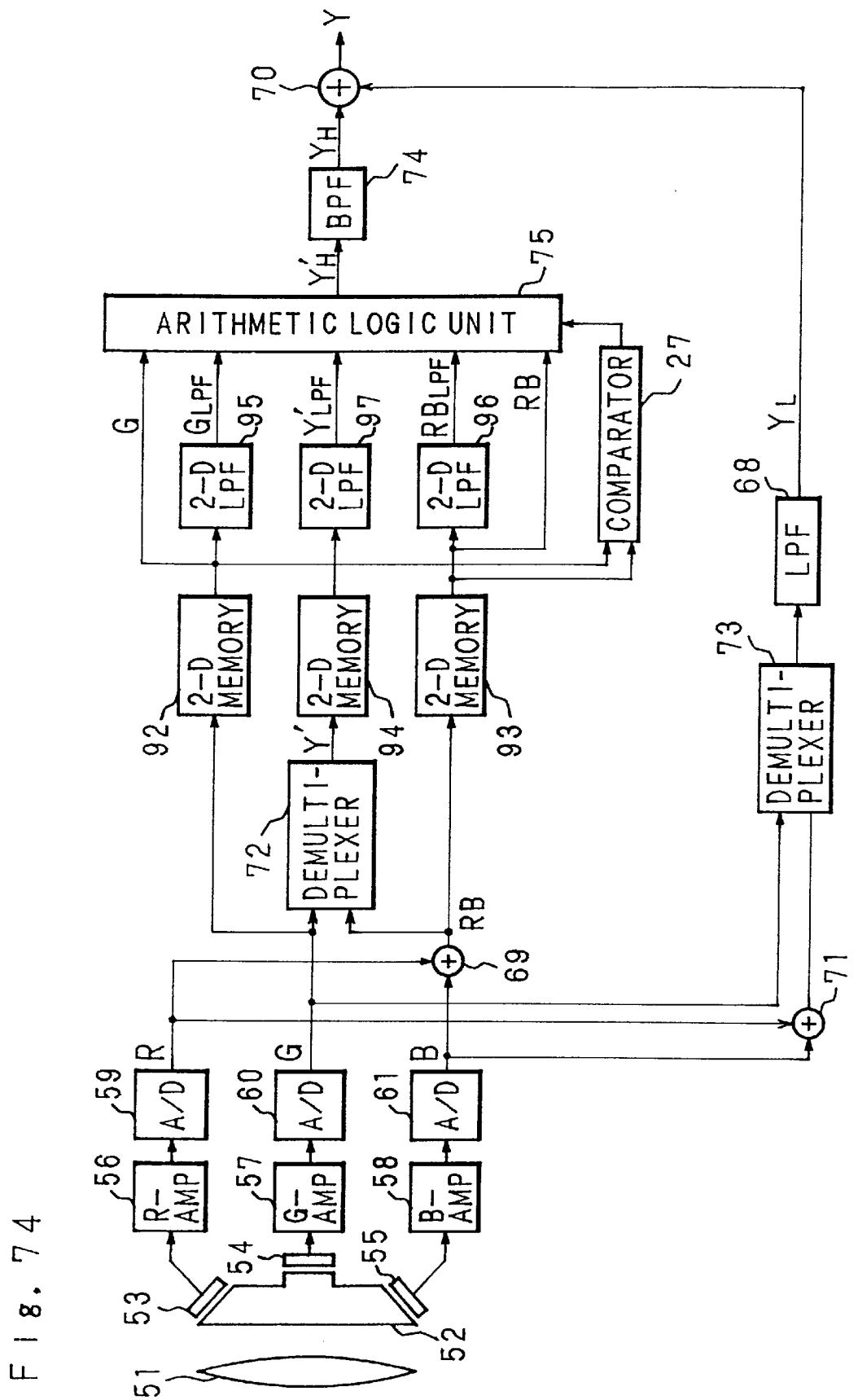
FIG. 74 shows a block circuit diagram illustrating further another color video camera of the invention.

FIG. 74 shows a block circuit diagram of the color video camera in embodiment 77. In FIG. 74, numerals which are the same as those in FIG. 72 indicate the identical portions, and numeral 27 represents a comparator similar to that shown in FIG. 22 (embodiment 4).

The operation will now be described below. The output signals of appropriate pixels in the vicinity of the pixel of interest are supplied from two-dimensional memories 92, 93 to the comparator 27. In a portion where the image has a high spatial frequency, YH' signal is calculated similarly to embodiment 74 and, in a portion of a low spatial frequency, YH' signal is calculated from the weighted averaging value of the outputs of N kinds of pixels in the vicinity of the pixel of interest.

The arithmetic logic unit 75 operates similarly to embodiment 74 in the portion of high spatial frequency. In the portion of a low spatial frequency, YH' signal at the position of G of row s, column t in FIG. 49, and at the position where there is no output signal of row s, column t in FIG. 50, for example, is calculated by equation (127) below.

$$YH'(s,t) = RB(s-1,t-1)/16 + G(s-1,t)/8 + \quad (127)$$
$$RB(s-1,t+1)/16 + RB(s,t-1)/8 +$$
$$G(s,t)/4 + RB(s,t+1)/8 +$$
$$RB(s+1,t-1)/16 + G(s+1,t)/8 +$$
$$RB(s+1,t+1)/16$$

The YH' signal, when the pixel of interest is located at position (s, t), kind of the pixel of interest is J and the kind of the right and left adjacent pixels of the pixel of interest is K, is calculated by equation (128) below.

$$YH'(s,t) = K(s-1,t-1)/16 + J(s-1,t)/8 + \quad (128)$$
$$K(s-1,t+1)/16 + K(s,t-1)/8 +$$
$$J(s,t)/4 + K(s,t+1)/8 +$$
$$K(s+1,t-1)/16 + J(s+1,t)/8 +$$
$$K(s+1,t+1)/16$$

Embodiment 78

Although the composition of the color video camera in embodiment 78 is the same as that of embodiment 77 (FIG. 74), the signal processing operations in the arithmetic logic unit 75 and in the comparator 27 are different.

In embodiment 78, the difference between the output signals of the right and left adjacent pixels of the pixel of interest or the difference between the output signals of the upper and lower adjacent pixels of the pixel of interest is compared to a particular threshold. And it is determined that the portion has a high spatial frequency if the difference between the output signals is greater than the threshold, and the operation of embodiment 74 is carried out, and, it is determined that the portion has a low spatial frequency if the difference between the output signals is less than the threshold, and the operation of embodiment 77 described above is carried out.

Results of the calculations by the same equations (77) through (80) as in embodiment 36 described previously are compared to a particular threshold to select one of the methods of generating YH' signal according to the result of comparison.

Embodiment 79

Although the composition of the color video camera in embodiment 79 is the same as that of embodiment 77 (FIG. 74), the signal processing operations in the arithmetic logic unit 75 and in the comparator 27 are different.

In embodiment 79, the difference between the outputs of the pixels of the same kind in the vicinity of the pixel of interest is compared to a particular threshold. And it is determined that the portion has a high spatial frequency if the difference is greater than the threshold, and the operation of embodiment 74 is carried out, and, it is determined that the portion has a low spatial frequency if the difference is less than the threshold, and the operation of embodiment 77 described above is carried out.

Results of the calculations by the same equations (81) through (88) as in embodiment 37 described previously are compared to a particular threshold to select one of the methods of generating YH' signal according to the result of comparison.

Embodiment 80

Although the composition of the color video camera in embodiment 80 is the same as that of embodiment 77 (FIG.

74), the signal processing operations in the arithmetic logic unit 75 and in the comparator 27 are different.

In embodiment 80, the difference between the output signals of the diagonally adjacent pixels interposing is compared to a particular threshold. And it is determined that the portion has a high spatial frequency if the difference between the output signals is greater than the threshold, and the operation of embodiment 74 is carried out, and, it is determined that the portion has a low spatial frequency if the difference between the output signals is less than the threshold, and the operation of embodiment 77 described above is carried out.

Results of the calculations by the same equations (89) through (92) as in embodiment 38 described previously are compared to a particular threshold to select one of the methods of generating YH' signal according to the result of comparison.

Embodiment 81

Figure 75:
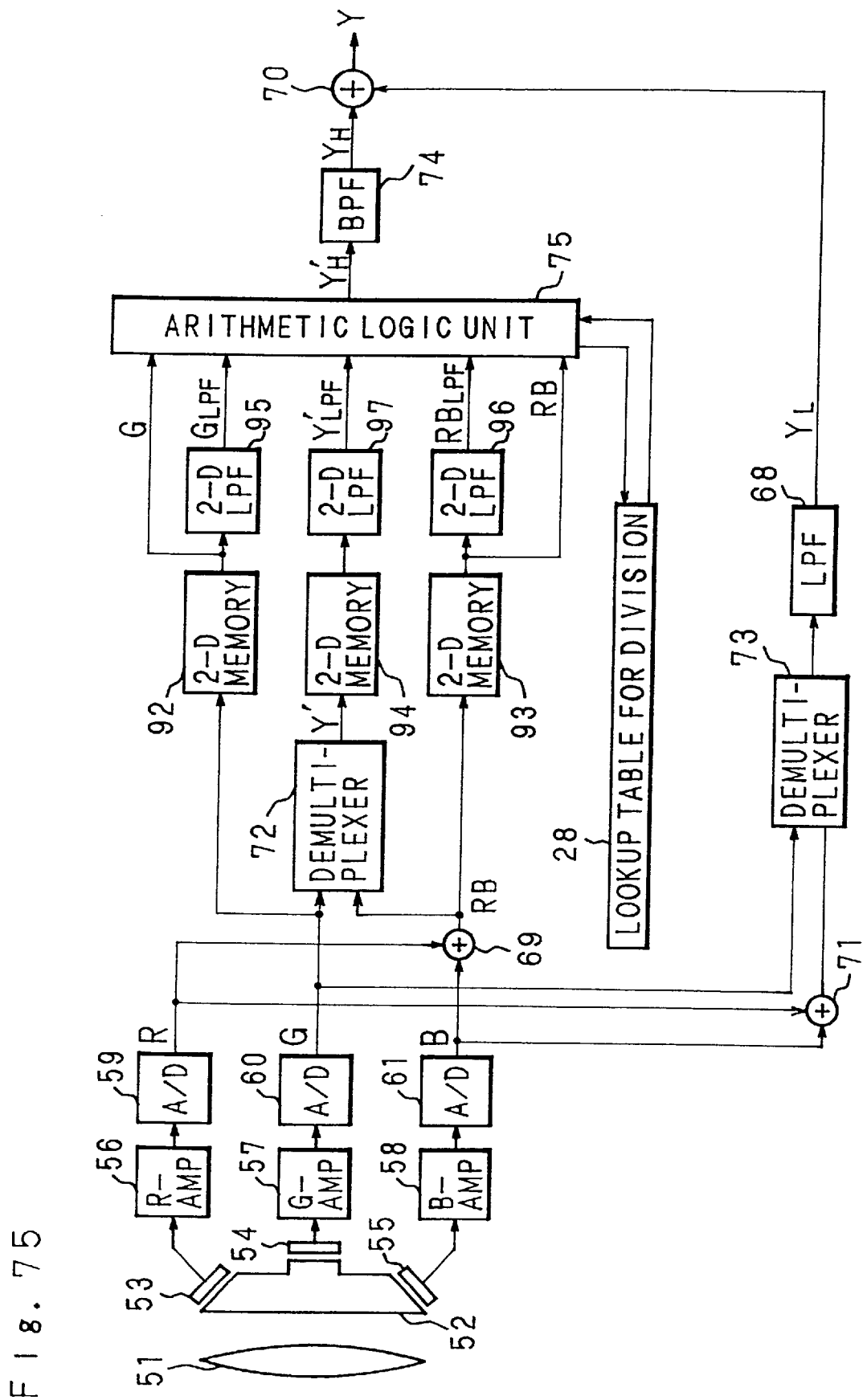
FIG. 75 shows a block circuit diagram illustrating further another color video camera of the invention.

FIG. 75 shows a block circuit diagram of the color video camera in embodiment 81. In FIG. 75, symbols which are the same as those in FIG. 72 indicate the identical portions, and numeral 28 represents a lookup table for division similar to that shown in FIG. 23 (embodiment 6).

The operation of the lookup table for division 28 is the same as that in embodiment 6, and description thereof will be omitted.

Embodiment 82

An example in which the method of calculation in embodiment 7 with respect to embodiment 6 is applied to embodiment 81 described above is this embodiment 82. The operation of the lookup table for division 28 in embodiment 82 is the same as that in embodiment 7, and description thereof will be omitted.

Embodiment 83

The composition of the color video camera in embodiment 83 is similar to that of embodiment 74 (FIG. 72). In embodiment 83, a two-dimensional low-pass filter made up of only bit shift circuits of weightings such as $1/8$, $1/4$, $1/2$ is used as a digital filter. The composition of the two-dimensional low-pass filter is similar to that of embodiment 19 (FIG. 33) where output Y'LPF(s, t) is obtained from the two-dimensional low-pass filter in response to the synthesized signal Y', and description thereof will be omitted. It should be noted here, however, that use of a two clock delay circuit instead of a one clock delay circuit serves the purpose, because the two-dimensional low-pass filter for the Kth pixel at the position (s, t) of the pixel of interest is made by arranging the Kth pixels alternately every other pixel, in the horizontal direction.

Embodiment 84

Although the composition of the color video camera in embodiment 84 is the same as that of embodiment 74 (FIG. 72), the method of calculating the YH' signal in the arithmetic logic unit 75 is different.

In embodiment 76, luminance signal is obtained by adding 1 to each of the multiplier, divisor and dividend and subtracting 1 from the result of calculation at the end to minimize the calculation error, as expressed by the equations (125) and (126). However, because the number 1 is LSB which has no significant effect on the result of calculation, subtraction of 1 at the end may be omitted for the simplification of the circuit. Embodiment 84 is an example of such simplification, and YH' signal at the position of G of row s, column t is calculated by equation (129) below.

$$YH'(s,t)=(G(s,t)+1)\times((Y'LPF(s,t)+1)/(GLPF(s,t)+1)) \quad (129)$$

YH' signal at position (s,t) of pixel of kind K is given by the equation (130) below.

$$YH'(s,t)=(K(s,t)+1)\times((Y'LPF(s,t)+1)/(KLPF(s,t)+1)) \quad (130)$$

Embodiment 85

Figure 76:
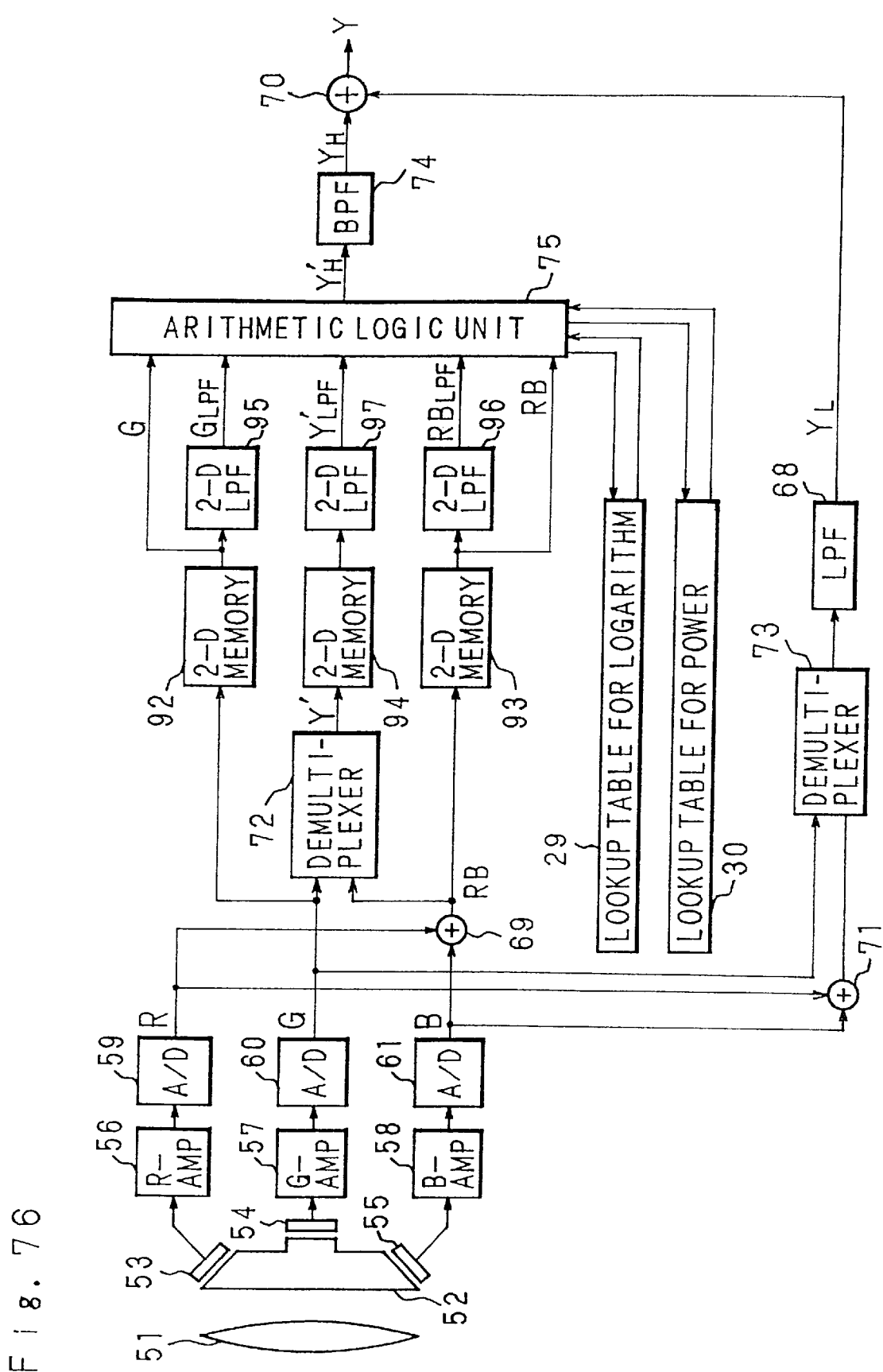
FIG. 76 shows a block circuit diagram illustrating further another color video camera of the invention.

FIG. 76 shows a block circuit diagram of the color video camera in embodiment 85. In FIG. 76, symbols which are the same as those in FIG. 72 indicate the identical portions. Numerals 29, 30 represent a lookup table for logarithm and a lookup table for power similar to those shown in FIG. 27 (embodiment 10).

The operation will now be described below. The calculation of the YH' signal in case the kind of the pixel at position (s,t) is K is given, for example, by the equation (130) as described in embodiment 84. To this equation (130), the logarithmic conversion with base x is applied as expressed by equation (131), where ^ represents power.

$$\begin{aligned}YH'(s,t) &= X\char94 \log x\{(K(s,t)+1)\times((Y'LPF(s,t)+1)/\\ &\quad (KPLF(s,t)+1))\} \\ &= X\char94 \{\log x(K(s,t)+1)+\log x(Y'LPF(s,t)+1)-\\ &\quad \log x(KPLF(s,t)+1)\}\end{aligned} \quad (131)$$

In this embodiment 85, the arithmetic operation can be carried out by using lookup tables of small capacity similarly to embodiment 10 described before. Although the above description is for the case of calculating YH' signal based on the equation of embodiment 84, the calculation by means of a lookup table for logarithm and a lookup table for power may be applied to embodiment 74.

Although the image sensor in the above embodiments is of a type which reads two upper and lower adjacent pixels by mixing them, they may be of a type which reads every pixel separately. The criterion of determining the level of spatial frequency of an image is also not restricted to the embodiments described above and may be otherwise.

Although descriptions of the above embodiments assume complementary colors for the kind of color filters in the embodiments which use a single image sensor, color filters of primary colors or combination of a primary color and a complementary color may be used. Although examples using field memories for the color separation memories are given, line memories of the number of lines required for the processing of low-pass filters may be used.

Although the synthesized signal Y' of G signal and R, B composite signal is synthesized by a demultiplexer in the embodiments by using three types of image sensors, use of adders or other means may be used to synthesize the signals.

Although harmonics component is taken from the luminance signal by means of the band-pass filter in the embodiment where the aperture correction is carried out, the high-pass filter may be used for this purpose. Embodiments where the YL signal is processed as digital signal are given, but it may be processed as analog signal.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A color video camera to obtain color images, comprising:

a spectral optical system which decomposes an incident ray into N, where N is an integer, kinds of light;

N pieces of image sensors composed of photoelectric transducers arranged on a two-dimensional plane being optically staggered to each other;

low-pass filters wherein N kinds of signals generated by adjusting a gain of the outputs of the image sensors are supplied as an input to obtain N kinds of outputs from the 1st through Nth; and means for calculating a luminance signal component wherein a output signal of a Kth ($1 \leq K \leq N$) pixel of interest is multiplied by a ratio of the low-pass filter output of a synthesized signal of pixels of the respective kinds at the coordinates of the Kth pixel of interest to the Kth low-pass filter output at coordinates of the Kth pixel of interest, thereby to obtain the luminance signal component and to improve resolution without attenuating harmonics of the luminance signal component.

2. A color video camera to obtain color images, comprising:

a spectral optical system which decomposes an incident ray into N, where N is an integer, kinds of light;

N pieces of images sensors composed of photoelectric transducers arranged on a two-dimensional plane being optically staggered to each other;

low-pass filters where N kinds of signals generated by adjusting a gain of outputs of the image sensors are supplied as an input, to obtain N kinds of outputs from the 1st through Nth; and means for calculating a luminance signal component wherein an output signal of a Kth ($1 \leq K \leq N$) pixel of interest plus a constant value is multiplied by a ratio of the low-pass filter output of a synthesized signal of pixels of the respective kinds at the coordinates of the Kth pixel of interest plus the constant value to a Kth low-pass filter output at coordinates of the Kth pixel of interest plus the constant value, and the constant value is subtracted from the result of the multiplication and division, thereby to obtain the luminance signal component with improved resolution and unattenuated harmonics.

3. A color video camera to obtain color images, comprising:

a spectral optical system which decomposes an incident ray into N, where N is an integer, kinds of light;

N pieces of image sensors composed of photoelectric transducers arranged on a two-dimensional plane being optically staggered to each other;

low-pass filters wherein N kinds of signals generated by adjusting a gain of the outputs of the image sensors are supplied as an input to obtain N kinds of outputs from the 1st through Nth; and first calculating means for calculating the luminance signal component wherein, in a portion of an image having a high spatial frequency, an output signal of a Kth ($1 \leq K \leq N$) pixel of interest is multiplied by a ratio of a low-pass filter output of a synthesized signal of pixels of the respective kinds at the coordinates of the Kth pixel of interest to a Kth low-pass filter output at coordinates of the Kth pixel of interest, thereby to obtain the luminance signal component; and second calculating means for calculating the luminance signal component from a weighted averaging value of outputs of N kinds of pixels in a vicinity of the Kth pixel of interest, in a portion of the image having a low spatial frequency to improve resolution of the luminance signal component without attenuating harmonics.

4. A color video camera of claim 3, further comprising:

means for selecting the first or the second calculating means, depending on whether a difference between outputs of the right and left adjacent pixels of the Kth pixel of interest is greater than a predetermined threshold.

5. A color video camera of claim 1, wherein a fractional product of the calculating means is composed of a lookup table for division, while in the fractional product, if an input to the table is n-bit data, the input is checked to see if a most significant bit thereof is 1 and, if it is 0, a next bit is checked subsequently eventually stopping at an nth bit, and a bit shift operation is carried out after the check, thereby using effective n-bit data with 0 bits removed therefrom as the input to the lookup table for division.

6. A color video camera as claimed in claim 5, wherein contents of the lookup table for division are increased by n bits through a bit shift operation on a result of the dividing operation, to take an integral part and discarding a fractional part, while applying a bit shift operation to a result of calculation which uses the value, to reduce it by n bits to return it to an original number of bits, thereby taking the integral part as a result of the calculation.

7. A color video camera of claim 1, wherein the calculating means applies logarithmic conversion to a fractional component and uses a lookup table for logarithm and a lookup table for power.

8. A color video camera of claim 1, wherein each of the low-pass filters includes a plurality of bit shift circuits and an adder which takes in outputs of the bit shift circuits as an input thereof.

9. A color video camera to obtain color images, comprising:

a spectral optical system which decomposes an incident ray into N, where N is an integer, kinds of light;

N pieces of image sensors composed of photoelectric transducers arranged on a two-dimensional plane being optically staggered to each other;

low-pass filters wherein N kinds of signals generated by adjusting a gain of outputs of the image sensors are supplied as an input, to obtain N kinds of outputs from the 1st through Nth; and means for calculating a luminance signal component wherein an output signal of a Kth ($1 \leq K \leq N$) pixel of interest plus a constant value is multiplied by a ratio of a low-pass filter output of a synthesized signal of pixels of the respective kinds at coordinates of the Kth pixel of interest plus the constant value to a Kth low-pass filter output at coordinates of the Kth pixel of interest plus the constant value, thereby to obtain the luminance signal component with improved resolution and unattenuated harmonics.

10. A color video camera of claim 9, wherein the calculating means applies logarithmic conversion to a fractional component and uses a lookup table for logarithm and a lookup table for power.

11. A color video camera to obtain color images, comprising:

a spectral optical system which decomposes an incident ray into N, where N is an integer, kinds of light;

N pieces of image sensors composed of photoelectric transducers arranged on a two-dimensional plane being optically staggered to each other;

two-dimensional low-pass filters wherein N kinds of signals generated by adjusting a gain of outputs of the image sensors are supplied as inputs to obtain N kinds of outputs from the 1st through Nth; and means for calculating a luminance signal component wherein an output signal of a Kth ($1 \leq K \leq N$) pixel of interest is multiplied by a ratio of the two-dimensional low-pass filter output of a synthesized signal of pixels of the respective kinds at coordinates of the Kth pixel of interest to the Kth two-dimensional low-pass filter output at the coordinates of the Kth pixel of interest, thereby to obtain the luminance signal component and to improve resolution without attenuating harmonics of the luminance signal component.

12. A color video camera to obtain color images, comprising:

a spectral optical system which decomposes an incident ray into N, wherein N is an integer, kinds of light;

N pieces of image sensors composed of photoelectric transducers arranged on a two-dimensional plane being optically staggered to each other;

two-dimensional low-pass filters wherein N kinds of signals generated by adjusting a gain of outputs of the image sensors are supplied as an input, to obtain N kinds of outputs from the 1st through Nth; and means for calculating a luminance signal component wherein an output signal of a Kth ($1 \leq K \leq N$) pixel of interest plus a constant value is multiplied by a ratio of a two-dimensional low-pass filter output of a synthesized signal of pixels of the respective kinds at coordinates of the Kth pixel of interest plus the constant value, and the constant value is subtracted from a result of a multiplication and division, thereby to obtain the luminance signal component with improved resolution and unattenuated harmonics.

13. A color video camera to obtain color images, comprising:

a spectral optical system which decomposes an incident ray into N, where N is an integer, kinds of light;

N pieces of image sensors composed of photoelectric transducers arranged on a two-dimensional plane being optically staggered to each other;

two-dimensional low-pass filters wherein N kinds of signals generated by adjusting a gain of outputs of the image sensors are supplied as an input to obtain N kinds of outputs from the 1st through Nth; and first calculating means for calculating a luminance signal component wherein, in a portion of an image having a high spatial frequency, an output signal of a Kth ($1 \leq K \leq N$) pixel of interest is multiplied by a ratio of a two-dimensional low-pass filter output of a synthesized signal of pixels of the respective kinds at coordinates of the Kth pixel of interest to a Kth two-dimensional low-pass filter output at coordinates of the Kth pixel of interest thereby to obtain the luminance signal component; and second calculating means for calculating the luminance signal component from a weighted averaging value of outputs of N kinds of pixels in a vicinity of the Kth pixel of interest, in a portion of the image having a low spatial frequency to improve resolution of the luminance signal component without attenuating harmonics.

14. A color video camera of claim 13 further comprising:

means for selecting the first or the second calculating means, depending on whether either a difference between outputs of right and left adjacent pixels of the Kth pixel of interest or a difference between outputs of upper and lower adjacent pixels of the Kth pixel of interest is greater than a predetermined threshold.

15. A color video camera of claim 13, further comprising:

means for selecting the first or the second calculating means, depending on whether a difference between outputs of pixels of the same kind in a vicinity of the Kth pixel of interest is greater than a predetermined threshold.

16. A color video camera of claim 13, further comprising:

means for selecting the first or the second calculating means, depending on whether either a difference between outputs of an upper-left diagonally adjacent pixel and a lower-right diagonally adjacent pixel of the Kth pixel of interest or a difference between outputs of a lower-left diagonally adjacent pixel and an upper-right diagonally adjacent pixel of the Kth pixel of interest is greater than a predetermined threshold.

17. A color video camera of claim 11, wherein a fractional product of the calculating means is composed of a lookup table for division, while in the fractional product, if an input to a table is n-bit data, the input is checked to see if a most significant bit thereof is 1 and, if it is 0, a next bit is checked subsequently eventually stopping at an nth bit, and a bit shift operation is carried out after the check, thereby using effective n-bit data with 0 bits removed therefrom, as the input to the lookup table for division.

18. A color video camera as claimed in claim 17, wherein contents of the lookup table for division are increased by n bits through a bit shift operation on a result of the dividing operation, to take an integral part and discarding the fractional part, while applying a bit shift operation to a result of calculation which uses the value, to reduce it by n bits to return it to an original number of bits, thereby taking the integral part as a result of the calculation.

19. A color video camera of claim 11, wherein the calculating means applies logarithmic conversion to a fractional component and uses a lookup table for logarithm and a lookup table for power.

20. A color video camera of claim 11, wherein each of the low-pass filters includes a plurality of bit shift circuits an a plurality of adders which take in outputs of the bit shift circuits as an input thereof.

21. A color video camera to obtain color images, comprising:

a spectral optical system which decomposes an incident ray into N, where N is an integer, kinds of light;

N pieces of image sensors composed of photoelectric transducers arranged on a two-dimensional plane being optically staggered to each other;

two-dimensional low-pass filters wherein N kinds of signals generated by adjusting a gain of outputs of the image sensors are supplied as an input, to obtain N kinds of outputs from the 1st through Nth; and means for calculating a luminance signal component wherein an output signal of a Kth ($1 \leq K \leq N$) pixel of interest plus a constant value is multiplied by a ratio of a two-dimensional low-pass filter output of a synthesized signal of pixels of the respective kinds at coordinates of the Kth pixel of interest plus the constant value to a Kth two-dimensional low-pass filter output at coordinates of the Kth pixel of interest plus the constant value, thereby to obtain the luminance signal component with improved resolution and unattenuated harmonics.

22. A color video camera of claim 21, wherein the calculating means applies logarithmic conversion to a fractional component and uses a lookup table for logarithm and a lookup table for power.

* * * * *